US009658755B2

(12) United States Patent
Otsuka et al.

(10) Patent No.: US 9,658,755 B2
(45) Date of Patent: May 23, 2017

(54) ELECTRONIC DEVICE

(71) Applicant: PANASONIC INTELLECTUAL PROPERTY CORPORATION OF AMERICA, Torrance, CA (US)

(72) Inventors: Yu Otsuka, Osaka (JP); Hiroshi Fujita, Osaka (JP); Kazuhiro Aihara, Osaka (JP); Goro Hisatake, Osaka (JP); Takashi Isobe, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 54 days.

(21) Appl. No.: 14/729,237

(22) Filed: Jun. 3, 2015

(65) Prior Publication Data

US 2015/0268852 A1 Sep. 24, 2015

Related U.S. Application Data

(63) Continuation of application No. PCT/JP2013/007707, filed on Dec. 27, 2013.

(30) Foreign Application Priority Data

Oct. 4, 2013 (JP) ................. 2013-208718

(51) Int. Cl.
*G06F 3/048* (2013.01)
*G06F 3/0484* (2013.01)
(Continued)

(52) U.S. Cl.
CPC .......... *G06F 3/04845* (2013.01); *G04F 10/00* (2013.01); *G04G 21/00* (2013.01);
(Continued)

(58) Field of Classification Search
None
See application file for complete search history.

(56) References Cited

U.S. PATENT DOCUMENTS

2001/0043513 A1* 11/2001 Grupp .................. A44C 5/0015
368/281
2006/0143574 A1 6/2006 Ito et al.
(Continued)

FOREIGN PATENT DOCUMENTS

JP 2006-185273 7/2006
JP 2007-080219 3/2007
(Continued)

OTHER PUBLICATIONS

U.S. Appl. No. 14/403,685 to Otsuka et al., filed Nov. 25, 2014.
(Continued)

*Primary Examiner* — Joseph Haley
(74) *Attorney, Agent, or Firm* — Greenblum & Bernstein, P.L.C.

(57) ABSTRACT

An electronic device that increases both visual perceptibility and selectability of executable programs. A display is a display with an elongated shape whose display surface includes a first region and a second region aligned in a longitudinal direction. In the first region, only an image that corresponds to a program that is specified as the main program is displayed. In the second region, images that correspond to sub-programs are displayed to be lined up in the longitudinal direction. The image includes an execution image of the program that is specified as the main program.

19 Claims, 46 Drawing Sheets

(51) Int. Cl.
  *G06F 3/0488* (2013.01)
  *G04G 21/08* (2010.01)
  *G06F 1/16* (2006.01)
  *G04F 10/00* (2006.01)
  *G04G 21/00* (2010.01)
  *G06F 3/01* (2006.01)
  *G06F 3/041* (2006.01)
  *G06F 3/0481* (2013.01)
  *G06F 3/0485* (2013.01)
  *G06F 3/0482* (2013.01)

(52) U.S. Cl.
  CPC ............ *G04G 21/08* (2013.01); *G06F 1/163* (2013.01); *G06F 3/011* (2013.01); *G06F 3/0416* (2013.01); *G06F 3/0482* (2013.01); *G06F 3/0485* (2013.01); *G06F 3/0488* (2013.01); *G06F 3/04817* (2013.01); *G06F 3/04883* (2013.01); *G06F 3/04886* (2013.01); *G06F 2200/1637* (2013.01); *G06F 2203/04803* (2013.01); *G06F 2203/04808* (2013.01)

(56) References Cited

U.S. PATENT DOCUMENTS

| | | |
|---|---|---|
| 2008/0276200 A1 | 11/2008 | Bamford et al. |
| 2009/0228820 A1 | 9/2009 | Kim et al. |
| 2012/0013562 A1 | 1/2012 | Jyonoshita et al. |
| 2012/0030635 A1* | 2/2012 | Miyazaki .............. G06F 3/0482 715/863 |
| 2012/0139952 A1 | 6/2012 | Imai et al. |
| 2012/0154303 A1* | 6/2012 | Lazaridis .............. G06F 1/3203 345/173 |
| 2015/0113473 A1 | 4/2015 | Otsuka et al. |
| 2016/0041680 A1* | 2/2016 | Chi ........................ H04B 1/385 345/173 |

FOREIGN PATENT DOCUMENTS

| | | |
|---|---|---|
| JP | 2009-217815 | 9/2009 |
| JP | 2010-231464 | 10/2010 |
| JP | 2012-119945 | 6/2012 |

OTHER PUBLICATIONS

International Search Report (ISR) in International Patent Appl. No. PCT/JP2013/007707, dated Apr. 8, 2014.

Lyons et al., "Facet: A Multi-Segment Wrist Worn System", UIST '12 Proceedings of the 25th Annual ACM Symposium on User Interface Software and Technology, ACM, pp. 123-129 (Oct. 7-10, 2012).

\* cited by examiner

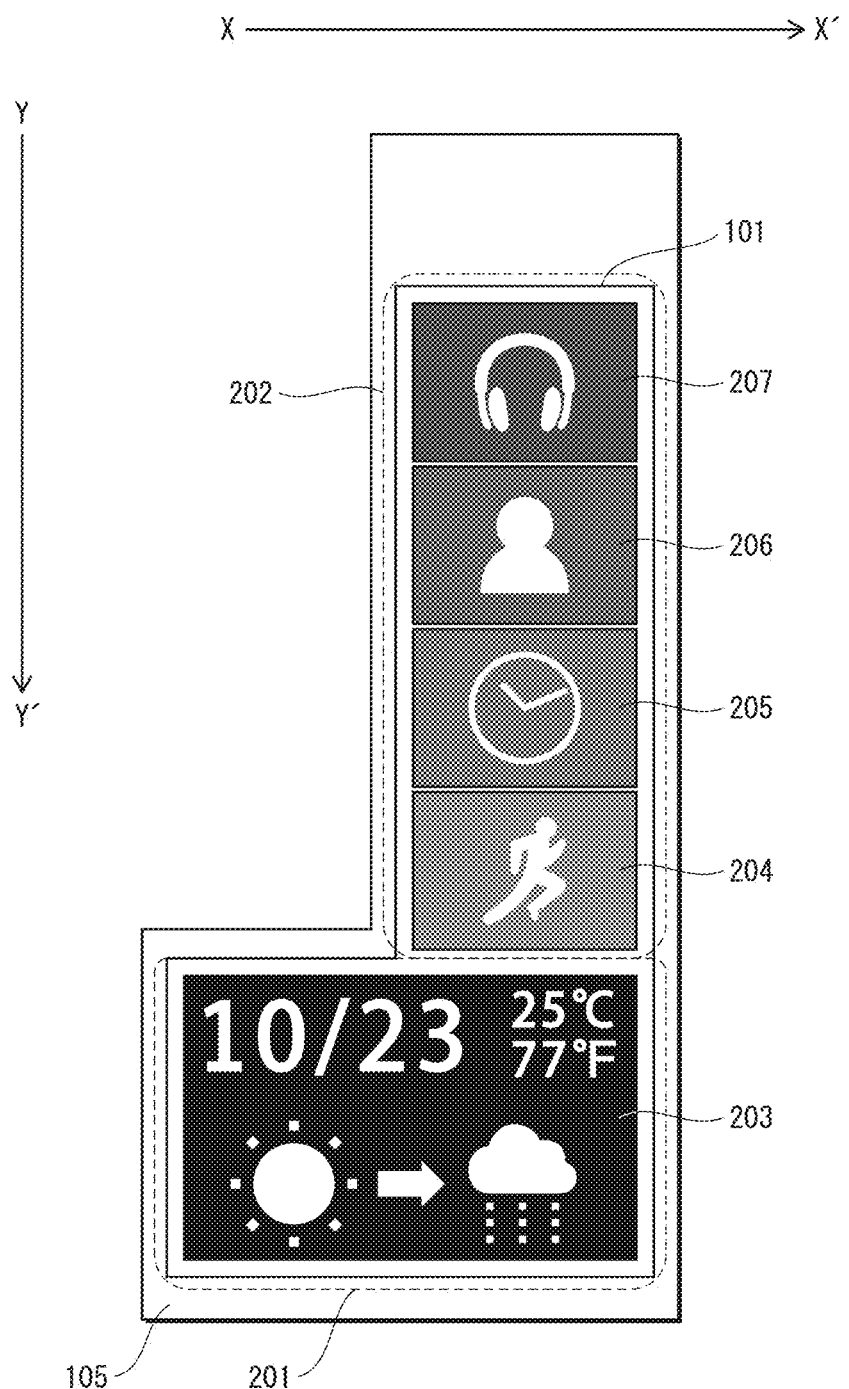

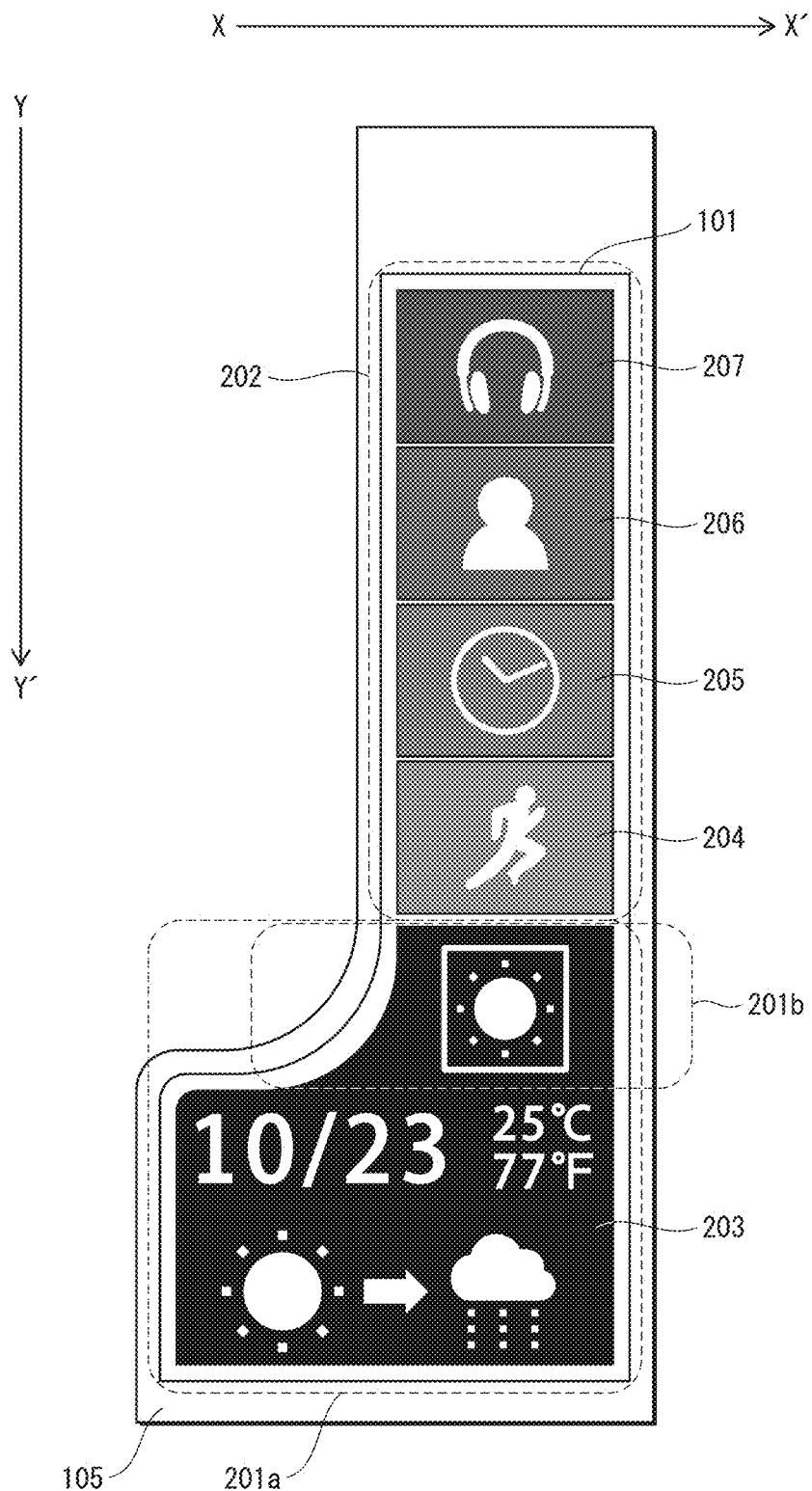

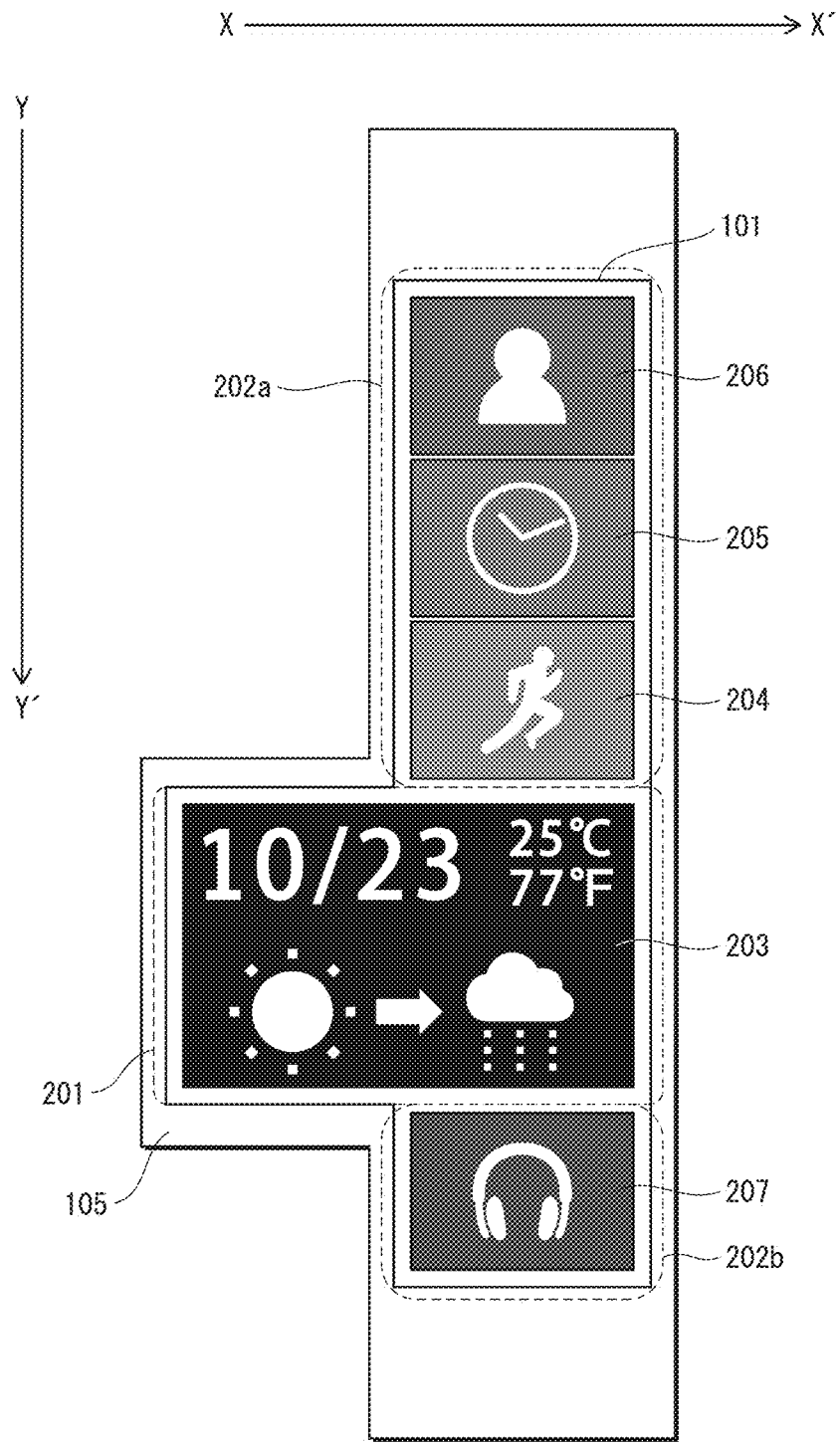

Arrangement table

| ID:A | ID:B | ID:C | ID:D | ID:E |
|------|------|------|------|------|
| P0 | P1 | P2 | P3 | P4 |

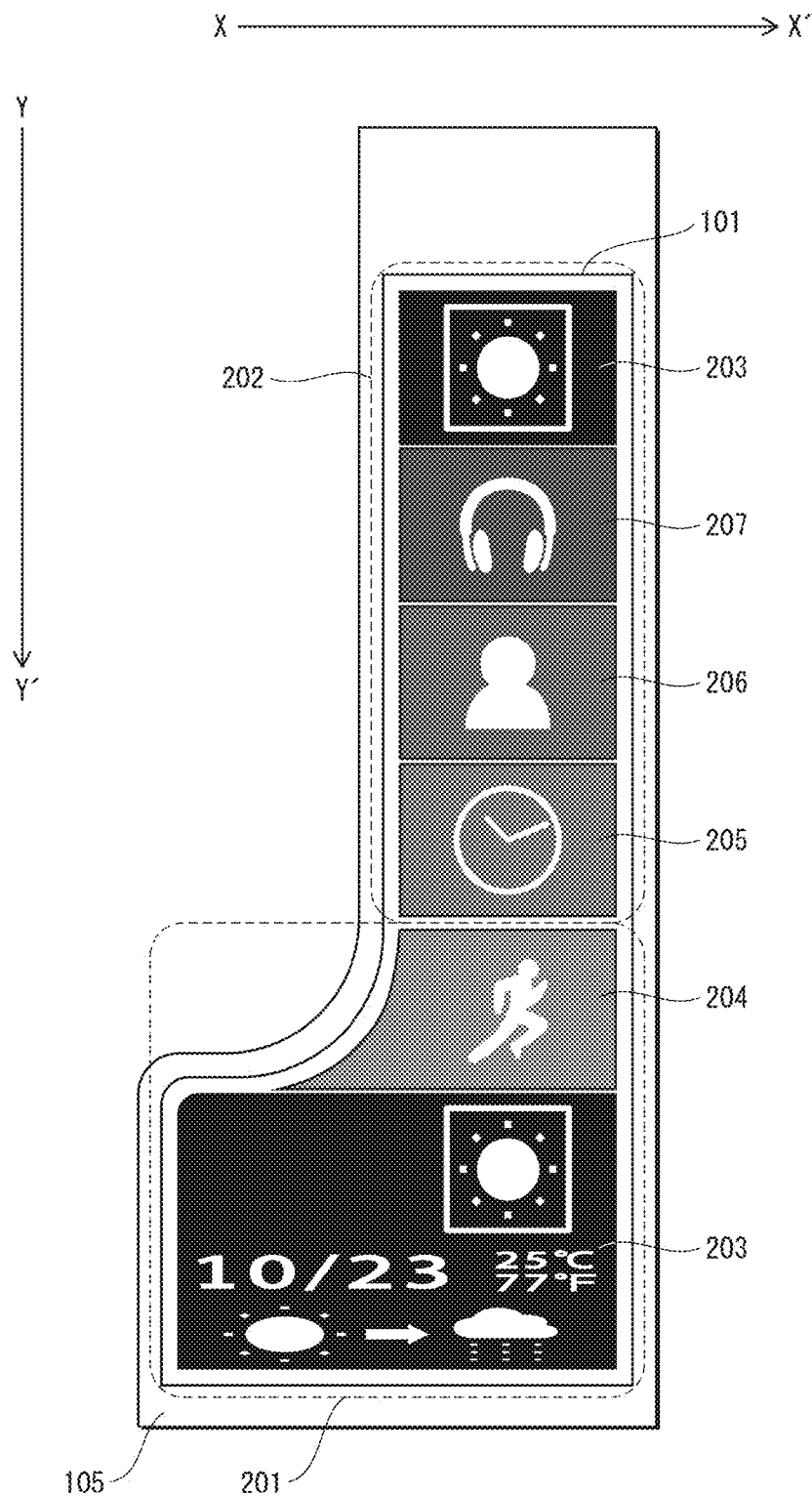

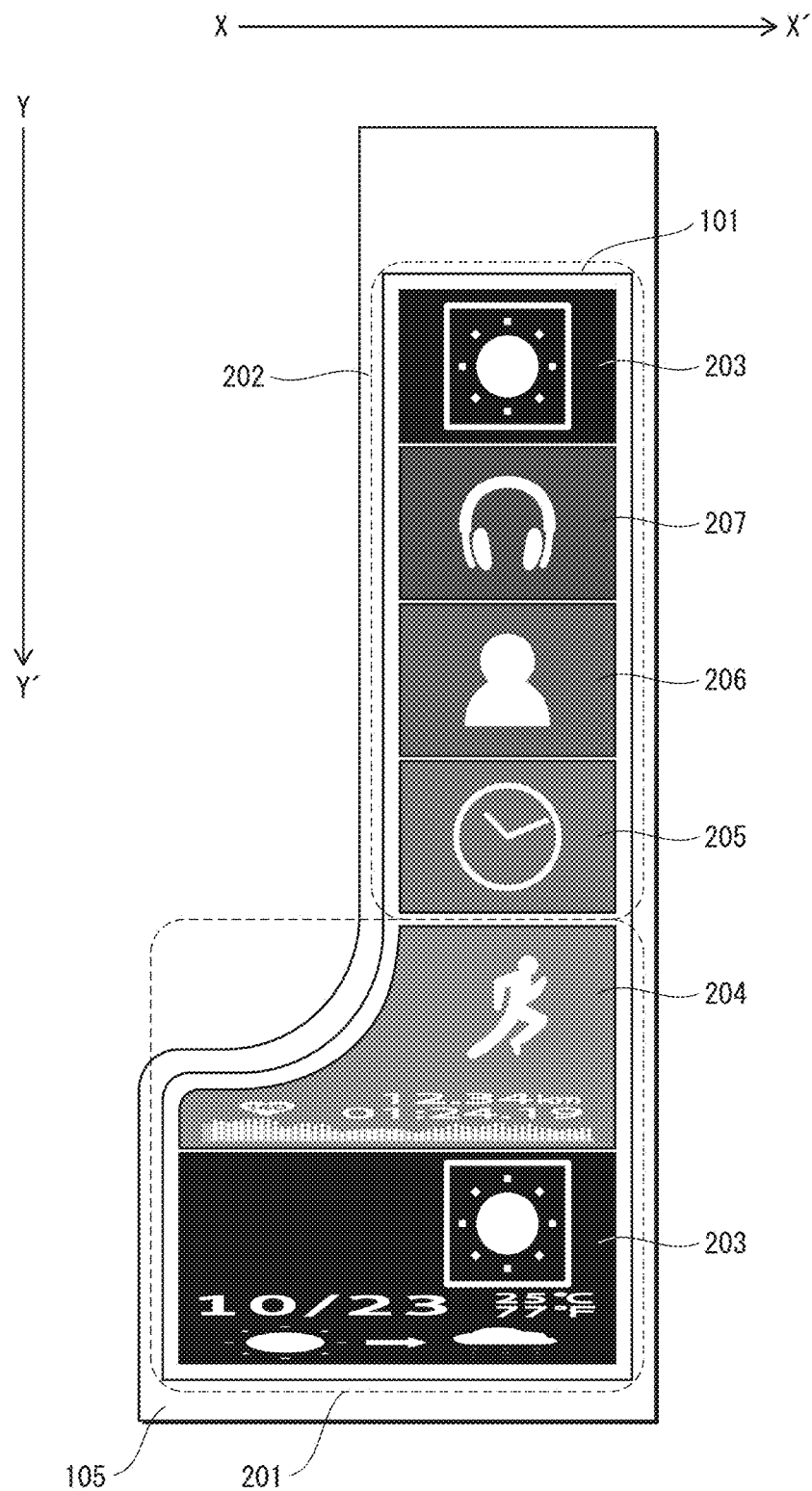

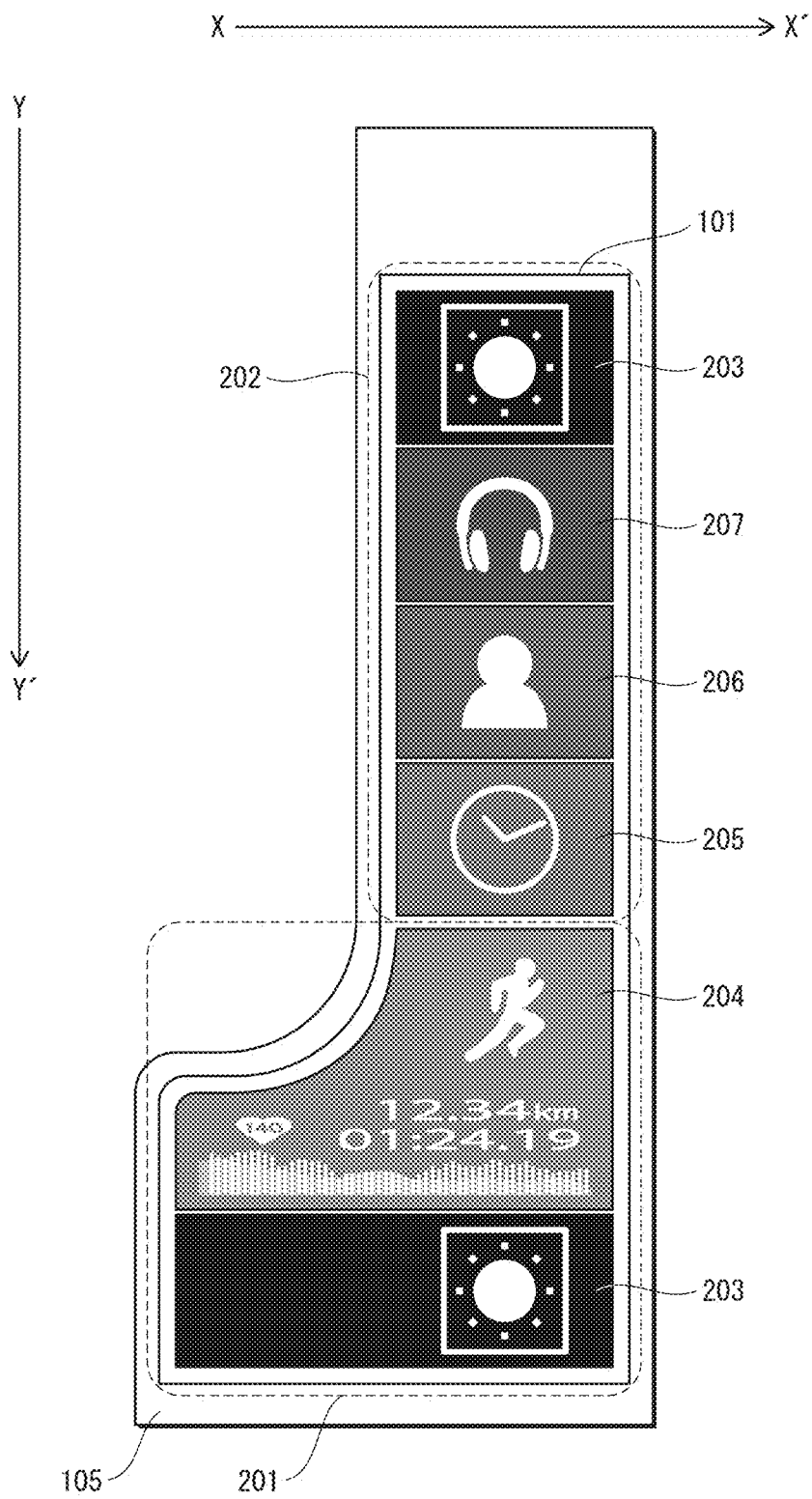

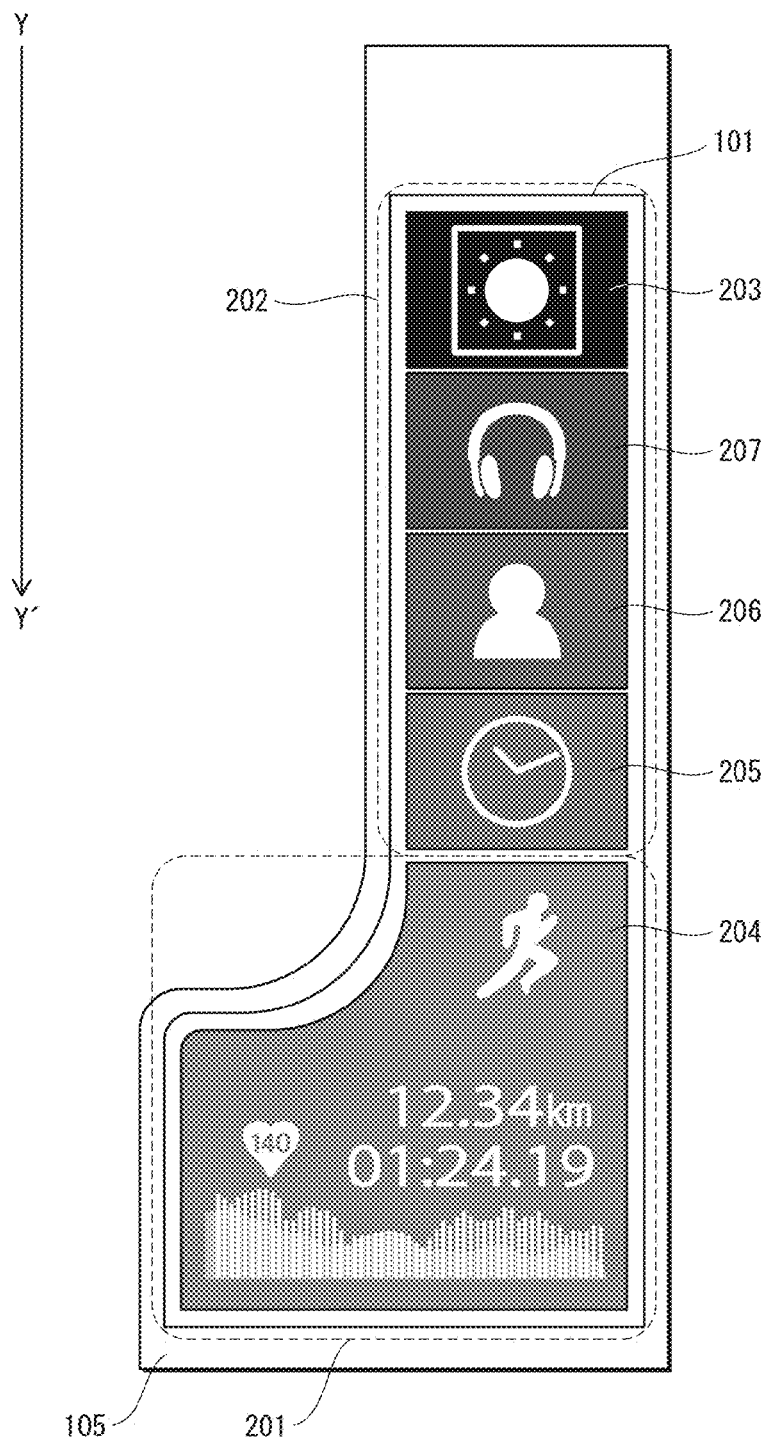

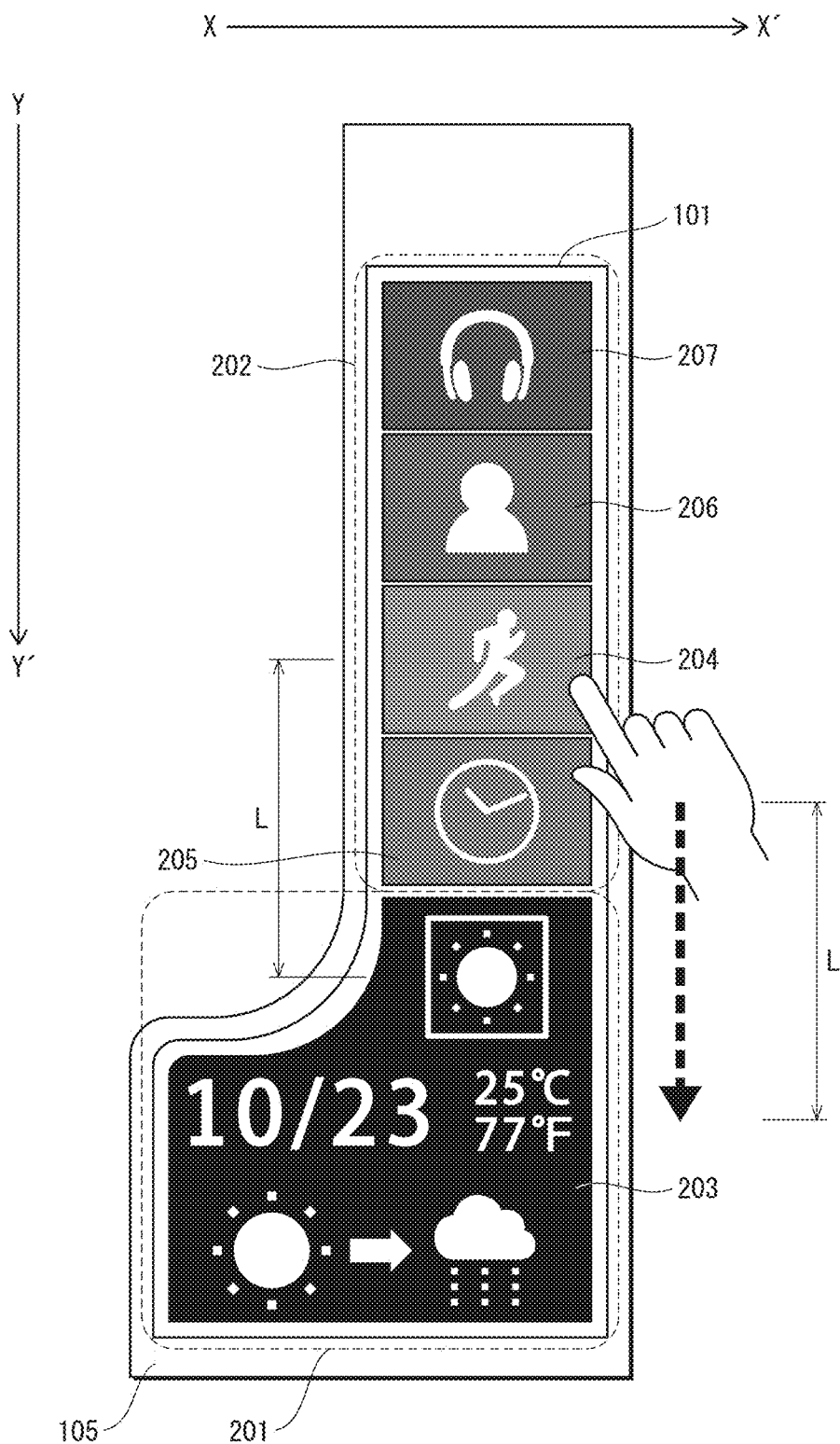

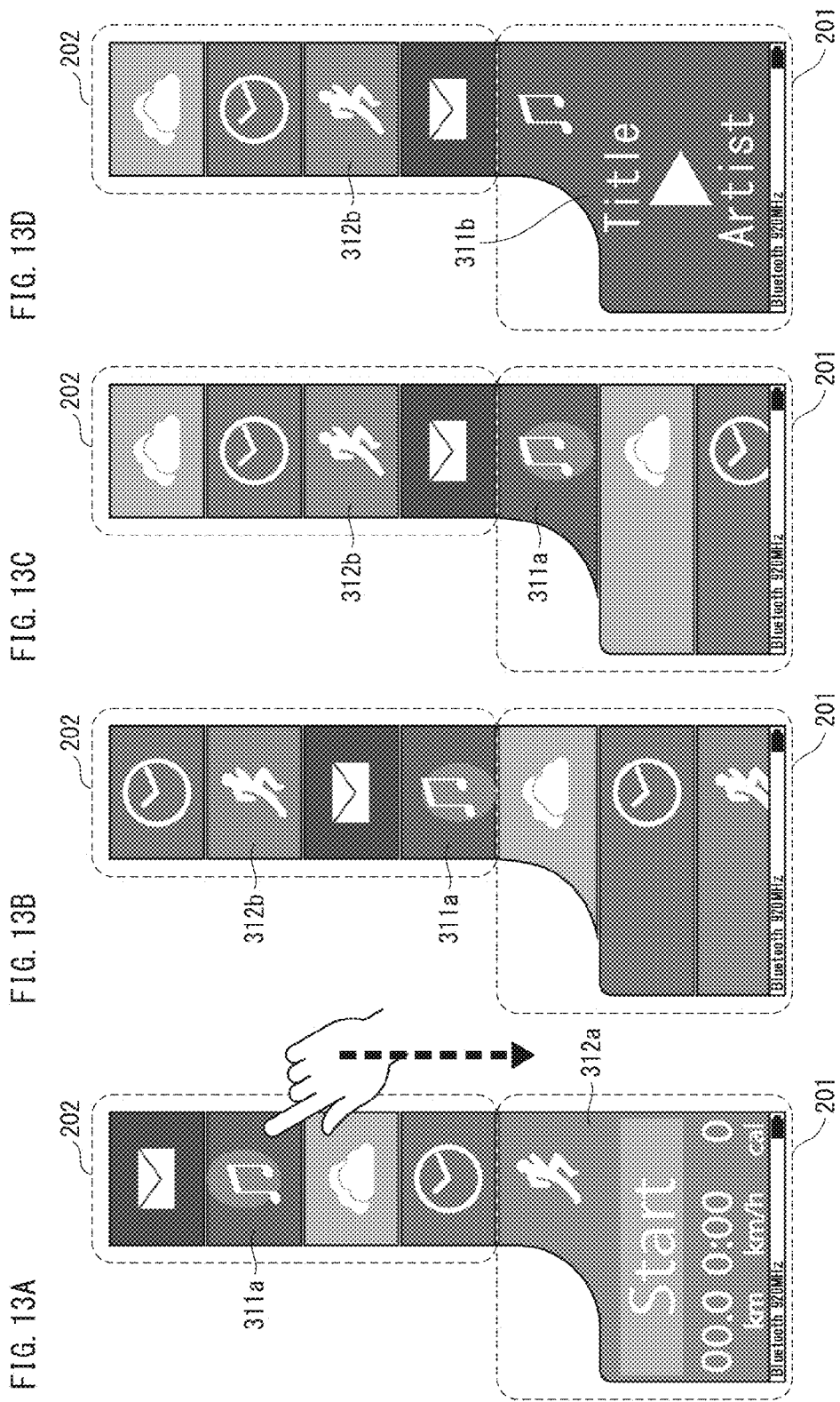

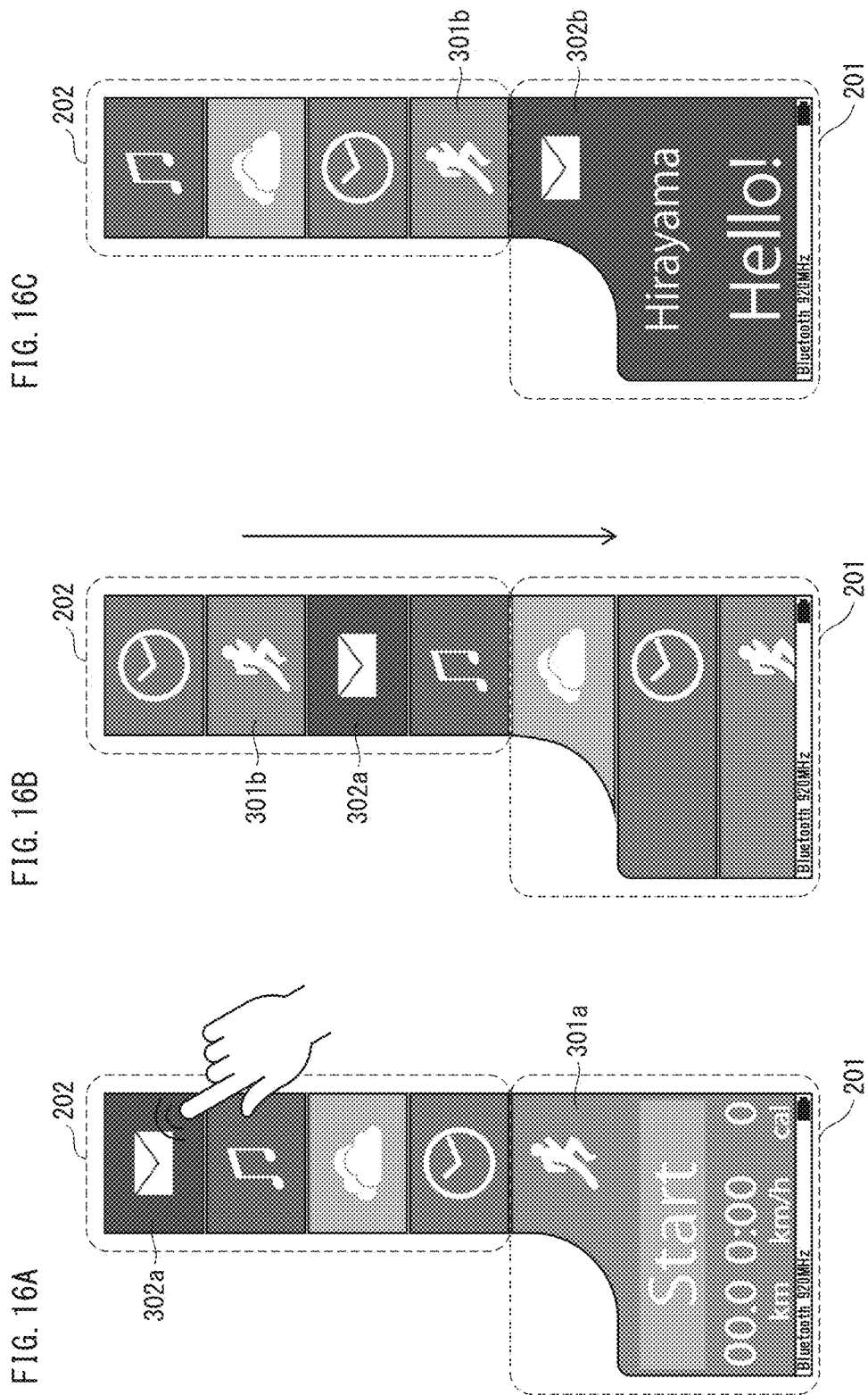

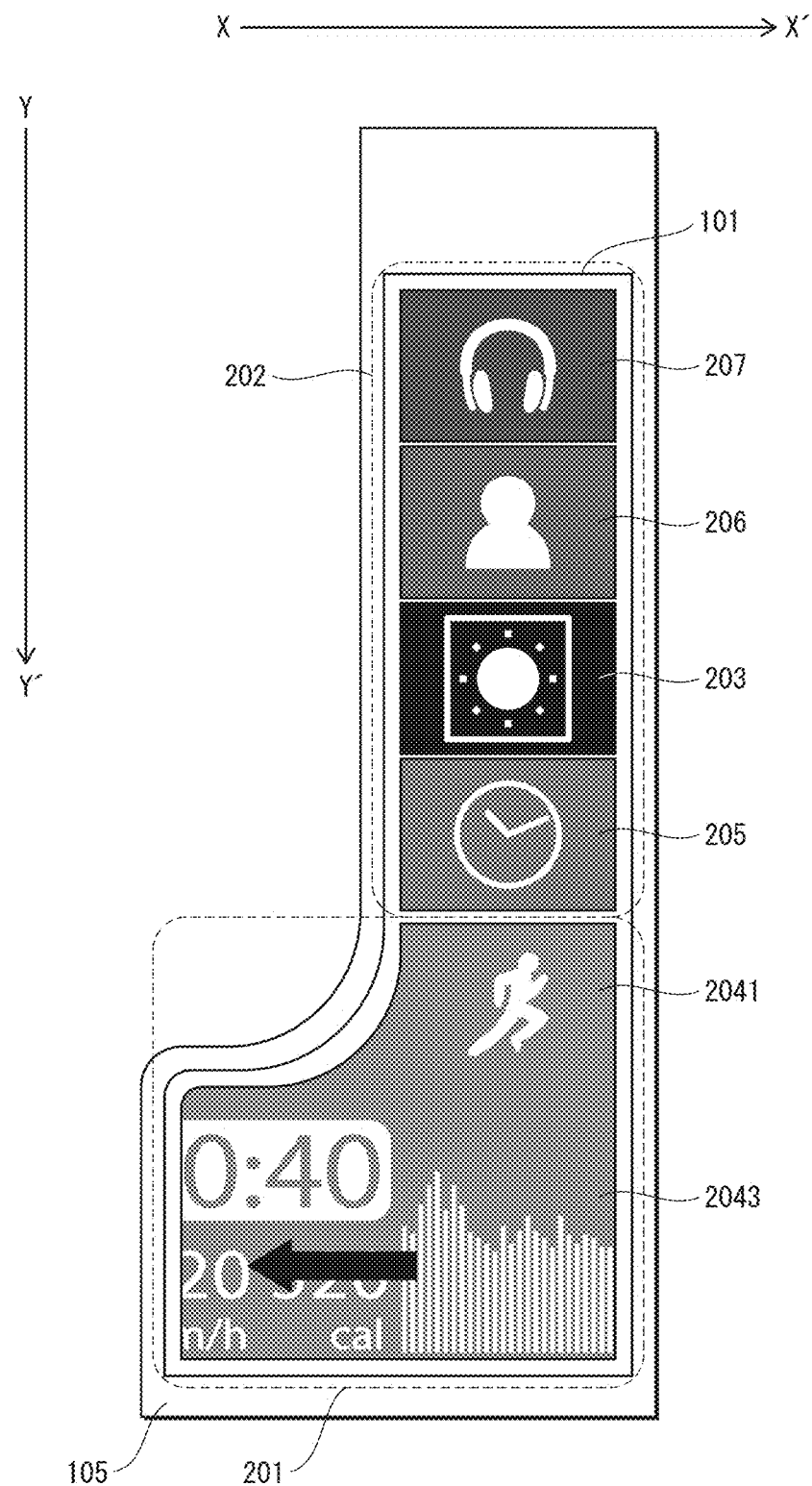

ELECTRONIC DEVICE

CROSS REFERENCE TO RELATED APPLICATION

This is a continuation application of PCT Application No. PCT/JP2013/007707 filed Dec. 27, 2013, designating the United States of America, the disclosure of which, including the specification, drawings and claims, is incorporated herein by reference in its entirety.

TECHNICAL FIELD

The present disclosure is related to electronic devices that have a display.

BACKGROUND ART

Among electronic devices that have a display there are electronic devices used as multimedia devices on which a variety of programs are installed. Using such an electronic device, a user may select a program that they wish to use quickly from among the variety of programs, and in order to display a selected program in a way that is easy for the user to use, a variety of graphical user interfaces have been made (for example, see Patent Literature 1).

FIG. 33A and FIG. 33B illustrate a graphical user interface of a conventional electronic device disclosed in Patent Literature 1. In FIG. 33A, due to a touch operation on a touch panel overlaid on a display screen, an icon 1710 corresponding to one program among a plurality of programs displayed within a region 120 is dragged to a wide region on the display screen, causing a program corresponding to the icon 1710 to be started up. As a result, as illustrated in FIG. 33B, an image 1720 is displayed on the display screen, showing that the application is being executed.

CITATION LIST

Patent Literature

[Patent Literature 1]
Japanese Patent Application Publication No. 2009-217815

SUMMARY

Technical Problem

However, a display of an electronic device does not necessarily have a large screen area like a display of a television, smartphone, tablet terminal, etc. Thus, further improvements are needed for electronic devices having a limited display screen, for example.

In view of the above problem, the present disclosure provides an electronic device that increases both visibility and selectability of executable programs.

Solution to Problem

In order to achieve the above aim, one aspect of the present disclosure is an electronic device including: a display having an elongated shape and configured to display images; a memory configured to store a plurality of programs; and a processor configured to perform execution control and display control, the execution control being control related to execution of the programs, the display control being control related to the displaying by the display, in which the display has a display surface that is composed of a first region and a second region, the first region and the second region aligned in a longitudinal direction of the elongated display, the execution control includes a process of specifying one of the programs as a main program and specifying the rest of the programs as sub-programs, and the display control includes a control of, when the main program and the sub-programs are specified, causing the display to display an image corresponding to the main program in the first region, and to display images corresponding to the sub-programs in the second region so that the images corresponding to the sub-programs are aligned in the longitudinal direction, the image corresponding to the main program including an image generated by execution of the main program.

Advantageous Effects

The electronic device pertaining to one aspect of the present disclosure is able to indicate to a user the presence of a plurality of sub-programs, without a decrease in visual perceptibility of an image corresponding to a main program.

BRIEF DESCRIPTION OF DRAWINGS

FIG. 3A is a diagram illustrating, in plan view, a shape and display state of a display included in the electronic device pertaining to embodiment 1.

FIG. 3B is a diagram illustrating, in plan view, a shape and display state of a display included in an electronic device pertaining to modification 1 of embodiment 1.

FIG. 3C is a diagram illustrating, in plan view, a shape and display state of a display included in an electronic device pertaining to modification 2 of embodiment 1.

FIG. 8C is a diagram illustrating a change of display state of the display in response to a flick operation in the longitudinal direction.

FIG. 8D is a diagram illustrating a change of display state of the display in response to a flick operation in the longitudinal direction.

FIG. 8E is a diagram illustrating a change of display state of the display in response to a flick operation in the longitudinal direction.

FIG. 8G is a diagram illustrating a change of display state of the display in response to a flick operation in the longitudinal direction.

FIG. 11A is a diagram illustrating a change of display state of the display in response to a drag operation.

FIGS. 13A, 13B, 13C, and 13D are diagrams illustrating changes in display state of the display in response to a drag operation in which a contact position moves from a second region 202 to a first region 201.

FIGS. 16A, 16B, and 16C are diagrams illustrating changes in display state of a modification causing scrolling of a display in response to a tap operation.

FIG. 17B is a diagram illustrating a change of display state of the display in response to a flick operation on the execution image.

EMBODIMENTS

Figure 1:
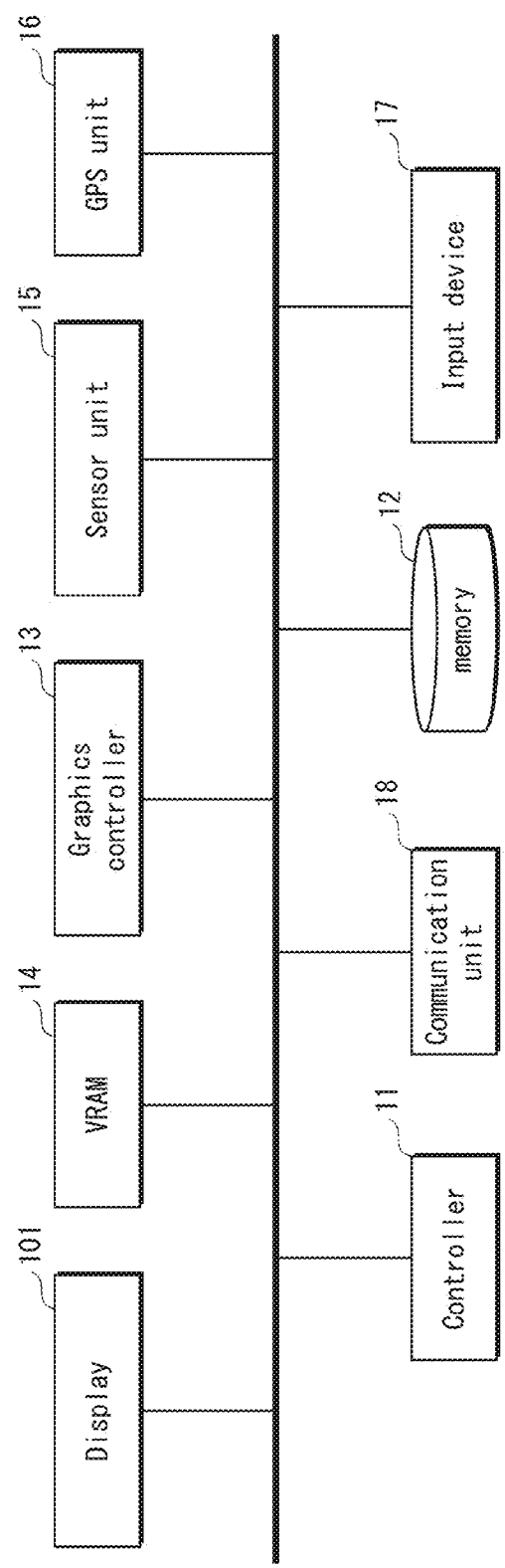
FIG. 1 is a diagram illustrating a hardware configuration of an electronic device pertaining to embodiment 1.

Circumstances that LED to One Aspect Pertaining to the Present Disclosure

As described above, a display of an electronic device does not necessarily have a large display area such as in a television, smartphone, and tablet terminal. For example, electronic devices such as wristwatches have been proposed that have multiple functions provided by multiple programs, but a screen area of a display that can be provided for such an electronic device is limited. The conventional technology disclosed in Patent Literature 1 has an execution image showing that a program is being executed and a list of selectable programs accommodated on a single screen of a smartphone. However, when applied to a further truncated screen area of a display of an electronic device, display content of each program on the display tends to become small and hard to distinguish. Thus, visibility of the execution image of the program cannot be said to have been taken into account.

However, if, among multiple programs, a single program to be executed is allocated the display so that only the execution image of the single program is displayed, other selectable programs are not presented to the user, and therefore selectability of other programs cannot be said to have been maintained.

The above led the inventors to arrive at each aspect pertaining to the present disclosure.

That is, one aspect of the present disclosure is an electronic device including: a display having an elongated shape and configured to display images; a memory configured to store a plurality of programs; and a processor configured to perform execution control and display control, the execution control being control related to execution of the programs, the display control being control related to the displaying by the display, in which the display has a display surface that is composed of a first region and a second region, the first region and the second region aligned in a longitudinal direction of the elongated display, the execution control includes a process of specifying one of the programs as a main program and specifying the rest of the programs as sub-programs, and the display control includes a control of, when the main program and the sub-programs are specified, causing the display to display an image corresponding to the main program in the first region, and to display images corresponding to the sub-programs in the second region so that the images corresponding to the sub-programs are aligned in the longitudinal direction, the image corresponding to the main program including an image generated by execution of the main program.

In the electronic device pertaining to one aspect of the present disclosure, the first region may be arranged at the center of the front side of the electronic device, and the second region may be arranged in a direction away from the center to an end portion. Thus, even when the electronic device has limited area for mounting the display, an image corresponding to a main program and images corresponding to sub-programs can be displayed continuously, from the first region to the second region, or that is, from a front side of the electronic device to an end portion of the electronic device.

Further, due to causing an image corresponding to a main program to be displayed in the first region of the display and images corresponding to sub-programs to be displayed in the second region of the display, the electronic device pertaining to one aspect of the present disclosure is able to indicate to a user the presence of a plurality of sub-programs, without a decrease in visual perceptibility of an image corresponding to a main program.

A second aspect of the present disclosure is the first aspect, in which, for example, a width of the second region in a direction perpendicular to the longitudinal direction may be equal to or less than a width of a narrowest portion of the first region.

In recent years, in the field of organic EL displays and liquid crystal displays, manufacturing of displays having shapes other than rectangular shapes (irregular-shaped displays) are becoming possible. In view of manufacturing technology for such displays and program rendering technology, there is a demand for improving both visual perceptibility and selectability. However, at present, no technology has been made that achieves both visual perceptibility and selectability, in view of display manufacturing technology and program rendering technology.

According to this aspect, even when for example the space of the electronic device on which the display can be arranged is not rectangular, the display area of the display can be enlarged by using an irregular-shaped display that is not rectangular and has a narrow second region to make effective use of the space. Further, in the irregular-shaped display that is not rectangular, an image corresponding to a main program is displayed in the first region, which has relatively great width. Accordingly, decrease in visual perceptibility of an execution image is avoided.

A third aspect of the present disclosure is the second aspect, in which, for example, each of the images corresponding to the sub-programs may be an icon image indicative of a corresponding one of the sub-programs.

According to this aspect, by displaying icon images corresponding to the sub-programs in the second region, which has relatively small width, the user is able to readily recognize the programs that are sub-programs. This is since icon images need not be displayed with excellent visual perceptibility.

A fourth aspect of the present disclosure is the second aspect or the third aspect, in which, for example, the image corresponding to the main program may further include an icon image indicative of the main program.

According this aspect, the user is able to readily recognize the program specified as the main program by viewing an icon image corresponding to the main program.

A fifth aspect of the present disclosure is any one of the second through fourth aspects, for example, further including a touch panel configured to detect a touch operation on the display surface, and in which the display control may further include an image movement control of, when the touch panel detects the touch operation, moving one of the images corresponding to the sub-programs, which are displayed in the second region, to the first region, and the execution control may include a main program switching process of, when said one of the images corresponding to the sub-programs is moved to the first region, specifying, as a new main program, one of the programs corresponding to said one of the images corresponding to the sub-programs.

This aspect enables intuitive operation via a touch operation, and improves the selectability of programs.

A sixth aspect of the present disclosure is the fifth aspect, in which, for example, the touch operation detected by the touch panel may be a flick operation along the longitudinal direction, and the processor, in the image movement control, may scroll each of an image displayed in the first region and images displayed in the second region in the longitudinal direction when the touch panel detects the flick operation.

According to this aspect, the direction of the flick operation matches the direction along which images corresponding to the sub-programs are arranged in line in the second region, and accordingly, the switching of the main program can be performed readily and intuitively.

A seventh aspect of the present disclosure is the sixth aspect, in which, for example, when the flick operation is directed from the second region to the first region, the moving of said one of the images corresponding to the sub-programs in the image movement control may be performed by scrolling, to the first region, an image that is positioned closest to the first region among images displayed in the second region.

According to this aspect, the switching of the main program can be performed such that programs are sequentially specified as the main program one at a time.

An eighth aspect of the present disclosure is the sixth aspect, in which, for example, the processor, in the image movement control, may determine a scrolling amount in the longitudinal direction in accordance with a speed of the flick operation detected by the touch panel, and the main program switching process may be performed by specifying, at a timing when the scrolling ends, one of the programs corresponding to an image positioned in the first region as the new main program.

According to this aspect, the user, by adjusting the speed of the flick operation, is able to speedily select a program that he/she would like to newly specify as the main program among a plurality of sub-programs whose images are displayed in the second region.

A ninth aspect of the present disclosure is the fifth aspect, in which, for example, the touch operation detected by the touch panel may be a drag operation along the longitudinal direction, the processor, in the image movement control, may scroll each of an image displayed in the first region and images displayed in the second region in the longitudinal direction when the touch panel detects the drag operation, and the main program switching process may be performed by specifying, at a timing when the scrolling ends, one of the programs corresponding to an image positioned in the first region as the new main program.

According to this aspect, the user, by adjusting the motion amount of the drag operation, is able to speedily select a program that he/she would like to newly specify as the main program among a plurality of sub-programs whose images are displayed in the second region.

A tenth aspect of the present disclosure is the fifth aspect, in which, for example, the touch operation detected by the touch panel may be a selection operation performed with respect to the second region and is at least one of a tap operation, a long tap operation, and a double-tap operation, the processor may further specify, as a selected image, one image among the images corresponding to the sub-programs, which are displayed in the second region, when the touch panel detects the selection operation, and the selected image may be moved to the first region in the image movement control.

According to this aspect, any sub-program can be nealy specified as the main program regardless of the order in which sub-programs are arranged in the second area, which improves the selectability of programs.

An eleventh aspect of the present disclosure is the fifth aspect, in which, for example, the touch operation detected by the touch panel may be at least one of a flick operation and a drag operation, performed with respect to the first region along the direction perpendicular to the longitudinal direction, and the display control may further include a control of replacing the image generated by execution of the main program with another image generated by execution of the main program, in accordance with the at least one of the flick operation and the drag operation along the direction perpendicular to the longitudinal direction detected by the touch panel.

According to this aspect, information generated by execution of a program specified as the main program is represented by using a plurality of screens, and the user is able to select such screens as appropriate.

A twelfth aspect of the present disclosure is any one of the second through fourth aspects, for example, further including an acceleration sensor configured to detect acceleration in the longitudinal direction, and in which the display control may further include an image movement control of, when the acceleration sensor detects the acceleration, moving one of the images corresponding to the sub-programs, which are displayed in the second region, to the first region by scrolling each of an image displayed in the first region and images displayed in the second region in the longitudinal direction, and the execution control may include a main program switching process of, when said one of the images corresponding to the sub-programs is moved to the first region, specifying, as a new main program, one of the programs corresponding to said one of the images corresponding to the sub-programs.

This aspect enables switching of the main program to be performed through an operation other than a touch operation. This is particularly useful in a usage form where the user is holding the electronic device with one of his/her hands, since the user does not need to perform operations by using the other hand.

A thirteenth aspect of the present disclosure is the twelfth aspect, in which, for example, when the acceleration detected by the acceleration sensor is equal to or greater than a predefined value, the moving of said one of the images in the image movement control may be performed by scrolling, to the first region, an image that is positioned closest to the first region among images displayed in the second region.

According to this aspect, the switching of the main program can be performed while utilizing the result of the acceleration detection, such that programs are sequentially specified as the main program one by one.

A fourteenth aspect of the present disclosure is the twelfth aspect, in which, for example, the processor, in the image movement control, may determine a scrolling amount in the longitudinal direction in accordance with a degree of acceleration detected by the acceleration sensor, and the main program switching process may be performed by specifying, at a timing when the scrolling ends, one of the programs corresponding to an image positioned in the first region as the new main program.

According to this aspect, the user, by appropriately controlling the movement resulting in detection of an acceleration degree by the electronic device, is able to speedily select a program that he/she would like to newly specify as the main program among a plurality of sub-programs whose images are displayed in the second region.

A fifteenth aspect of the present disclosure is any one of the second through fourth aspects, for example, further including an acceleration sensor configured to detect acceleration, and in which the display may have two operation states, one being a sleep state in which images are not displayed and the other being an active state in which images are displayed, and the processor, when the acceleration detected by the acceleration sensor is equal to or greater than a predefined value, may perform a control of switching the display from the sleep state to the active state.

According to this aspect, the user, through a movement resulting in detection of an acceleration degree by the electronic device, is able to readily switch display states.

The sixteenth aspect of the present disclosure is any one of the second through fifteenth aspects, in which, for example, a portion of the first region that connects to the second region may have a shape such that a width of the portion of the first region gradually increases as distance from the second region increases along the longitudinal direction.

According to this aspect, the first and second regions of the display, which have different maximum widths, can be connected to one another smoothly.

A seventeenth aspect of the present disclosure is the sixteenth aspect, in which, for example, at least one side of the display surface may be curved at the portion of the first region.

According to this aspect, the portion of the display where width gradually increases is provided with a smooth shape, whereby aesthetics of the electronic device is improved.

The eighteenth aspect of the present disclosure is any one of the second through seventeenth aspects, in which, for example, the second region may be composed of two portions, and the first region may be positioned between the two portions of the second region.

According to this aspect, the second region, which has relatively small width, is provided at both sides of the first region. As such, even if the space where the display can be arranged is limited in the electronic device, the limited space can be used effectively while improving visual perceptibility.

A nineteenth aspect of the present disclosure is the fifth aspect, in which, for example, a portion of the first region that connects to the second region may have a shape such that a width of the portion of the first region gradually increases as distance from the second region increases along the longitudinal direction, and when one image among the images corresponding to the sub-programs, which are displayed in the second region, is touched, the processor may move said one of the images corresponding to the sub-programs to the first region in the image movement control by performing (i), (ii), and (iii) in the stated order:

(i) displaying said one of the images corresponding to the sub-programs in the portion of the first region and displaying the image corresponding to the main program in the rest of the first region;

(ii) displaying said one of the images corresponding to the sub-programs in the portion of the first region and displaying said one of the images corresponding to the sub-programs and the image corresponding to the main program in the rest of the first region; and (iii) displaying said one of the images corresponding to the sub-programs to cover an entirety of the first region.

According to this aspect, the switching of the main program can be visually recognized through the change in the image displayed in the first region.

A twentieth aspect of the present disclosure is any one of the second through nineteenth aspects, for example, further comprising a casing that holds the display, the memory, and the processor, and in which the display and the casing may be deformable such that the longitudinal direction extends along a circumferential direction of a cylindrical shape.

A twenty-first aspect of the present disclosure is the twentieth aspect, in which the casing, when deformed, may have a cylindrical shape.

A twenty-second aspect of the present disclosure is the twentieth aspect, in which the casing, when deformed, may be attachable to a part of a human body.

Any of the twentieth through twenty-second aspects of the present disclosure improves the portability of the electronic device, and enables various applications of the electronic devices, such as to a wrist-watch-type device.

The following is a description of each aspect of the electronic device pertaining to the present disclosure, with reference to the drawings.

Embodiment 1

FIG. 1 is a diagram illustrating a hardware configuration of an electronic device pertaining to embodiment 1 of the present disclosure. The electronic device illustrated in FIG. 1 includes a display 101, a controller 11, a memory 12, a graphics controller 13, VRAM 14, a sensor unit 15, a GPS unit 16, an input device 17, and a communication unit 18.

The display 101 is an organic EL display. As illustrated in FIG. 3A, a display surface of the display 101 forms an elongated shape and includes a first region 201 and a second region 202 aligned in a longitudinal direction indicated by Y-Y'. A width of the display surface in an X-X' direction perpendicular to the longitudinal direction is different in the first region 201 and the second region 202. A width of the second region 202 is equal to or less than the narrowest portion of the first region 201.

Figure 2:
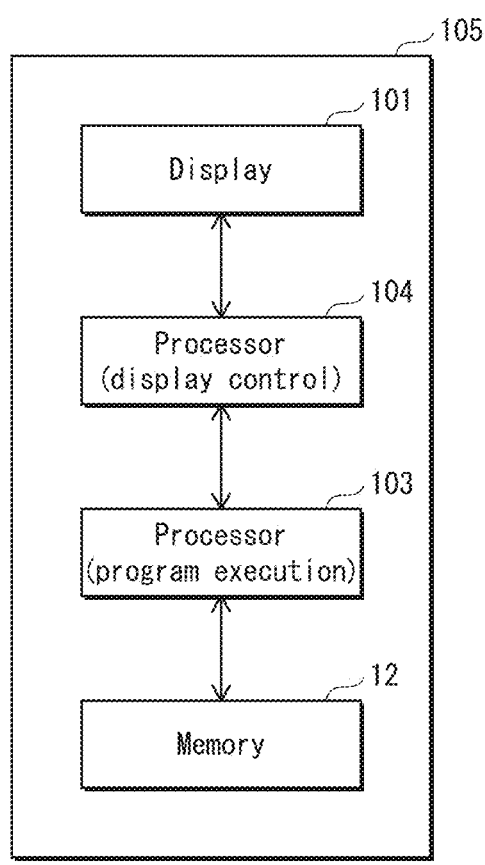
FIG. 2 is a diagram illustrating an example of the electronic device pertaining to embodiment 1 that includes a multiprocessor.

The controller 11 has RAM and a processor such as a CPU. By executing in the CPU a control program stored in the memory 12, the controller 11 implements functions controlling operations of the electronic device. Functions implemented by execution of a control program by the controller 11 include a control function related to executing an application program and a control function related to display on the display 101. The functions above may all be implemented by a single processor, or a plurality of processors may each implement a different function. FIG. 2 is a diagram illustrating a multiprocessor configuration in which a function of program execution controls and a function of display controls are each implemented by a different processor. Program execution controls implemented by the processor 103 include, for example, specifying one application program from a plurality of application programs as a main program, specifying the other application programs as sub-programs, executing the main program, and stopping sub-programs. Display controls implemented by the processor 104 include, for example, generating image data for display on the display 101 and writing the image data to the VRAM 14.

The memory 12 is a nonvolatile memory that stores control programs that are an OS of the electronic device, a plurality of application programs (hereafter, "programs"), and icon images that are managed by IDs that each correspond to one of the programs. In the present embodiment, five programs (programs A-E) managed by IDs A-E are stored in the memory 12.

The graphics controller 13 periodically reads image data written to the VRAM 14 by the controller 11, generates an image signal, and outputs the image signal to the display 101.

The VRAM 14 has a storage region to which the image date to be displayed on the display 101 can be written.

The sensor unit 15 includes a temperature sensor, pressure sensor, etc. Sensing data obtained via each sensor of the sensor unit 15, GPS data obtained via the GPS unit 16, and user operation data obtained via the input device 17 can be used in execution of the programs of the controller 11.

The communication unit 18 includes a first communication unit that performs 1-to-1 data transmission via a communication scheme (method A) for peer-to-peer mobile communication, and a second communication unit that performs 1-to-N data transmission via a communication scheme (method B) for specified low-power wireless communication. The method A corresponds to peer-to-peer communication between mobile terminal devices such as smartphones and iPhones, for example Bluetooth (registered trademark) communication. The method B is for 1-to-N communication between one information processing device and N wristband electronic devices. A communication control program of the electronic device, in response to an instruction from a program being executed, specifies one of the method A and the method B, and orders the communication unit to perform data transmission. Among programs indicated by program icons in the second region and executed by the electronic device, a program having a sports watch function is assumed to exist. When a time count is requested from a user, the program begins count processing, and subsequently, intermittently, transmits measurement data linked with an ID of the user to the information processing device and a mobile terminal. The information processing device and the mobile terminal receive the measurement data and sort the measurement data for each user. In this way, a score for each user can be managed.

When executing the above intermittent data transmission, the communication control program may also perform a status display to visualize data transmission being executed in a lower end of the first region. The status display includes an indicator of the method A and an indicator of the method B, and indicates whether communication being executed corresponds to one of the method A, the method B, and both the method A and the method B. The indicator includes a character string display that indicates a name of a communication method, a logo display, a battery level display, a signal strength display, and a use frequency display. A user can refer to the character string display, logo display, battery level display, signal strength display, and use frequency display from which the method A indicator and/or method B indicator is composed, and thereby understand what data transmission is being executed in the background.

The above describes a hardware configuration of the electronic device pertaining to embodiment 1. The following is a description of display states of the display 101.

FIG. 3A is a diagram in plan view illustrating an example of a shape and display state of the display 101 included in the electronic device pertaining to embodiment 1 of the present disclosure. In FIG. 3A, 105 is a casing that holds the display 101. In a first display region 201 of the display 101 (hereafter, "first region 201"), an image 203 is displayed that corresponds to a program A that is specified as the main program. In a second display region 202 (hereafter, "second region 202"), images 204-207 are lined up in the longitudinal direction of the display surface and displayed, corresponding to a plurality of programs B-E that are specified as sub-programs.

The image corresponding to the program A that is specified as the main program and displayed in the first region 201 is, for example, a visualization of information generated by execution of the program A, i.e., a display image generated by execution of the program A. Further, the images corresponding to the plurality of programs B-E that are specified as sub-programs and displayed in the second region 202 are, for example, icon images indicating information of the programs B-E, respectively.

Figures 4A, 4B:
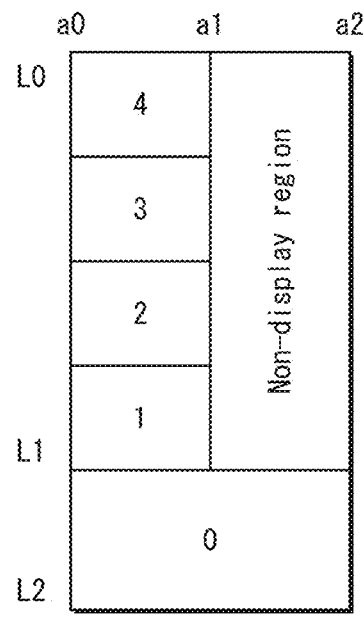
FIG. 4A is a schematic diagram illustrating a display region of a display 101 in association with a storage region of VRAM 14.
FIG. 4B is a diagram illustrating one example of an arrangement table linking each storage region of the VRAM 14 to a corresponding program ID.

In order to implement such display states, the VRAM 14 has, as illustrated in FIG. 4A, a storage region 0 where image data to be rendered in the first region 201 is stored, and storage regions 1, 2, 3, and 4 where image data to be rendered in the second region 202 is stored. The graphics controller 13 reads data stored at addresses from a0 to a1, on lines from L0 to L1, which make up the storage regions 1-4 of the VRAM 14, and generates from the data an image signal to display in the second region 202. The graphics controller 13 reads data stored at addresses from a0 to a2, on lines from L1+1 to L2, which make up the storage region 0, and generates from the data an image signal to display in the first region 201.

The plurality of the programs and each corresponding icon image are managed by common IDs, and the IDs are associated with storage regions of the VRAM 14 according to the arrangement table illustrated in FIG. 4B. Specifically, the arrangement table is stored in the memory 12, and five IDs of programs are registered at P0-P4, which correspond to the storage regions 0-4 of the VRAM 4. In the program execution control executed at the processor 103, a program to be specified as the main program is determined by acquiring from the arrangement table the ID registered at P0. Further, programs to be specified as sub-programs are determined by acquiring from the arrangement table the IDs registered at P1-P4.

In the example illustrated in FIG. 4B, in correspondence with the display state illustrated in FIG. 3A, the IDs A-E of programs are registered at P0-P4.

The following is a description of specific examples of the programs A-E in the present embodiment.

The program A that is managed by the ID A is a program related to a weather forecast. The image generated by executing the program A is, for example, an image showing weather forecast content using sensing data obtained by using a temperature sensor and an air pressure sensor. An icon image showing information of the program A is, for example, a symbol of a sun that is an abstracted representation of weather.

A program B is a program used in management of running distance, etc., by using the program B while jogging. An image generated by executing the program B is, for example, an image showing running time, running distance, etc., measured using GPS data. An icon image showing information of the program B is, for example, a symbol that is an abstracted representation of a running person.

A program C is a program related to time. An image generated by executing the program C is, for example, an image showing a current time. An icon image showing information of the program C is, for example, a symbol that is an abstracted representation of time.

A program D is a program used in management of personal information. An image generated by executing the program D is, for example, an image showing a personal facial photo and profile. An icon image showing information of the program D is, for example, a symbol that is an abstracted representation of a bust of a person.

A program E is a program related to music playback. An image generated by executing the program E is, for example, an image showing buttons for music operations such as playback, fast-forward, rewind, etc. An icon image showing information of the program E is, for example, a symbol that is an abstracted representation of headphones. Note that in the case of the program E, executing the program does not only display an image, but can also playback music and output audio. In such a case, the electronic device is provided with a speaker and/or provided with an earphone jack.

Aside from the examples of programs indicated above, the electronic device may be provided with a communication function and programs such as a program for communicating between external terminals and a program for performing communication via text data such as e-mail.

Figure 5:
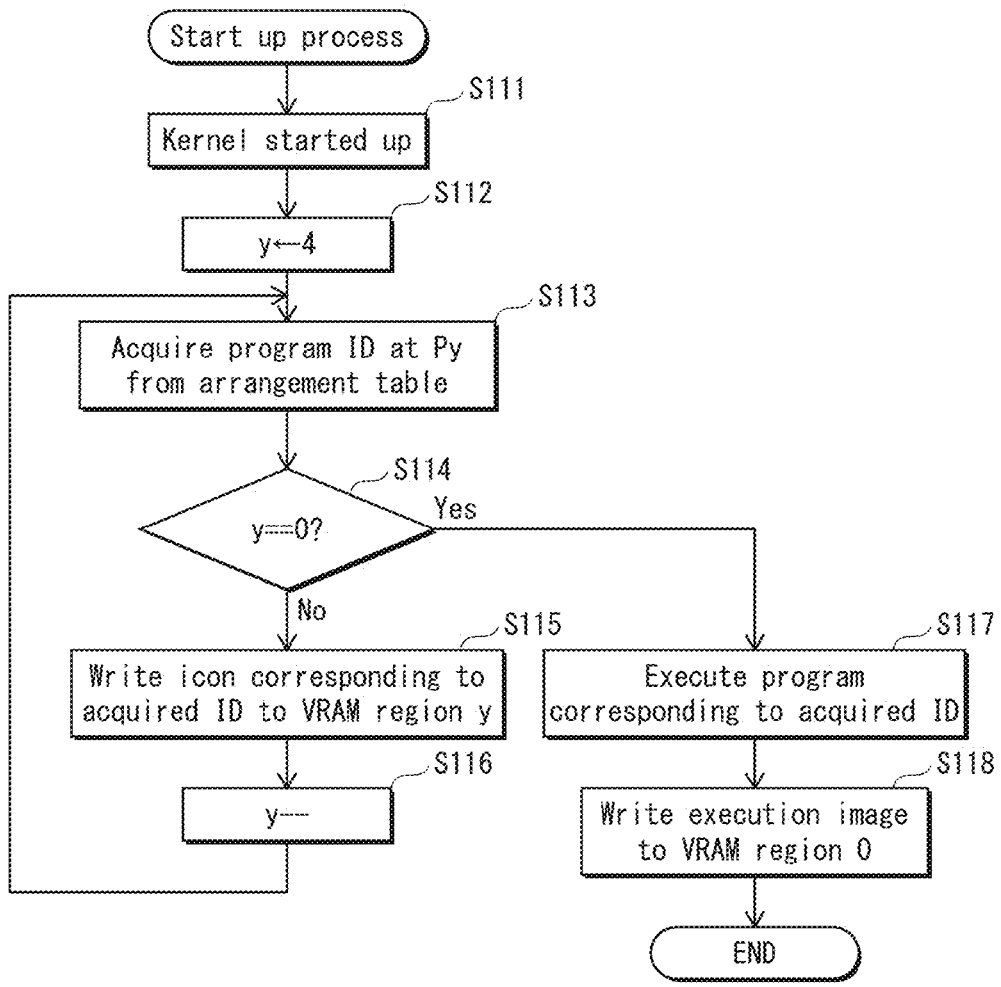
FIG. 5 is a flowchart illustrating a start up process of the electronic device pertaining to embodiment 1.

The following is a description, using FIG. 5, of how display of an image is included in a start-up process executed by the controller 11 when the electronic device is powered on.

In the start-up process, each processor of the controller 11 loads a control program from the memory 12, and a kernel of the control program is started up (step S111). According to control by the kernel that is started up, the processor 103 initializes a variable y that indicates a storage region number of the VRAM 14, setting y to four (step S112). Subsequently, according to control by the kernel, a loop process of steps S113-S166 is executed.

In the loop process, first, the processor 103 acquires an ID stored at Py, from the arrangement table registered in the memory 12 (step S113). When y has a value of 4-1, the process of step S113 causes a program managed by the ID so acquired to be specified as a sub-program by acquiring the ID registered at P4-P1 of the arrangement table. Further, when y has a value of 0, the process of step S113 causes a program managed by the ID so acquired to be specified as the main program by acquiring the ID registered at P0 of the arrangement table.

Subsequent to step S113, whether or not the variable y has a value of 0 is determined, i.e. whether or not a processing target is storage region 0, (step S114). If the variable y does not have a value of 0 ("No" at step S114), the processor 104 reads the icon image corresponding to the ID acquired at step S113 from the memory 12, and writes the icon image to the storage region y of the VRAM 14 (step S115). Subsequently, the variable y is decremented and processing returns to step S113.

If the variable y has a value of 0 in the determination at step S114 ("Yes" at step S114), the processor 103 executes the program corresponding to the ID acquired at step S113 (step S117), the processor 104 generates an image visualizing information generated by the execution of the program, and writes the generated image to the storage region 0 of the VRAM 14 (step S118). Start-up processing is completed by the above order, and the display of the display 101 is determined based on the image date stored by the VRAM 14.

Figure 6:
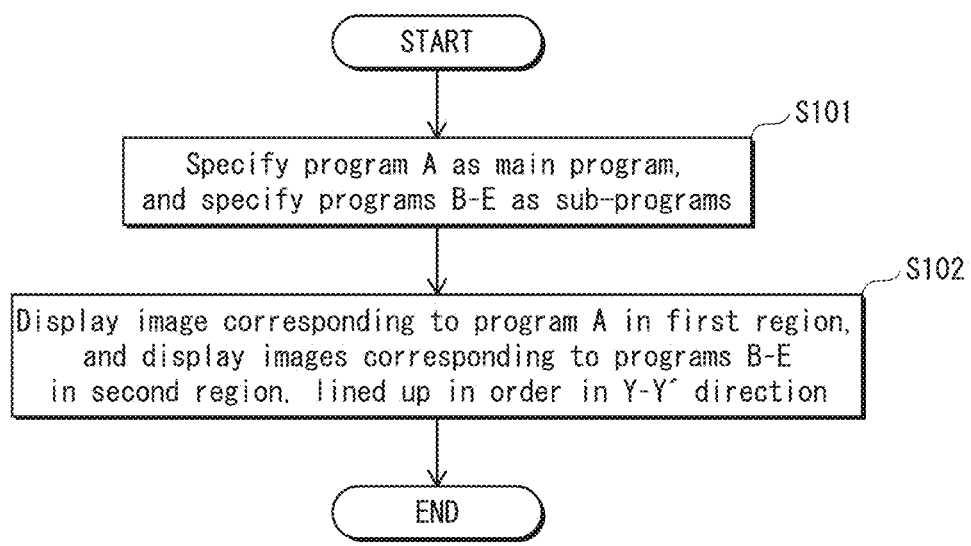
FIG. 6 is a flowchart illustrating display processing of the electronic device pertaining to embodiment 1.

Next is a description, using FIG. 6, of specific display processing by the electronic device pertaining to embodiment 1 of the present disclosure. FIG. 6 is a flowchart illustrating display processing of the electronic device pertaining to embodiment 1.

First, the processor 103, which controls execution of programs, reads the programs A-E stored in the memory 12, references the arrangement table, specifies the program A from among the programs A-E as the main program, and specifies the programs B-E as sub-programs (step S101).

Subsequent to specifying the main program and sub-programs, the processor 104, which controls display of the display, displays the image 203 that corresponds to the program A that is specified as the main program in the first region 201, and displays the images 204-207 that each correspond to a respective one of the programs B-E that are specified as sub-programs in the second region 202, lined up in the longitudinal direction (Y-Y' direction) (step S102). At this time, the images 204-207 are displayed in sequence from an end of the second region 202 nearest to the first region 201 towards the other end of the second region 202, so as to be in an order of the IDs registered at P1-P4 of the arrangement table. As a result, the display 101 shows a display illustrated in FIG. 3A.

Note that in the present embodiment, an example is given in which a program to be specified as the main program is set in advance in the arrangement table, and according to this setting the processor 103 specifies the program A as the main program. However, as a method of selecting the program A as the main program, a user may perform selection by operating the electronic device via the input device 17.

Further, in the present embodiment, an example is given in which the images corresponding to the programs B-E that are specified as sub-programs are displayed lined up in the longitudinal direction in the order E, D, C, B from Y towards Y' in the second region 202. However, an ordering of the images in the second region 202 is not necessarily an order set by the IDs in the arrangement table that is stored in advance in the electronic device. For example, the electronic device may be configured such that the ordering of the images in the second region 202 is random. The electronic device may also be configured such that a user sets any order by operating the electronic device. Alternatively, from the end of the second region 202 nearest to the first region 201 towards the other end of the second region 202, in a sequence of descending or ascending order of the IDs of corresponding programs, the processor 104 may line up and display the images corresponding to the programs B-E.

Further, an example is given in which the processes of step S101 and step S102 are each executed by a corresponding one of the processor 103 and the processor 104, but the electronic device is not limited in this way. The electronic device may be configured such that all processing is executed by a single processor. Further, at least one of the processes of step S101 and step S102 may use a plurality of processors, and the electronic device may be configured such that the processes of step S101 and step S102 are executed by three or more processors.

SUMMARY

In the electronic device pertaining to embodiment 1 of the present disclosure as described above, in an atypical non-rectangular display having a wide first region and a narrow second region, visibility of the execution image of the main program is increased by causing the image generated by execution of the program specified as the main program to be displayed in the first region. Further, by displaying the icon images of the programs specified as sub-programs in the second region, sub-programs are made easy to understand and usability related to switching between the main program and sub-programs is increased.

Note that in FIG. 3A, four images 204-207 are displayed in the second region 202, corresponding to the programs B-E specified as sub-programs, but the number of images displayed in the second region 202 is not limited to four, and may be less than or greater than four. For example, the electronic device may be configured to display three icon images corresponding to three sub-programs lined up in the longitudinal direction in the second region. Alternatively, the electronic device may be configured to display five icon images corresponding to five sub-programs lined up in the longitudinal direction in the second region.

Further, in FIG. 3A, an example of the display 101 in which the first region 201 and the second region 202 each have a rectangular shape is illustrated, but the shape of the display is not necessarily limited to being rectangular. For example, at least one of the first region 201 and the second region 202 may have a polygonal shape having five or more sides whose vertices form an angle other than 90 degrees. Alternatively, the shape of the display may have at least one corner formed by a curved line rather than a right angle.

Further, in FIG. 3A, a right side of the first region 201 and the second region 202 are aligned along the same straight line and a left side of the first region 201 projects farther outward than an extension of the left side of the second region 202. However, the shape of the display is not limited in this way. For example, the shape of the display may be a mirror image of the shape illustrated in FIG. 3A. Alternatively, the shape of the display may be such that both the left side and the right side of the first region 201 project farther outward than both an extension of the left side and the right side of the second region 202, respectively.

(Modification)

Referring to FIG. 3B, the following is a description of a shape and display state of the display with respect to an electronic device pertaining to modification 1 of embodiment 1. FIG. 3B is a diagram illustrating, in plan view, an example of the shape and the display state of the display included in the electronic device pertaining to modification 1. In FIG. 3B, elements that are the same as those illustrated in FIG. 3A have the same symbols and are not described here. Only characterizing features that are different from FIG. 3A are described here.

In FIG. 3B, a characterizing feature is that the shape of the first region 201a is different from the shape of the first region 201 in FIG. 3A. In the first region 201a, an end of a portion 201b that connects to the second region 202 has a width that is the same as the width of the second region 202. In the longitudinal direction from Y towards Y', i.e. from the end of the portion 201b that connects to the second region 202 away from the second region 202, the width of the portion 201b gradually increases. In modification 1, viewing a display surface of the display 101 in plan view, a left side of the portion 201b that is a portion of the first region 201a is curved. By making the display 101 such a shape, the first region 201a and the second region 202 are connected smoothly.

Note that in FIG. 3B, the portion 201b that gradually increases in width has a shape such that one side widens outwards, but the other side may also widen outwards. Further, the left side of the portion 201b has a shape that widens outwards in a curve, but the left side is not limited in this way and may have a shape that widens outwards in a straight line.

The following is a description of the display state of the display in modification 1. As illustrated in FIG. 3B, in the display state of the display in modification 1, as an image 203a corresponding to the program A that is specified as the main program, not only an image generated by execution of the program A, but also an icon image managed by the same ID as the program A is displayed in the first region 201a. In the display state, the icon image is displayed in the portion 201b that gradually increases in width, and the image generated by the execution of the program A is displayed in a remaining portion of the first region 201a that has a constant width.

Referring to FIG. 3C, the following is a description of a shape and display state of the display with respect to an electronic device pertaining to modification 2 of embodiment 1. FIG. 3C is a diagram illustrating, in plan view, an example of the shape and the display state of the display included in the electronic device pertaining to modification 2. In FIG. 3C, elements that are the same as those illustrated in FIG. 3A have the same symbols and are not described here. Only characterizing features that are different from FIG. 3A are described here.

In modification 2 illustrated in FIG. 3C, a characterizing feature is that a region showing images corresponding to programs specified as sub-programs is composed of two portions, a second region 202a and a second region 202b. In the longitudinal direction, lined up from Y and towards Y', the display 101 is composed of the second region 202a, the first region 201, and the second region 202b. In other words, the first region 201 is positioned between the second region 202a and the second region 202b. A width of the second region 202a and a width of the second region 202b are narrower than a width of the first region 201. The width of the second region 202a and the width of the second region 202b may be the same, or one may be wider than the other.

The following is a description of the display state of the display in modification 2. In the display state of the display in modification 2, icons corresponding to the programs specified as sub-programs are displayed divided up between the second region 202a and the second region 202b. In the example illustrated in FIG. 3C, images corresponding to the programs B-D that are specified as sub-programs are displayed in the second region 202a, and an image corresponding to the program E that is specified as a sub-program is displayed in the second region 202b.

Note that in FIG. 3C, an example is illustrated in which, among the four icons corresponding to the four programs that are specified as sub-programs, three are displayed in the second region 202a, and only one is displayed in the second region 202b. However, the number of icon images corresponding to sub-programs displayed in the second region 202b is not limited to one. Multiple icon images corresponding to programs specified as sub-programs may be displayed in the second region 202b. In such a case, the multiple icon images corresponding to programs specified as sub-programs displayed in the second region 202b are displayed lined up in the longitudinal direction of the display surface of the display 101 (in the Y-Y' direction).

Figure 3D:
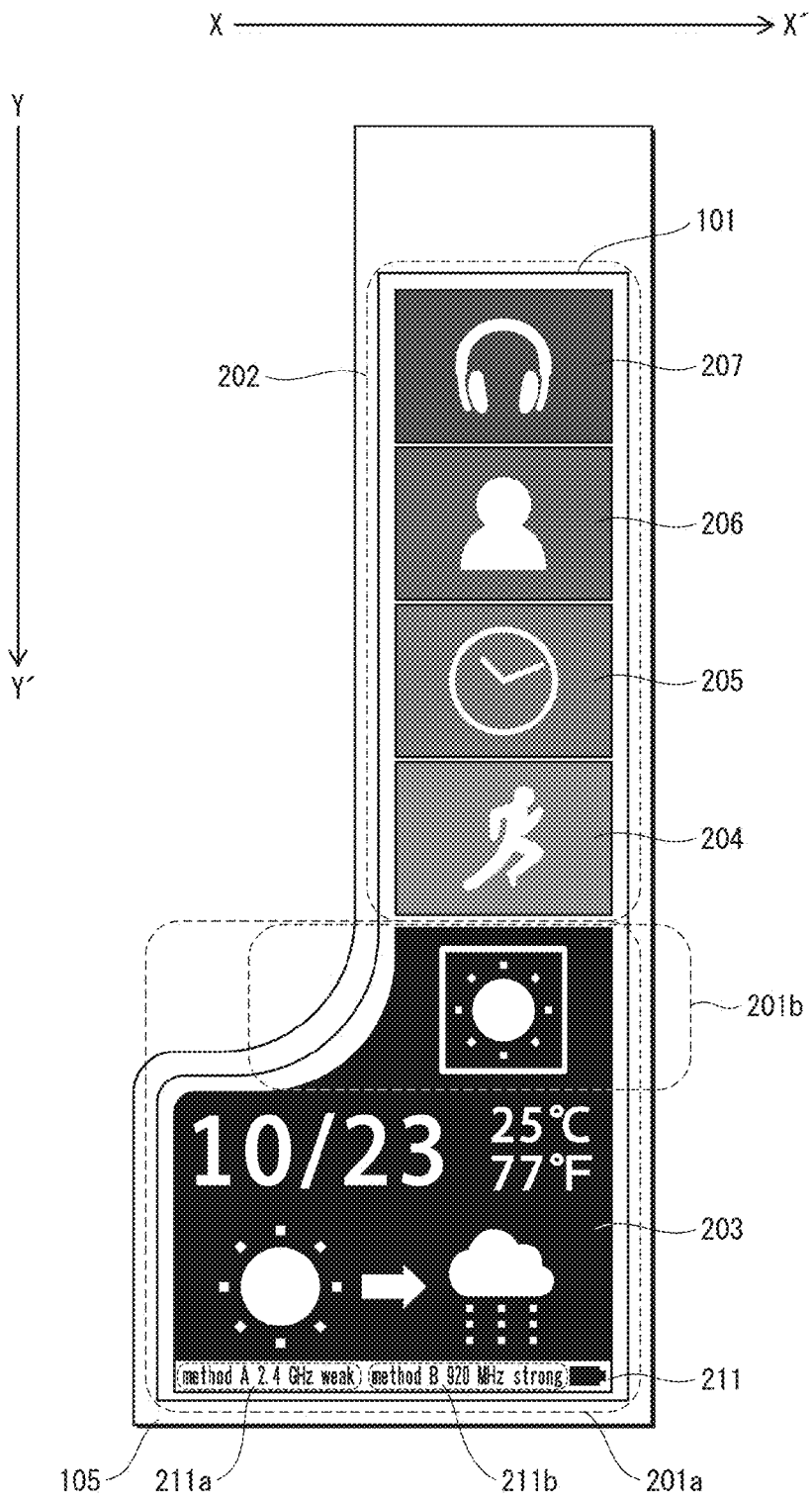
FIG. 3D is a diagram illustrating, in plan view, a shape and display state of a display included in an electronic device pertaining to modification 3 of embodiment 1.

Referring to FIG. 3D, the following is a description of a shape and display state of the display with respect to an electronic device pertaining to modification 3 of embodiment 1. FIG. 3D is a diagram illustrating, in plan view, an example of the shape and the display state of the display included in the electronic device pertaining to modification 3. In FIG. 3D, elements that are the same as those illustrated in FIG. 3B have the same symbols and are not described here. Only characterizing features that are different from FIG. 3B are described here.

In modification 3, illustrated in FIG. 3D, the shape of the display 101 is the same as in modification 1, illustrated in FIG. 3B, but the display state in the first region 201 is different from that of modification 1.

The difference between the display state of the display in modification 3 and the example illustrated in FIG. 3B is that a status display 211 is displayed at an end opposite the end of the first region 201 that connects to the second region 202.

The status display 211, when intermittent data transmission is being executed via the communication unit 18, is a region in which a status is displayed for visualizing data transmission being executed by the communication control program. The status display 211 includes an indicator 211a of the method A and an indicator 211b of the method B, and indicates whether communication being executed corresponds to one of the method A, the method B, and both the method A and the method B. The indicators include a character string display that indicates a name of a communication scheme, a logo display, a battery level display, a signal strength display, and a use frequency display.

Common features of the shape of the display in the examples illustrated in FIGS. 3B, 3C, and 3D as modifications 1-3, and in the example illustrated in FIG. 3A, are that (i) in plan view of the display surface, the first region and the second region are arranged and lined up in the longitudinal direction (the direction Y-Y'), and (ii) in the display surface, the width of the first region and the second region in a direction perpendicular (the direction X-X') to the longitudinal direction (the direction Y-Y'), are different; in particular, the width of the second region is less than or equal to the narrowest width of the first region.

Further, common features of the display state of the examples illustrated in FIGS. 3B, 3C, and 3D as modification 1-3, and in the example illustrated in FIG. 3A, are that (i) the image corresponding to the program specified as the main program is displayed in the first region, and (ii) the images corresponding to the programs other than the main program that are specified as sub-programs are displayed lined up in the longitudinal direction (the direction Y-Y') in the second region.

Embodiment 2

Figure 7:
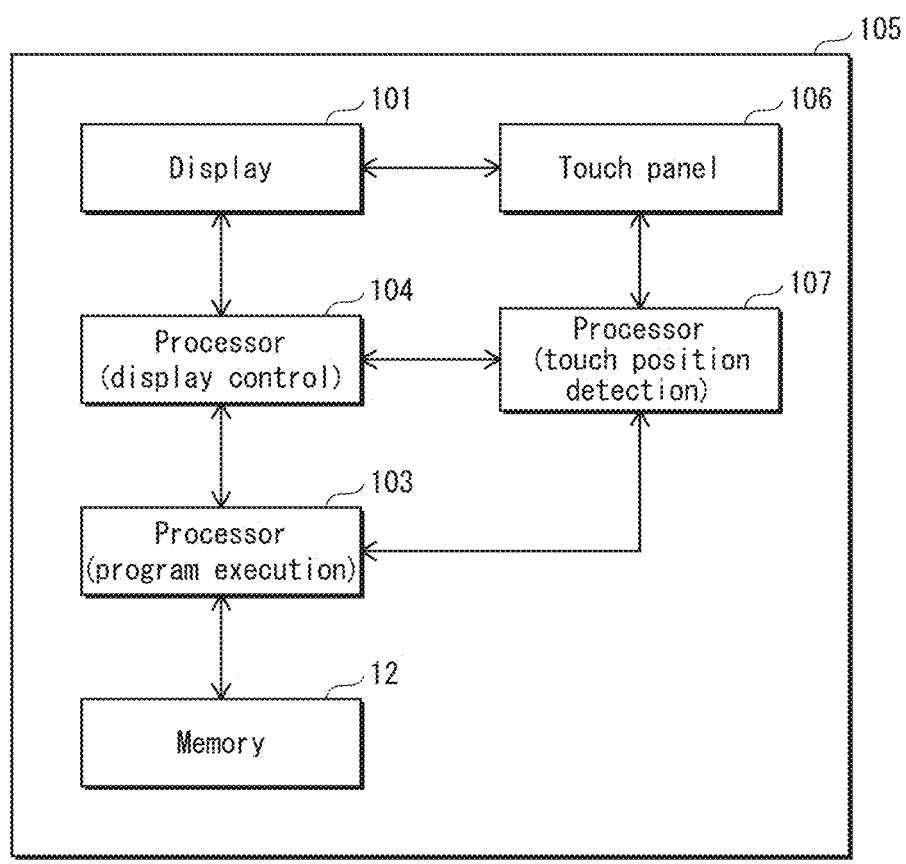
FIG. 7 is a diagram illustrating a configuration of an electronic device pertaining to embodiment 2.

The following is a description of embodiment 2, in which, by an operation of the electronic device, any sub-programs can be switched to being the main program. FIG. 7 is a diagram illustrating a configuration of an electronic device pertaining to embodiment 2. The configuration illustrated in FIG. 7, compared to the configuration illustrated in FIG. 2, has the additions of a touch panel 106 and a processor 107 held in the casing 105. In FIG. 7, elements that are the same as those illustrated in FIG. 2 have the same symbols and are not described here. Only characterizing features that are different from FIG. 2 are described here.

The touch panel 106 detects touch operations on the display surface of the display 101 made by an object such as a finger, a stylus, etc. As a method of detection of touch operations on the touch panel 106, a capacitive method, resistive method, surface acoustic wave method, etc., may be applied.

The processor 107, by execution of a control program and based on detection by the touch panel 106 of a touch operation, implements a function of detecting a touch position and changes thereto.

Further, as functions implemented by execution of a control program in the processor 103 and the processor 104, functions are added in addition to the functions described in embodiment 1.

An image movement control is added to display control functions of the processor 104, whereby the display is controlled such that, depending on detection of a touch operation by the touch panel 106, any of the icon images displayed in the second region 202 can be moved to the first region 201. Movement of an image due to the image movement control is implemented by moving image data stored by the VRAM 14 within the storage regions of the VRAM 14. For example, to move an image so as to scroll the image in one of the longitudinal direction and the width direction, processing is repeated that shifts the image data stored in the VRAM 14 one line at a time or multiple lines at a time in a scroll direction.

In the program execution control implemented in the processor 103, a function is added as a main program switching process, of switching the main program by specifying a new main program from among programs for which an icon is displayed in the second region 202, according to detection of a touch operation by the touch panel 106. In the main program switching process, by specifying a program corresponding to an image that is moved to the first region in the image movement control as the new main program, the display after the image movement control is performed and the new main program after the switching are made to correspond with each other.

Many examples are possible for specific touch operations and display changes of the display 101 for switching the main program. The following is a description of operations "flick", "drag", "tap", "long tap", and "double-tap" as specific examples of touch operations.

Note that "flick" is an operation to quickly move an object on the screen surface, "drag" is an operation to move an object while pushing the object on the screen surface, and "tap" is an operation to lightly hit an object on the screen surface. "Long tap" is an operation in which an object on the screen surface contacts the screen surface for a period of time greater than a predefined threshold. "Double-tap" is an operation in which an object is quickly tapped twice on the screen surface.

(1) Flick Operation 1

The following is a description, using FIGS. 8A-10, of states of main program switching and display changes of the display 101 due to a flick operation, which is one type of touch operation.

FIGS. 8A-8G illustrate, in plan view of the display, transitions and display changes of the display due to a flick operation until switching of the main program is complete. The basic configuration is the same as in FIG. 3B, and description of each symbol is omitted here.

Figure 9:
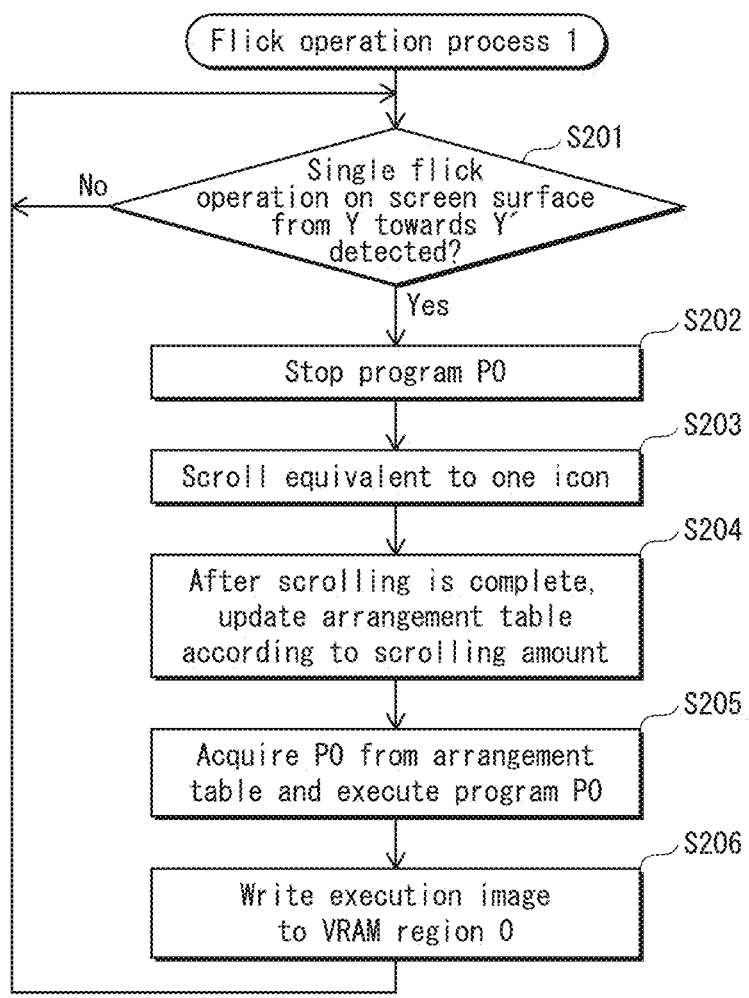
FIG. 9 is a flowchart illustrating processing when a flick operation in the longitudinal direction is detected.

FIG. 9 is a flowchart illustrating processing due to a flick operation. The following is a description, using the flowchart illustrated in FIG. 9, of processing due to a flick operation.

First, in an initial state, due to the processing described in embodiment 1, the image 203 corresponding to the program A that is specified as the main program is displayed in the first region 201 of the display 101, and the images 204-207 corresponding to the programs B-E that are specified as sub-programs are displayed lined up in the longitudinal direction in the second region 202 of the display 101.

Figure 8A:
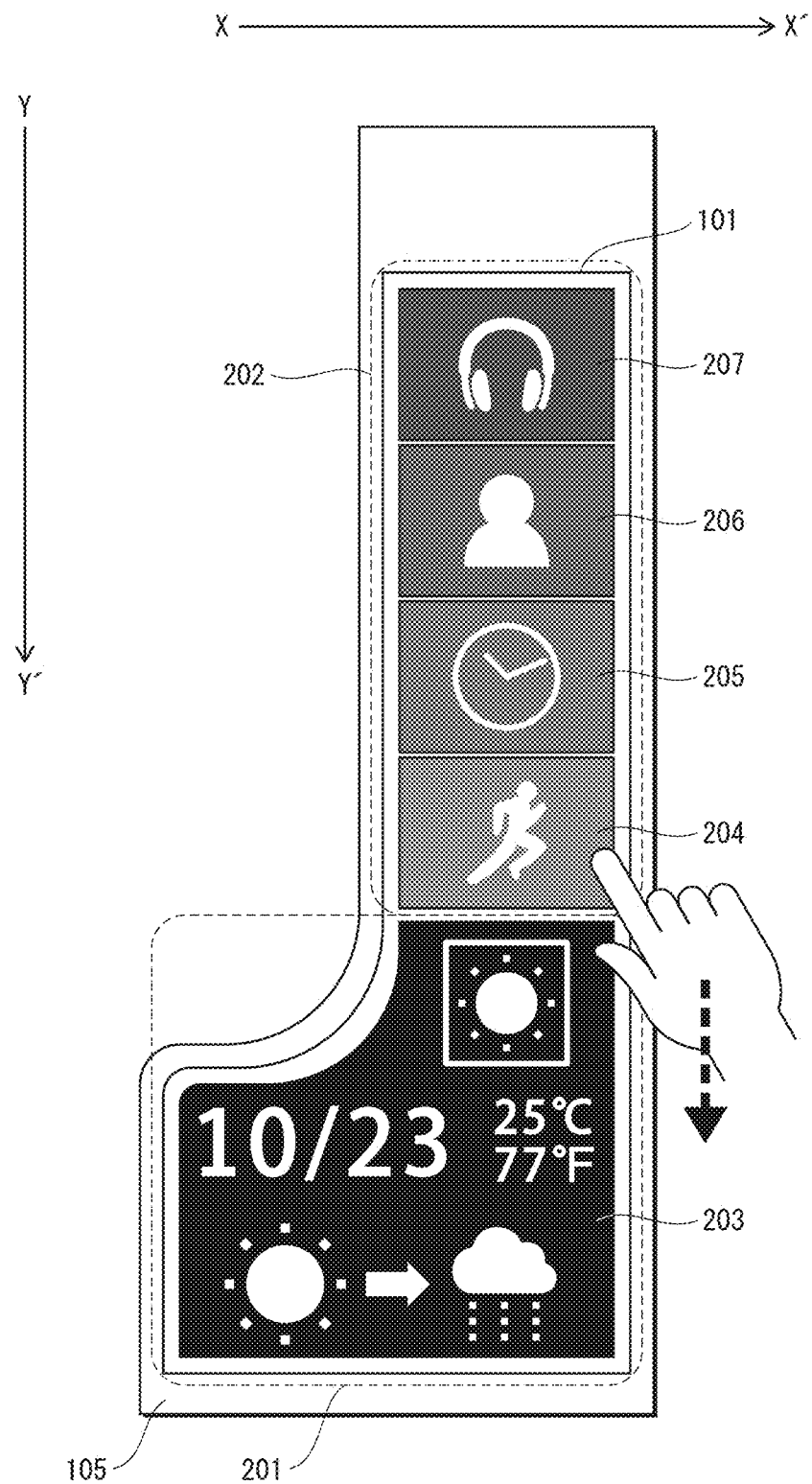
FIG. 8A is a diagram illustrating a change of display state of a display in response to a flick operation in a longitudinal direction.

Here, as illustrated in FIG. 8A, a user contacts the screen surface of the display 101, i.e. the touch panel 106, with a finger, and upon performing a single flick operation in the longitudinal direction from Y towards Y', in the direction indicated by the dashed arrow, the touch panel 106 detects the flick operation ("Yes" at step S201). Note that in order to distinguish the flick operation described here from a tap operation, etc.; a flick operation may be detected as such only when a contact position changes at a speed greater than or equal to a certain amount. Based on the touch detection result of the touch panel 106, the processor 107 calculates a touch position, a speed of movement of the touch position, etc., and notifies the processor 103 and the processor 104 of the results of the calculation.

Upon receiving notification of detection of a flick operation, the processor 103 stops execution of the program A, which is the main program and has an ID registered at P0 in the arrangement table (step S202). The processor 104 performs image movement control so as to scroll the images 203-207 corresponding to the programs A-E from Y towards Y' on the display of the display 101 (step S203).

In the image movement control, a scrolling amount is determined such that the icon image 204 corresponding to the program B, which is displayed at a position closest to the first region 201 in the second region 202 prior to scrolling beginning, is moved to the first region 201 after the scrolling ends. Due to the scrolling, the image 203 corresponding to the program A, which is displayed in the first region 201 prior to the scrolling beginning, is moved towards the bottom of the display 101, and is drawn disappearing from a bottom end of the display 101. Further, the images 205-207 corresponding to the programs C-E that are specified as sub-programs each move in the second region 202 a distance of one icon image in the direction from Y towards Y'. Further, an icon image of the program A, which was specified as the main program, is drawn so as to appear from a top end of the second region.

When the scrolling due to the image movement control of the scrolling amount equal to a distance of one icon image ends, the processor 103 updates the arrangement table illustrated in FIG. 4B by shifting the IDs registered therein one item to the left (step S204). Note that the ID registered at P0, which is at a left end of the arrangement table, is moved to a right end at P4.

Note that a method may be used by which the ID of each icon image written to each storage region of the VRAM 14 is acquired to update the arrangement table. Such a method involves the processor 104 notifying the processor 103 of the ID of each icon image written to each storage region of the VRAM 14 after the scrolling has ended, enabling updating of the arrangement table by the processor 103.

After updating the arrangement table, the processor 103 acquires the ID registered at P0 and executes the program corresponding to the acquired ID (step S205). The processor 104 generates image data for an image visualizing information generated by the execution of the program, and writes the generated image data to the VRAM 14 (step S206).

According to the processing order described above with reference to FIG. 9, in response to a single flick operation in the longitudinal direction (Y-Y' direction) detected by the touch panel 106, the image 204, which was positioned closest to the first region among the images 204-207 displayed in the region 202 prior to the flick operation, is moved to the first region 201, and the program B that corresponds to the image 204 is specified as the new main program.

FIGS. 8B-8G illustrate, in order, the transition of the display of the display 101 due to the execution of the processing order described above.

Figure 8B:
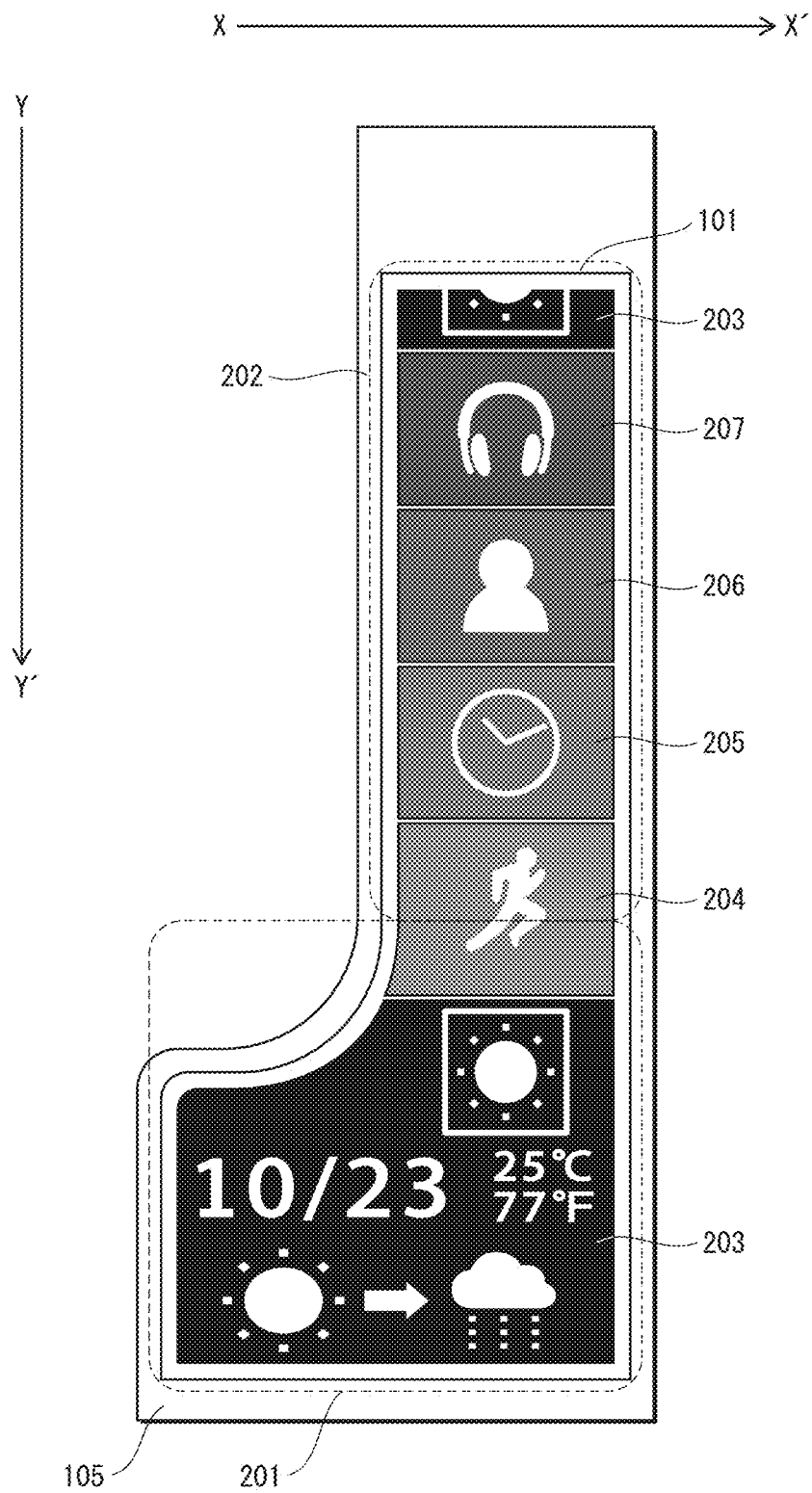
FIG. 8B is a diagram illustrating a change of display state of the display in response to a flick operation in the longitudinal direction.

In the state illustrated in FIG. 8B, the image 204 corresponding to the program B, positioned in the second region 202 prior to the scrolling starting, has scrolled from Y towards Y', such that a portion of the image 204 has moved into the first region 201. In this state, the portion of the image positioned in the first region 201 has increased in width in a lateral direction (X-X' direction), along with an increase in width of the first region 201 beyond the width of the second region 202 in the lateral direction (X-X' direction). Further, the image 203 corresponding to the program A that was positioned in the entire first region 201 prior to the scrolling has also scrolled in the direction from Y towards Y'. A portion of the image 203 displayed in the region 201 that shows the icon image has moved from Y towards Y'. A portion of the image 203 that shows the image generated by execution of the program A has shrunk in the longitudinal direction (Y-Y' direction) along with the scrolling of the icon image. On the other hand, an icon image is drawn as if appearing from the top end of the second region 202, as the image 203 corresponding to the program A.

Upon transitioning from the state illustrated in FIG. 8B to the state illustrated in FIG. 8C, the image 204 that scrolled from the second region 202 is positioned in the portion of the first region 201 that gradually increases in width. The icon image showing information of the program A corresponding to the image 203 and the image generated by execution of the program A that corresponds to the image 203 that is further shrunk in the longitudinal direction (Y-Y' direction) are displayed in the portion of the first region 201 that has a constant width. The icon image for the image 203 corresponding to the program A is fully displayed at the top end in the second region 202. In the states illustrated in the subsequent FIGS. 8D-8G, the display in the second region 202 is fixed, and only the display in the first region 201 transitions.

In the state illustrated in FIG. 8D, in the portion of the first region 201 that gradually increases in width, the icon image indicating information of the program B corresponding to the image 204 is fixed, and in an upper part of the portion of the first region 201 that has a constant width, an image generated by execution of the program B corresponding to the image 204 has appeared and been caused to gradually expand in the longitudinal direction (Y-Y' direction). In a lower part of the portion of the first region 201 that has a constant width, the image 203 is displayed, but a display area thereof has been caused to shrink along with the expansion of the image 204.

In the state illustrated in FIG. 8E, in the first region 201, the image generated by execution of the program A has disappeared from the display 101, and only the icon image of the image 203 corresponding to the program A is displayed.

Figure 8F:
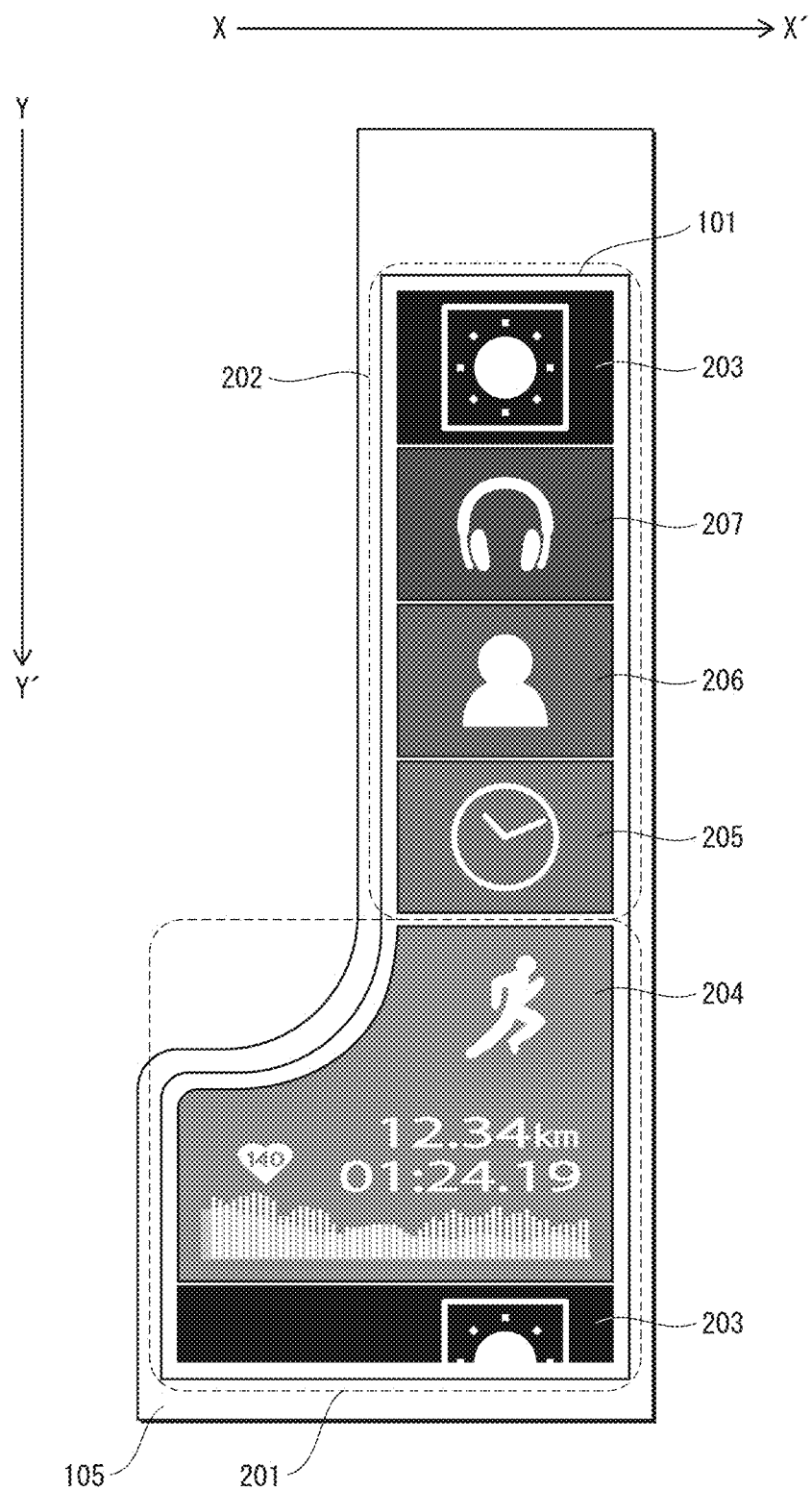
FIG. 8F is a diagram illustrating a change of display state of the display in response to a flick operation in the longitudinal direction.

In the state illustrated in FIG. 8F, in the first region 201, the icon image of the image 203 has gradually disappeared from the display 101.

FIG. 8G illustrates a display state after the scrolling has ended and each image corresponding to a program has moved one program position from the state prior to the beginning of the scrolling. Compared to the display state prior to the scrolling illustrated in FIG. 8A, in the display state illustrated in FIG. 8G the image 204 corresponding to the program B that was displayed closest to the first region 201 in the second region 202 has been moved to the first region 201, and the image 204 corresponding to the program B that was the icon image showing information of the program B in the second region 202 prior to the scrolling has become an execution image generated by execution of the program B and the icon image showing information of the program B in the first region 201 after the scrolling ends. In other words, due to one flick operation, the main program switches to the program B corresponding to the image 204.

(2) Flick Operation 2

The following is a description of another example of processing when a flick operation is detected. In this processing, different from the example described above as the flick operation 1, the processor 107 calculates speed of a flick operation detected by the touch panel 106, the processor 104 controls a scrolling amount in the longitudinal direction according to the speed of a flick operation, and the processor 103, at a timing when scrolling in the longitudinal direction (Y-Y' direction) ends, performs a control that specifies the program corresponding to the image positioned in the first region 201 as the new main program.

Figure 10:
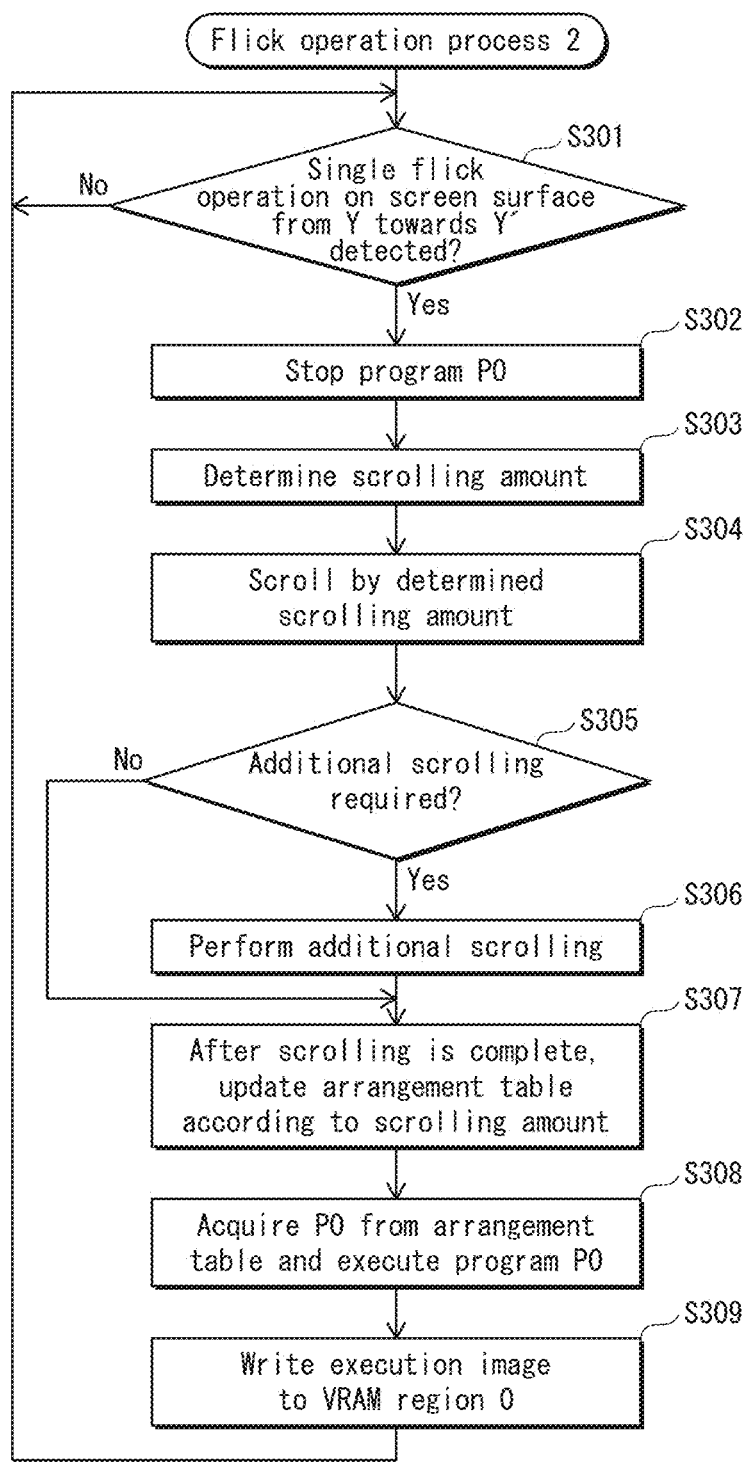
FIG. 10 is a flowchart illustrating another example of processing when a flick operation in the longitudinal direction is detected.

FIG. 10 is a flowchart illustrating processing related to display control at the display 101 and switching control of the main program. The following is a description, using the flowchart illustrated in FIG. 10, of another example of processing due to a flick operation.

First, in the initial state, due to the processing described in embodiment 1, the image 203 corresponding to the program A specified as the main program is displayed in the first region 201 of the display 101, and the images 204-207 corresponding to the programs B-E specified as sub-programs are displayed lined up in the longitudinal direction in the second region 202 of the display 101.

Here, as illustrated in FIG. 8A, a user contacts the screen surface of the display 101, i.e. the touch panel 106, with a finger, and upon performing a single flick operation in the longitudinal direction from Y towards Y', in the direction indicated by the dashed arrow, the touch panel 106 detects the flick operation ("Yes" at step S301). Based on the touch detection result of the touch panel 106, the processor 107 calculates a speed of movement of the flick operation and notifies the processor 103 and the processor 104 of the results of the calculation.

Upon receiving notification of detection of the flick operation, the processor 103 stops execution of the program A, which is the main program and has an ID registered at P0 in the arrangement table (step S302). The processor 104 determines, as a scrolling amount, a number of lines to scroll the display in the longitudinal direction (Y-Y' direction) of the display 101, according to the speed of movement of the touch position (step S303). In determining the scrolling amount, a method may be used in which, for example, speed is divided into levels and the scrolling amount is determined by referencing a table defining the scrolling amount for each level that is stored in advance in the memory 12. Alternatively, a method may be used in which the scrolling amount is calculated using a function provided in advance that has speed as a variable. In such methods, the table and the function define the scrolling amount such that, as speed increases, the scrolling amount increases, allowing a user to intuitively adjust the scrolling amount of the display.

Next, the processor 104, according to the scrolling amount determined, controls the display of the display 101 to scroll the images 203-207 corresponding to the programs A-E from Y towards Y' in the longitudinal direction (Y-Y' direction) (step S304).

Upon scrolling of the images being performed according to the scrolling amount determined, scrolling temporarily stops, and at this timing the processor 103 judges whether or not each image corresponding to a program is at a position such that the image fits into a predefined region (step S305).

A predefined region is a region in the display 101 in which an image corresponding to a program is positioned. The image corresponding to the main program is positioned to fit in the first region 201, and therefore the first region 201 is a predefined region. Images corresponding to sub-programs are positioned to fit in the second region 202, and therefore each image corresponding to a sub-program is positioned to fit in a predefined region allocated within the second region 202. Note that the timing at which the processor 103 judges whether or not each image fits into a predefined region is not limited to being the timing at which scrolling ends. Based on a predefined scrolling amount, the processor 103 may judge before scrolling ends.

In step S305, when the processor 103 judges that each image corresponding to a program is positioned so as to fit in a predefined region ("Yes" at S305), no further movement of each image corresponding to a program is required. In such a case, the processor 103 updates the arrangement table according to the scrolling amount used in step S304 (step S307), and specifies the program corresponding to the image positioned at the first region 1 as the main program by acquiring the ID registered at P0 in the arrangement table after the update. Subsequently, the processor 103 executes the program corresponding to the ID so acquired (step S308).

Note that the timing at which the processor 103 determines the new main program is not limited to being the timing at which scrolling ends. Based on a predefined scrolling amount, the processor 103 may update the arrangement table and determine a program to become the new main program before scrolling ends. As a method of updating the arrangement table based on the scrolling amount, for example, the number of lines indicating the scrolling amount may be divided by the number of pixels in the Y-Y' direction of an icon image, and each item in the arrangement table may be shifted to the left an amount equivalent to the quotient.

On the other hand, in step S305, when the processor 103 judges that each image corresponding to a program is not positioned so as to fit in a predefined region ("No" at step S305), the processor 104 performs additional scrolling using image movement control so as to fit an image having high priority within a predefined region (step S306). In other words, when a single image corresponding to a program is not fitted within a predefined region set as a position of an image corresponding to a program in the first region 201 or the second region 202, and two images each corresponding to one of two programs is included with the predefined region, the position of each image corresponding to a program is adjusted.

In order to adjust a position of each image, a variety of methods are possible for assigning high priority to an image. For example, of two images positioned in a predefined region, the image having the greater number of lines in the longitudinal direction (Y-Y' direction) in the predefined region may be assigned a high priority. Further, of two images positioned in a predefined region, the image having the greater area drawn in the predefined region may be assigned a high priority. Further, of two images positioned in a predefined region, the image positioned towards the Y end of the longitudinal direction (Y-Y' direction) may always be assigned a high priority, or the image positioned towards the Y' end may always be assigned a high priority.

By any of the above-described methods, adjustment of image drawing positions is performed such that when an image positioned towards the Y end of the longitudinal direction (Y-Y' direction) is assigned a high priority, the image is scrolled from Y towards Y', and when an image positioned towards the Y' end is assigned a high priority, the image is scrolled from Y' towards Y.

When scrolling processing of step S306 ends, the processor 103 updates the arrangement table according to the scrolling amount that is the sum of scrolling in step S304 and step S306 (step S307), and specifies the program corresponding to the image positioned at the first region 1 as the main program by acquiring the ID registered at P0 in the arrangement table after the update. Subsequently, the processor 103 executes the program corresponding to the ID so acquired (step S308). Note that the timing at which the processor 103 determines the new main program is not limited to being the timing at which scrolling ends. Based on a scrolling amount that is the sum of scrolling of step S304 and step S306, the processor 103 may update the arrangement table and determine a program to become the new main program before scrolling in step S306 ends.

Finally the processor 104 generates image data of an image visualizing information generated by execution of the program in step S308, and writes the generated image data to the storage region 0 of the VRAM 14 (step S309).

According to the processing order described above with reference to FIG. 10, any image displayed in the second region is moved to the first region by a scrolling amount in response to speed of a flick operation, and at a timing at which the scrolling ends, the program corresponding to an image positioned in the first region 201 is specified as the new main program. Thus a user can switch any sub-program to being the new main program with one flick operation, and is not limited to only switching a sub-program indicated by an icon image positioned closest to the first region in the second region 202 prior to the flick operation to being the new main program.

Note that the electronic device may be configured to implement only one of the processing order described as the flick operation 1 and the processing order described as the flick operation 2, or may be configured to implement both of the processing orders. When the electronic device implements both of the processing orders, the electronic device may be configured with a setting screen such that a user may set execution of the processing order of any one of the flick operation 1 and the flick operation 2 to be performed when a flick operation is detected.

Note that so far, as the flick operation 1 and the flick operation 2, processing has been described when a flick operation is detected from Y towards Y', i.e. towards a lower end of the screen, along the longitudinal direction of the display 101 illustrated in FIG. 8A. However, a flick operation may also be from Y' towards Y, along the longitudinal direction.

For example, along the longitudinal direction of the display 101, when a flick operation is detected towards an upper end of the screen from Y' towards Y, the processor 104 controls the display of the display 101 so as to scroll the images 203-207 corresponding to the programs A-E from Y' towards Y in the longitudinal direction. In this image movement control, a scrolling amount is determined so as to move an icon image corresponding to a program whose image is displayed in the first region 201 prior to scrolling starting to a position closest to the first region 201 in the second region 202 after scrolling ends, and the IDs registered in the arrangement table in FIG. 4B are cyclically shifted one item to the left. According to such scrolling, the icon image displayed at the top end of the second region 202 prior to scrolling starting is drawn as if disappearing from the upper side of the display 101, and the program corresponding to the icon image is specified as the new main program after scrolling ends and an execution image thereof is drawn in the first region 201.

By implementing processing corresponding to a flick operation from Y' towards Y in a direction towards the upper end of the screen in addition to processing corresponding to a flick operation from Y towards Y' towards the lower end of the screen, ease of selection of the main program is increased.

(3) Drag Operation

Figure 11B:
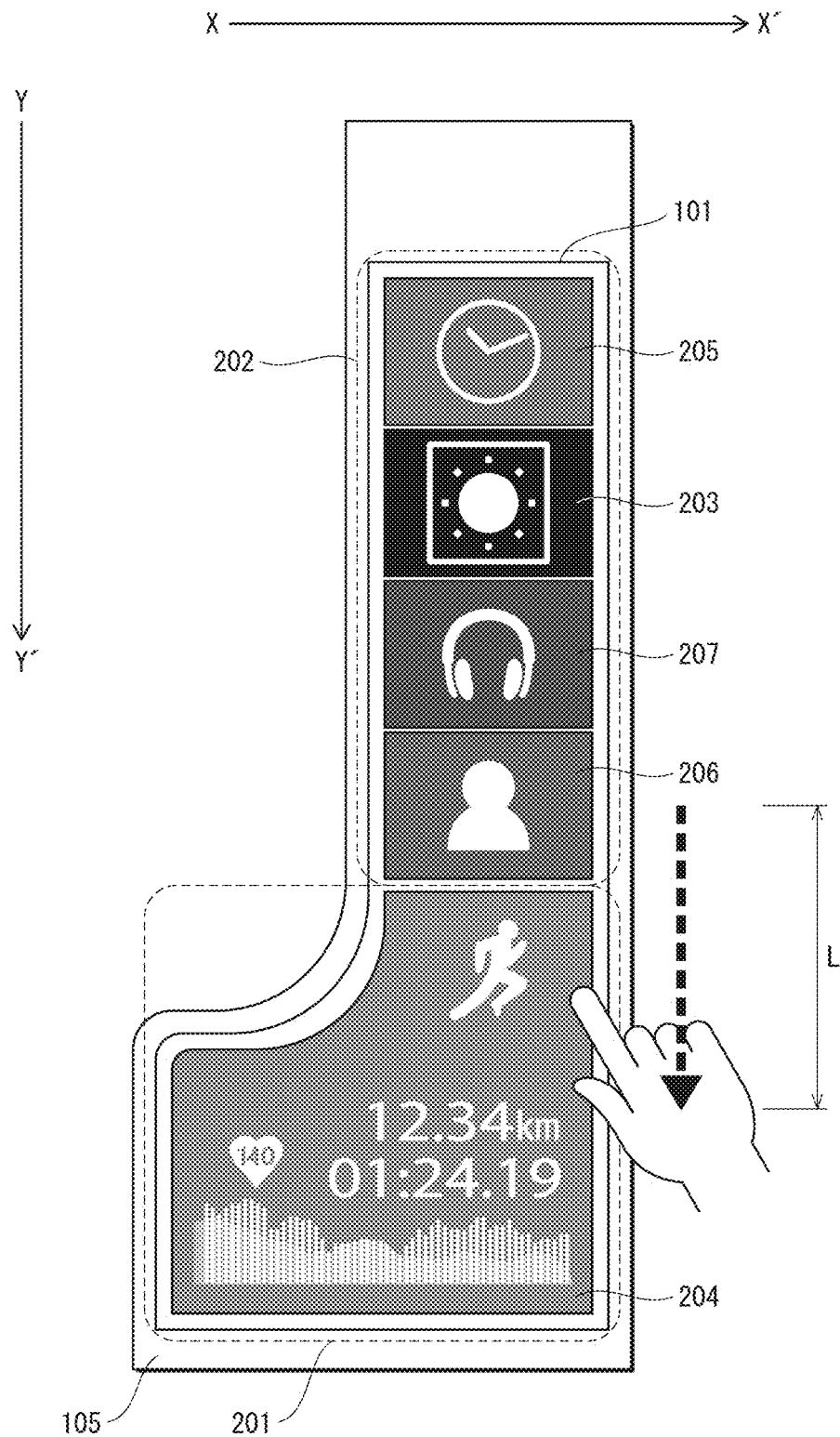
FIG. 11B is a diagram illustrating a change of display state of the display in response to the drag operation.
Figure 12:
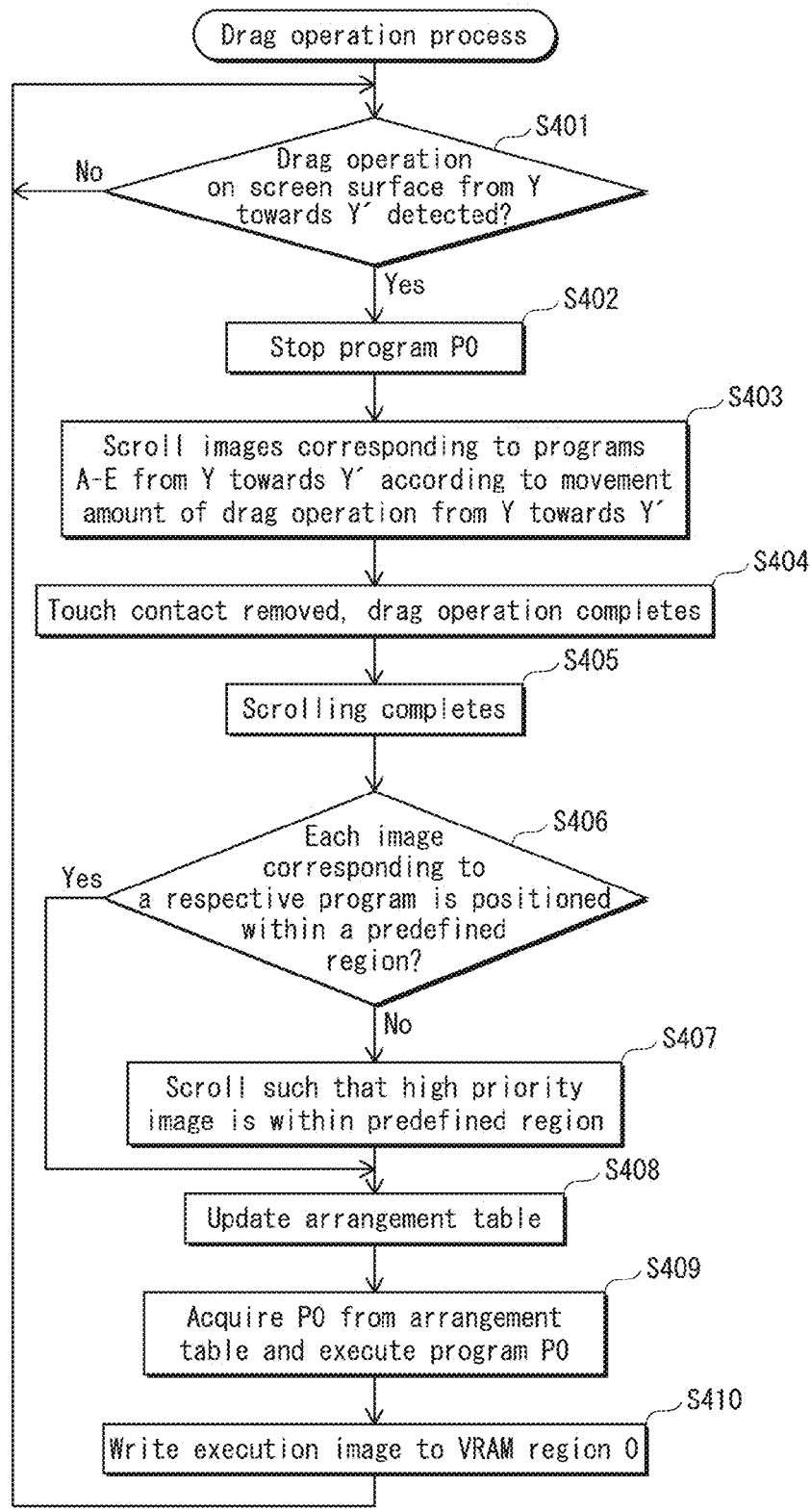
FIG. 12 is a flowchart illustrating processing when a drag operation is detected.

The following is a description, using FIGS. 11A, 11B and 12, of states of main program switching and display changes of the display 101 due to a drag operation, which is one type of touch operation.

FIGS. 11A and 11B are diagrams illustrating, in plan view of the display, a transition of display state due to a drag operation up until switching of the main program is performed. The basic configuration is the same as in FIG. 3B, and description of each symbol is omitted here.

FIG. 12 is a flowchart illustrating processing due to a drag operation. The following is a description, using the flowchart illustrated in FIG. 12, of processing due to a drag operation.

First, in an initial state, due to the processing described in embodiment 1, the image 203 corresponding to the program A that is specified as the main program, is displayed in the first region 201 of the display 101, and the images 204-207 corresponding to the programs B-E that are specified as sub-programs are displayed lined up in the longitudinal direction (Y-Y' direction) in the second region 202 of the display 101.

As illustrated in FIG. 11A, a user contacts the screen of the display 101, i.e. the touch panel 106, with an object such as a finger, etc., and upon performance of a drag operation in the direction indicated by the dashed arrow from Y towards Y' in the longitudinal direction (Y-Y' direction) for a distance L, the touch panel 106 detects the drag operation ("Yes" at step S401). The processor 107, based on a touch detection result of the touch panel 106, notifies the processor 103 and the processor 104 of a movement amount of the drag operation from Y towards Y' in the longitudinal direction (Y-Y' direction).

Upon receiving notification of detection of the drag operation, the processor 103 stops execution of the program A, which is the main program and has an ID registered at P0 in the arrangement table (step S402). The processor 104, in response to the movement amount of the drag operation, performs image movement control so as to scroll the images 203-207 corresponding to the programs A-E from Y towards Y' on the display of the display 101 (step S403). Note that in this case, the movement amount of the drag operation and the scrolling amount of the images 203-207 are preferably approximately the same. For example, if the drag operation is performed for the distance L, the scrolling amount of the images 203-207 also becomes approximately the distance L.

When a touching object separates from the touch panel 106, the processor 107 notifies the processor 103 and the processor 104 of the end of the drag operation (step S404), and the processor 104 that receives this notification ends the control causing scrolling of images (step S405).

At a timing of scrolling ending, the processor 103 judges whether or not each image corresponding to a program is at a position such that the image fits into a predefined region (step S406).

Then, cases in which adjustment of a position of an image is not required and cases in which adjustment of a position of an image is required are separated according to a result of the judgment of the processor 103. However, the processing at steps S407-S410 is the same as the processing at steps S306-S309 in the flowchart in FIG. 10, so description is omitted here.

The processing order in response to the drag operation makes it easy for a user to intuitively determine the scrolling amount of the display. In this way, determination of the main program becomes simple. For example, when a user wishes to make the program B corresponding to the image 204 in FIG. 11A the new main program, if the user touches a location where the image 204 is being displayed and performs a drag operation to the first region 201, the image 204 is moved to the first region 204 as shown in FIG. 11B, and therefore the program B corresponding to the image 204 is switched to being the new main program.

Note that so far, as the drag operation, processing has been described when a drag operation is detected from Y towards Y', i.e. towards a lower end of the screen, along the longitudinal direction of the display 101 illustrated in FIG. 11A. However, a drag operation may also be from Y' towards Y, along the longitudinal direction.

For example, in a drag operation from Y towards Y' in a direction towards the lower end of the screen, contact is detected at the icon image 311a in the state illustrated in FIG. 13A, and when a position of the contact moves to the first region 201, the processor 104 cyclically shifts the IDs of programs registered in the arrangement table in FIG. 4B to the left, controls the display of the display 101 to scroll the icon image 311a from Y towards Y' in the longitudinal direction, and causes the transition of the display illustrated in FIGS. 13A-13D.

On the other hand, in a drag operation from Y' towards Y in a direction towards the upper end of the screen, contact is detected at an image 311b that includes the execution image of the main program in the state illustrated in FIG. 13D, and when a position of the contact moves to the second region 202, the processor 104 cyclically shifts the IDs of programs registered in the arrangement table in FIG. 4B to the right, controls the display of the display 101 to scroll the icon image included in the image 311b from Y' towards Y in the longitudinal direction, and causes the transition of the display illustrated in FIGS. 13D-13A. As a result, in the state illustrated in FIG. 13A, a program corresponding to an icon image 312b becomes the main program, and an image 312a including the icon image 312b and an execution image is displayed in the first region 201. Further, a program corresponding to the image 311b that was displayed in the first region 201 prior to the drag operation starting becomes a sub-program after the drag operation ends, and the icon image 311a is drawn in the second region 202.

By implementing in the electronic device processing corresponding to a drag operation from Y' towards Y in the direction towards the upper end of the screen in addition to processing corresponding to a drag operation from Y towards Y' in the direction towards the lower end of the screen, a drag operation may be used not only to make a program for which an icon image is displayed in the second region 202 the new main program, but also to make a current main program a sub-program.

(4) Tap Operation, Long Tap Operation, and Double Tap Operation.

Figure 14A:
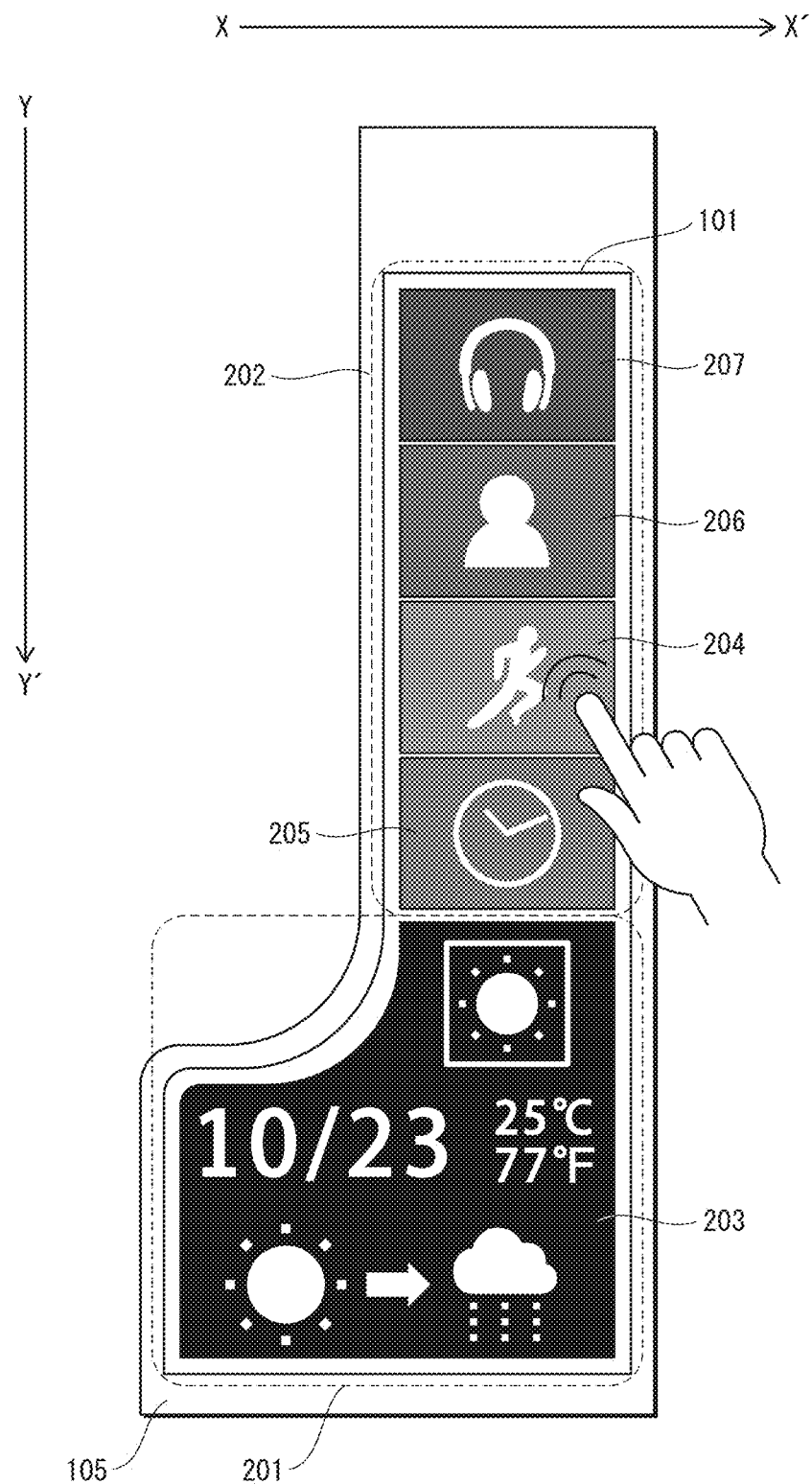
FIG. 14A is a diagram illustrating a change of display state of the display in response to a selection operation.
Figure 14B:
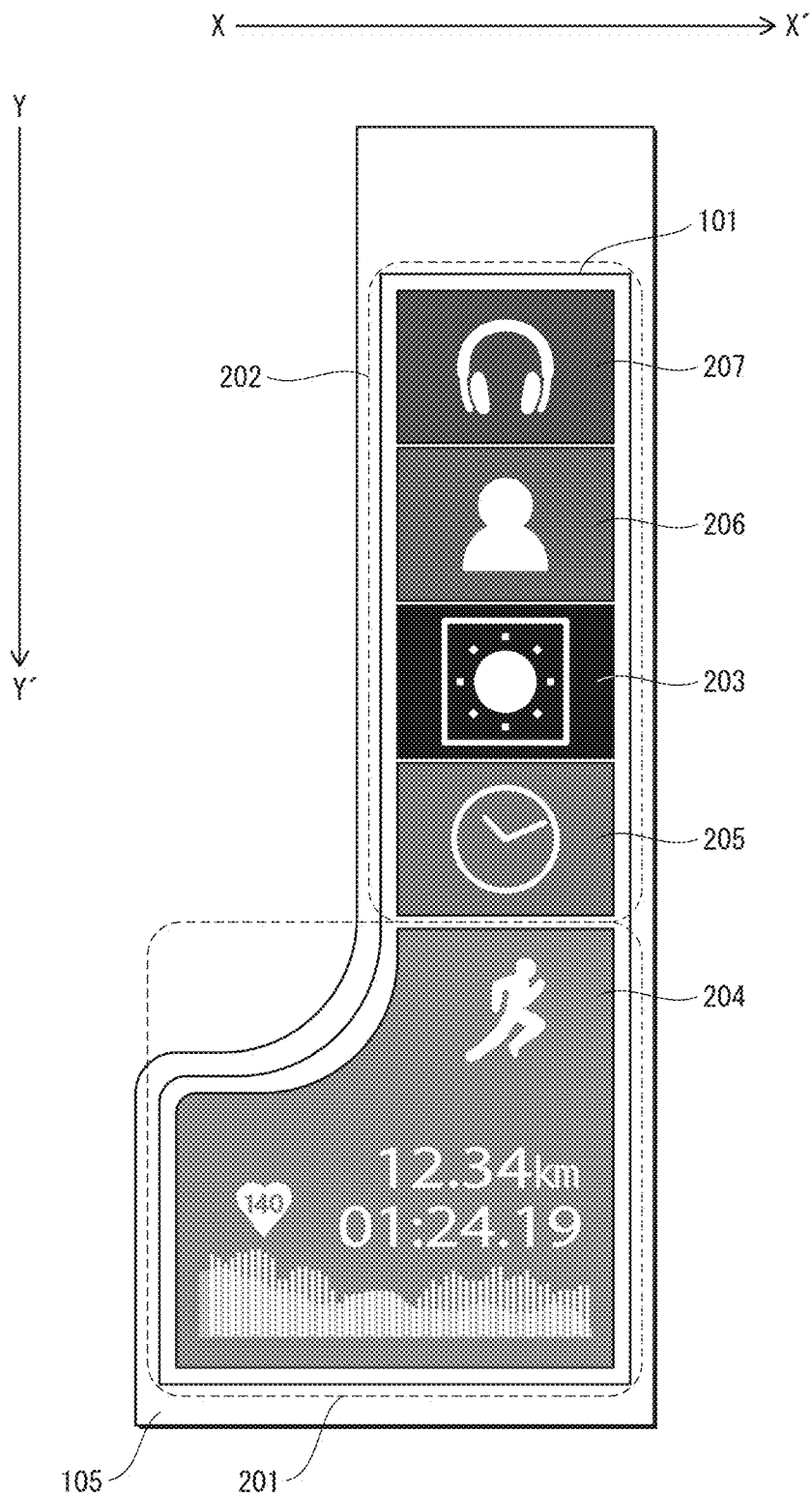
FIG. 14B is a diagram illustrating a change of display state of the display in response to the selection operation.
Figure 15:
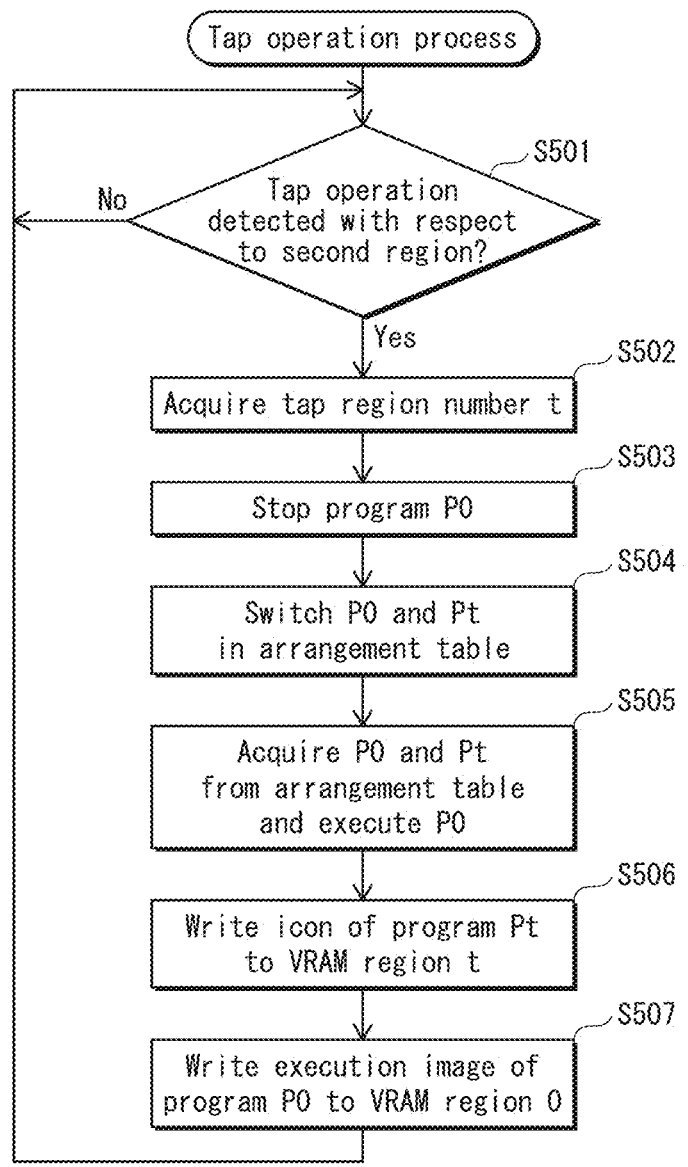
FIG. 15 is a flowchart illustrating processing when a tap operation is detected.

The following is a description, using FIGS. 14A, 14B and 15, of states of main program switching and display changes of the display 101 due to a tap operation, which is one type of touch operation.

FIGS. 14A and 14B are diagrams illustrating, in plan view of the display, a transition of display state due to a tap operation up until switching of the main program is performed. The basic configuration is the same as in FIG. 3B, and description of each symbol is omitted here.

FIG. 15 is a flowchart illustrating processing due to a tap operation. The following is a description, using the flowchart illustrated in FIG. 15, of processing due to a tap operation.

First, in an initial state, due to the processing described in embodiment 1, the image 203 corresponding to the program A that is specified as the main program is displayed in the first region 201 of the display 101, and the images 204-207 corresponding to the programs B-E that are specified as sub-programs are displayed lined up in the longitudinal direction (Y-Y' direction) in the second region 202 of the display 101.

Here, as illustrated in FIG. 14A, when a tap operation is performed by a user with respect to any one of the images 204-207 corresponding to the programs B-E displayed in the second region 202 of the display 101, the touch panel 106 detects the tap operation ("Yes" at step S501). Note that the tap operation described here is contact by an object for a short period of time at a point on the touch panel 106. The processor 107, based on a touch detection result by the touch panel 106, calculates a position selected by the tap operation, and notifies the processor 103 of a result of the calculation.

Upon receiving notification of a tap position, the processor 103 determines which of the storage regions 1-4 of the VRAM 14 illustrated in FIG. 4A, coordinates of the tap position correspond to, and acquires a value t indicating a number of the corresponding storage region (step S502). The processor 103 also stops execution of the main program that has an ID registered at P0 in the arrangement table (step S503), and updates the arrangement table by switching the ID registered at P0 with the ID registered at Pt (step S504).

After updating the arrangement table, the processor 103 acquires the ID registered at P0 and the ID registered at Pt, and executes the new main program corresponding to the ID acquired from P0 (step S505). According to such processing, as illustrated in FIG. 14A, upon selection of the image 204 by a tap operation, for example, the program B corresponding to the image 204 is specified as the new main program.

Subsequently, the processor 104 reads the image data of the icon image managed by the ID acquired from Pt, writes the image data to the storage region t of the VRAM 14 (step S506), generates image data of an image visualizing information generated by execution of the new main program, and writes the generated image data to the storage region 0 of the VRAM 14 (step S507).

According to the processing order described above with reference to FIG. 15, a program corresponding to an icon image displayed at a position tapped by a user is specified as the main program, and an execution image of the program is displayed in the execution image display region of the first region 201.

Due to the tap operation, a user can easily, intuitively, determine the main program. Note that a method of selecting the main program by a tap operation is described in this example, but instead of the tap operation, methods of selecting the main program by a double-tap operation or long tap operation are also possible.

Note that switching of the main program by a tap operation may alternatively be executed by a touch-slide operation.

The touch-slide operation is a control whereby, when any one of the icon images in the second region are touched, the icon image of the program that was touched moves towards the first region such that a sequence of multiple programs cyclically shifts. Compared to the tap operation described in embodiment 2, the touch-slide operation has the effect of not changing the order of icon images of programs. Normally, when the number of programs is low, even if the order of icon images of programs changes, the programs indicated by the icon images in the second region are easy to understand. However, as the number of programs displayed increases, changing the order of icon images of programs with each tap operation invites user confusion. Thus, in the touch-slide operation, the icon image of the program touched moves cyclically to the first region, maintaining the order of icon images of programs in the first region and the second region and preventing user confusion.

In the touch-slide operation, as shown in FIG. 16, the icon image displayed at the contact position is moved from the second region to the first region, displayed scrolling downwards. In this control, the processor 107 specifies the icon image displayed in the contact position detected by the touch panel 106, and the processor 104 moves the specified icon image to the first region 201, and while causing all the icon images drawn in the second region 202 to be scrolled along the longitudinal direction, cyclically shifts the IDs registered in each item of the arrangement table in FIG. 4B to the left. The processor 103, at a timing of scrolling ending, specifies the program corresponding to the image positioned at the first region 201 as the new main program.

As a result, the icon image 302a displayed at the contact position in FIG. 16A scrolls downwards as illustrated in FIG. 16B. When the icon image moves as far as the first region 201, the program corresponding to the icon image becomes the new main program, and as illustrated in FIG. 16C, the image 302b of the new main program is displayed in the first display region.

In the above embodiment, switching control of the main program in response to a touch operation at the display having the same shape as in FIG. 3B is described. However, the switching control of the main program in response to a touch operation may be used for any display having an elongated shape in which the first region and the second region are connected in the longitudinal direction of the elongated shape, such as the displays illustrated in FIGS. 3A, 3C, and 3D.

Embodiment 3

The following is a description, using FIGS. 17A, 17B, 17C, and 18, of an electronic device pertaining to embodiment 3 of the present disclosure. The electronic device pertaining to the present embodiment can switch images corresponding to a program specified as the main program, by operation of a portion corresponding to the first region 201 of the touch panel 106.

Figure 17A:
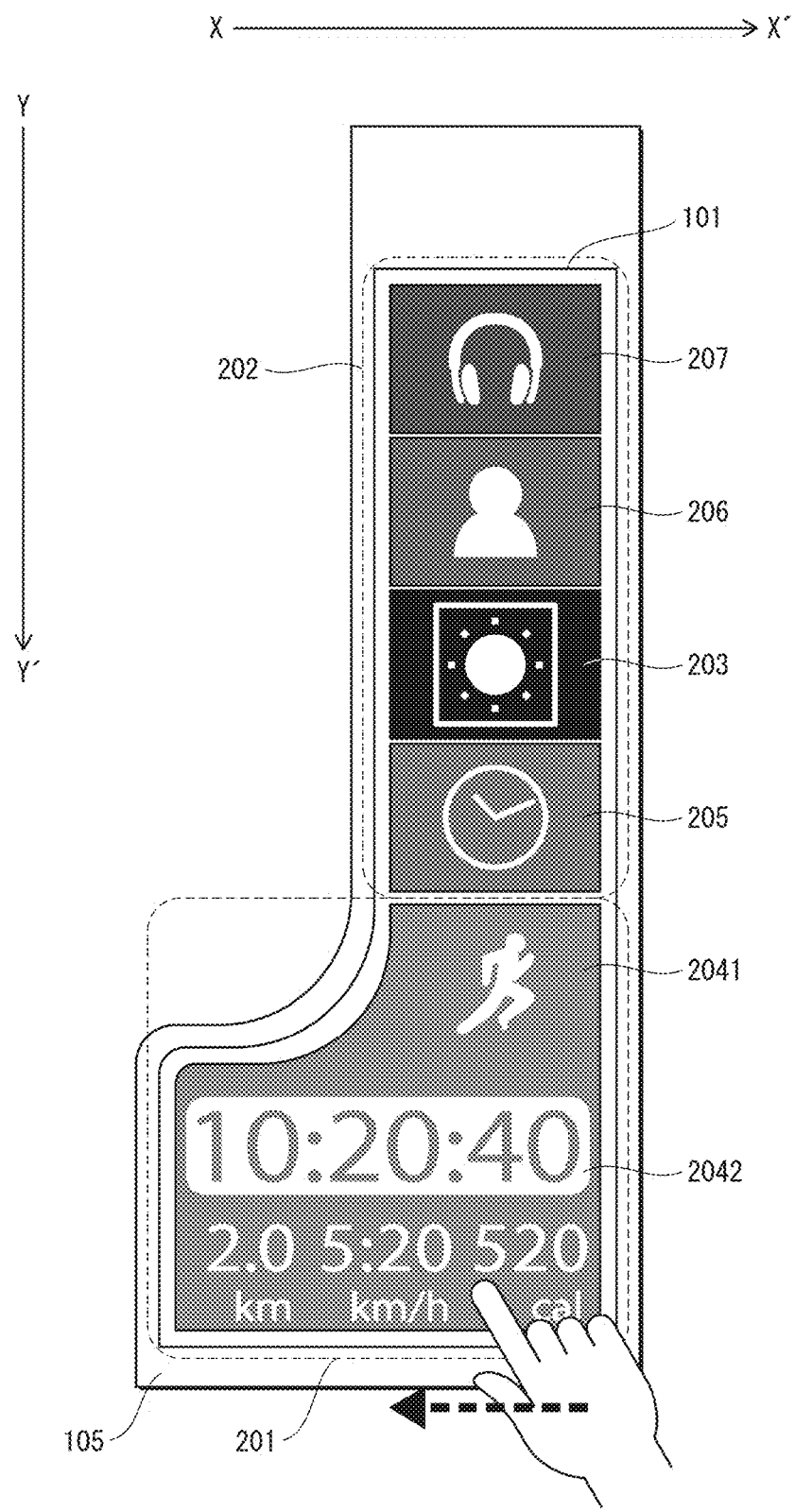
FIG. 17A is a diagram illustrating a change of display state of the display in response to a flick operation on an execution image.
Figure 17C:
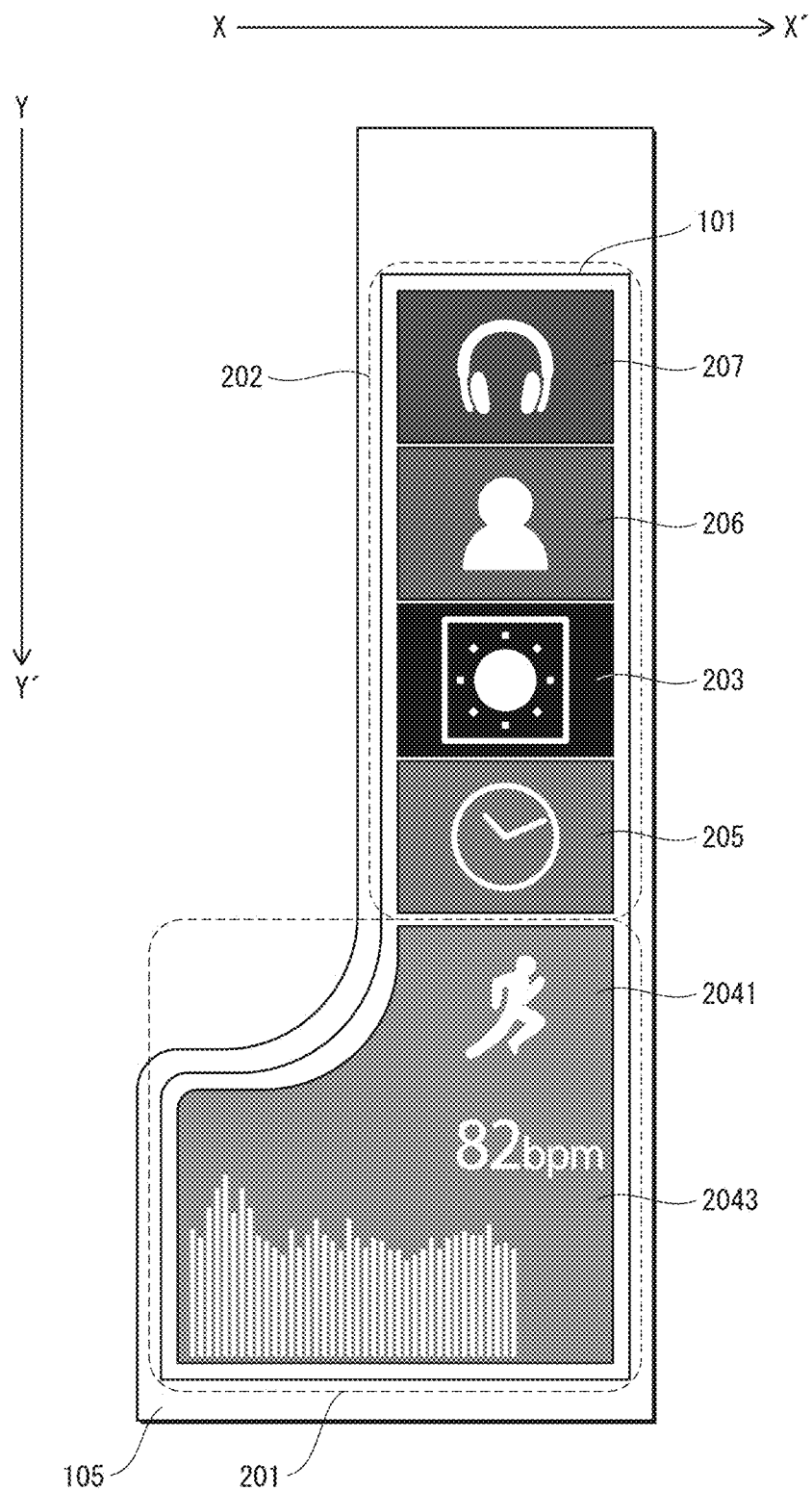
FIG. 17C is a diagram illustrating a change of display state of the display in response to a flick operation on the execution image.

FIGS. 17A-17C illustrate, in plan view of the display, states of display changes of the display due to a flick operation in the first region in the lateral direction (X-X' direction). The basic configuration is the same as in FIG. 3B, and description of each symbol is omitted here.

Figure 18:
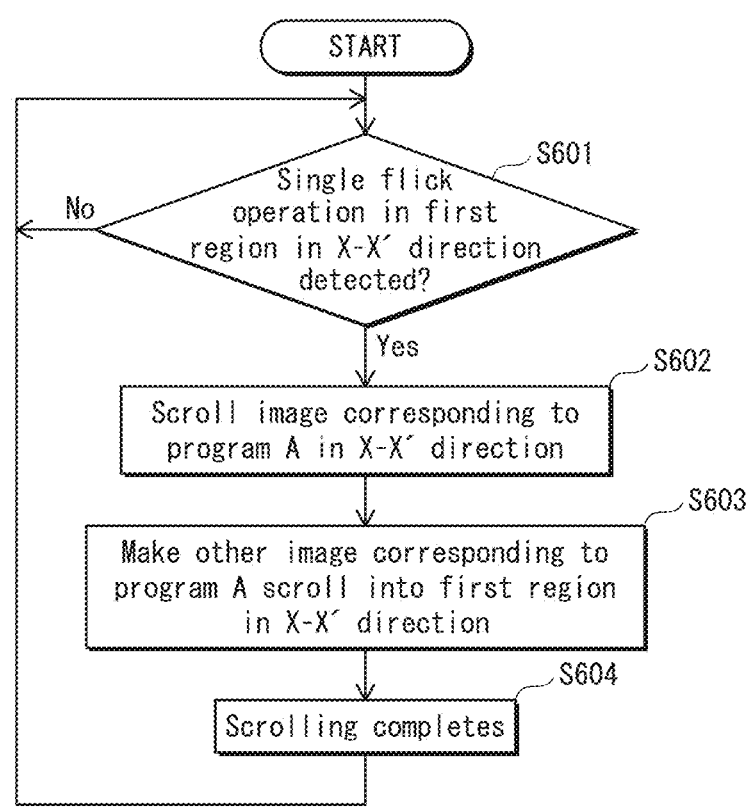
FIG. 18 is a flowchart illustrating processing when a flick operation on the execution image is detected.

FIG. 18 is a flowchart illustrating processing due to a flick operation in the first region in the lateral direction (X-X' direction). The following is a description using the flowchart illustrated in FIG. 18 of processing due to a flick operation in the first region in the lateral direction (X-X' direction).

First, in an initial state, due to the processing described in embodiment 1, an image 2041 and an image 2042 corresponding to the program B that is specified as the main program is displayed in the first region 201 of the display 101, and the images 203, 205-207 corresponding to the programs A, and C-E that are specified as sub-programs are displayed lined up in the longitudinal direction (Y-Y' direction) in the second region 202 of the display 101. The image 2041 displayed in the first region 201 is an icon image showing information of the program B that is specified as the main program, and the image 2042 is an execution image generated by execution of the program B that is specified as the main program.

Here, as illustrated in FIG. 17A, a user contacts the screen surface of the display 101 at the first region 201, i.e. the touch panel 106, with a finger, and upon performing a single flick operation in the lateral direction from X' towards X, in the direction indicated by the dashed arrow (X-X' direction), the touch panel 106 detects the flick operation ("Yes" at step S601). Based on the touch detection result of the touch panel 106, the processor 107 calculates a touch position, a speed of movement of the touch position, etc., and notifies the processor 104 of the results of the calculation.

The processor 104 that receives the notification controls display of the display 101 to scroll the execution image 2042 of the program B that is specified as the main program in the lateral direction from X' towards X (X-X' direction) (step S602).

Further, the processor 104 generates an execution image 2043 visualizing information generated by execution of the program B, and controls display of the display 101 so that the execution image 2043 appears from the left side of the display 101 while scrolling in the lateral direction (X-X' direction) from X' towards X (step S603). States of processing of steps S602 and S603 are illustrated in FIG. 17B.

When the image displayed in the first region 201 changes from the image 2042 to be completely replaced by the image 2043 due to the processing of steps S602 and S603, the scrolling processing ends (step S604). A state in which the scrolling processing has ended is illustrated in FIG. 17C.

The image 2042 and the image 2043 are both images generated by execution of the program B that is specified as the main program, and the execution of the program B is performed by the processor 103. Information shown by the image 2042 and the image 2043 may have completely different content, or may include a portion of identical content.

The following is a description of an example of switching images generation by execution of the program B in the present embodiment. The program B is a program used for jogging. The image 2042 generated by execution of the program B is, for example, an image showing measurements of running time and running distance. Further, the image 2043 generated by execution of the program B is, for example, an image showing changes in heart rate while running.

Note that in the above example, causing scrolling in the lateral direction (X-X' direction) from X' towards X is described, but a flick operation from X towards X' may cause scrolling in the opposite direction, from X towards X'.

In order to return the image 2043 displayed in the first region 201 to the image 2042, a flick operation may be performed on the touch panel 106 in the first region 201, causing scrolling of the display.

Further, in the above example, description is given of replacing the image 2042 that is displayed in the first region and generated by execution of the program B that is specified as the main program with the image 2043 generated by the execution of the program B, but another image may be caused to scroll in and replace the image 2043.

Further, in the above example description is given of a single switching of an image corresponding to the program B that is specified as the main program in response to a single flick operation, but the switching of images may be performed by other methods. For example, in response to speed of a single flick operation, the scrolling amount may change, and depending on the scrolling amount, the number of images switched may change. Further, causing scrolling of images in the lateral direction (X-X' direction) by a drag operation may also be possible.

Further, among execution images corresponding to the program B that is specified as the main program, one image may be set as a main image, and when an image other than the main image is displayed in the first region 201, the image displayed in the first region 201 may be switched to the main image by a touch operation, etc., with respect to the image 2041 that is an icon image. In this way, an operation to return to displaying the main image is simplified.

According to the above embodiment, information obtained by executing a program specified as the main program is divided into multiple images, and a user can switch between images by a simple operation.

Note that in the present embodiment, description is given using the display with the same configuration as in FIG. 3B. However, an execution image of the main program may also be switched in response to a touch operation in the first region due to the same control as in the present embodiment using a display having any one of the shapes illustrated in FIGS. 3A, 3C, and 3D.

Embodiment 4

Figure 19:
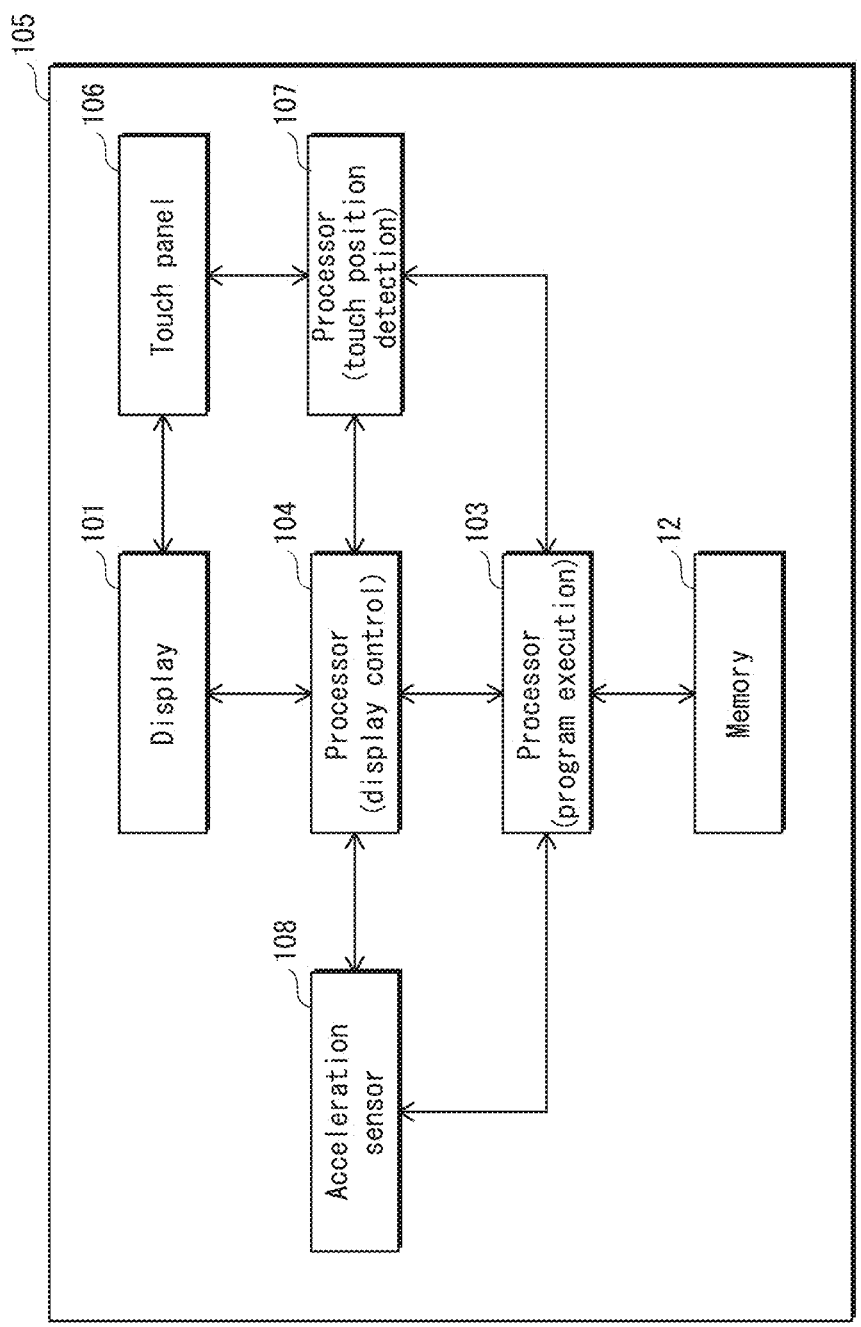
FIG. 19 is a diagram illustrating a configuration of an electronic device pertaining to embodiment 4.
Figure 20:
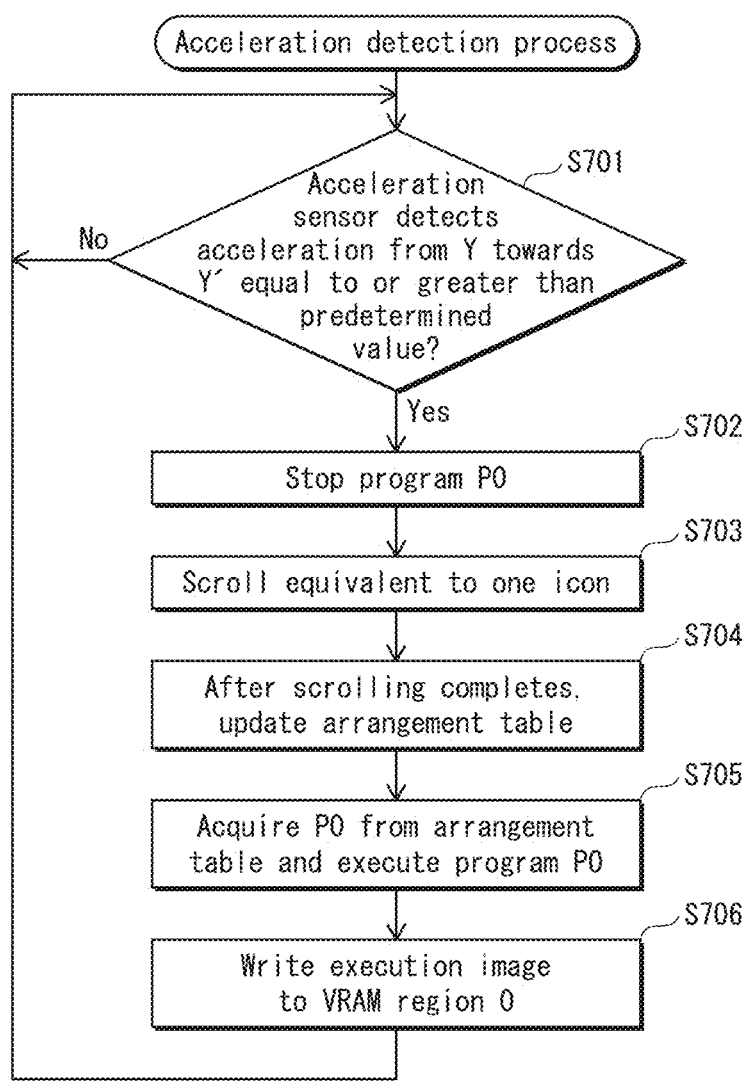
FIG. 20 is a flowchart illustrating processing when a detection is made by an acceleration sensor.

The following is a description, using FIGS. 19 and 20, of an electronic device pertaining to embodiment 4 of the present disclosure.

FIG. 19 is a diagram illustrating a configuration of an electronic device pertaining to embodiment 4 of the present disclosure. In FIG. 19, description of elements having the same symbols as in FIG. 7 are omitted, and only features that are different from FIG. 7 are described here.

In addition to the configuration illustrated in FIG. 7, the configuration illustrated in FIG. 19 has the addition of a acceleration sensor 108 held in the casing 105, which detects acceleration of the electronic device.

Embodiment 4 further includes, as a function implemented by execution of a control program in the processor 104, an image movement control that controls display of the display such that any one of the icon images displayed in the second region 202 is moved to the first region 201 in response to detection of acceleration by the acceleration sensor 108.

The following is an illustration, using FIG. 20, of an operation example of the electronic device due to detection of acceleration.

FIG. 20 is a flowchart illustrating one example of processing due to detection of acceleration in the longitudinal direction (Y-Y' direction).

First, in an initial state, due to the processing described in embodiment 1 and as illustrated in FIG. 3B, the image 203 corresponding to the program A that is specified as the main program is displayed in the first region 201 of the display 101, and the images 204-207 corresponding to the programs B-E that are specified as sub-programs are displayed lined up in the longitudinal direction (Y-Y' direction) in the second region 202 of the display 101.

Due to, for example, a user performing a shake operation of the electronic device, when some external force acts on the electronic device in the longitudinal direction (Y-Y' direction), the acceleration sensor 108 detects acceleration from Y towards Y' in the longitudinal direction (Y-Y' direction) that is equal to or greater than a predefined value ("Yes" at step S701).

Upon detection of the acceleration, the processor 103 stops execution of the program A that is the main program and has an ID registered at P0 in the arrangement table (step S702). The processor 104 performs image movement control so as to scroll the images 203-207 corresponding to the programs A-E from Y towards Y' on the display of the display 101 (step S703).

In the image movement control, a scrolling amount is adjusted such that the icon image 204 corresponding to the program B, which is displayed at a position closest to the first region 201 in the second region 202 prior to scrolling beginning, is moved to the first region 201 after the scrolling ends. Due to the scrolling, the image 203 corresponding to the program A, which is displayed in the first region 201 prior to the scrolling beginning, is moved towards the bottom of the display 101, and is drawn disappearing from the bottom end of the display 101. Further, the images 205-207 corresponding to the programs C-E that are specified as sub-programs each move in the second region 202 a distance of one icon image in the direction from Y towards Y'. Further, the icon image of the program A, which was specified as the main program, is drawn so as to appear from the top end of the second region.

When the scrolling due to the image movement control of the scrolling amount equal to a distance of one icon image ends, the processor 103 updates the arrangement table illustrated in FIG. 4B, by shifting the IDs registered therein one item to the left (step S704).

After updating the arrangement table, the processor 103 acquires the ID registered at P0 and executes the program corresponding to the acquired ID (step S705). The processor 104 generates image data for an image visualizing information generated by the execution of the program, and writes the generated image data to the storage region 0 of the VRAM 14 (step S706).

The example described above with reference to FIG. 20 has a feature that, when acceleration detected by the acceleration sensor 108 is greater than or equal to a predefined threshold, the processor 104 controls display of the display 101 to move the image closest to the first region 201 among the images corresponding to the programs specified as sub-programs in the second region 202 to the first region 201, and the processor 103 specifies the program corresponding to the image moved to the first region 201 as the new main program.

As another example of control of the electronic device in response to detection of acceleration, the acceleration sensor 108 may determine the scrolling amount in response to a degree of acceleration detected, similar to the determination of the scrolling amount in response to speed of a flick operation in the processing order described with reference to FIG. 10 in embodiment 2. In this example, the processor 103 controls the scrolling amount in the longitudinal direction (Y-Y' direction) in response to a degree of acceleration, and at a timing of scrolling ending, specifies the program corresponding to the image positioned at the first region 201 as the new main program.

Further, as another example of control of the electronic device in response to detection of acceleration, the acceleration sensor 108 may cause switching of execution images of the main program displayed in the region 1 in response to acceleration detected in the lateral direction (X-X' direction), similar to the switching of execution images of the main program displayed in the region 1 in response to a flick operation in the lateral direction (X-X' direction) in the processing order described with reference to FIG. 18 in embodiment 3. In this example, when the acceleration sensor 108 detects acceleration in the lateral direction (X-X' direction) equal to or greater than a predefined threshold, the processor 104 causes scrolling in the lateral direction (X-X' direction) of the execution image of a program that is specified as the main program in the first region 201, and controls the display 101 such that the execution image is replaced by another execution image corresponding to the program.

Further, it is also possible to use an acceleration detection result from the acceleration sensor other than as a trigger for causing scrolling of the display of the display 101. For example the acceleration detection result from the acceleration sensor 108 may be used to switch operating states of the display. Specifically, when the display 101 has two operating states, a sleep state in which images are not displayed and an active state in which images are displayed, when no operation is performed for more than a predefined time, the processor 104 limits power consumption by switching the operating state of the display 101 to the sleep state. Subsequently, when the acceleration sensor 108 detects acceleration greater than a predefined value, the operating state may be switched from the sleep state to the active state.

Embodiment 5

Figure 21:
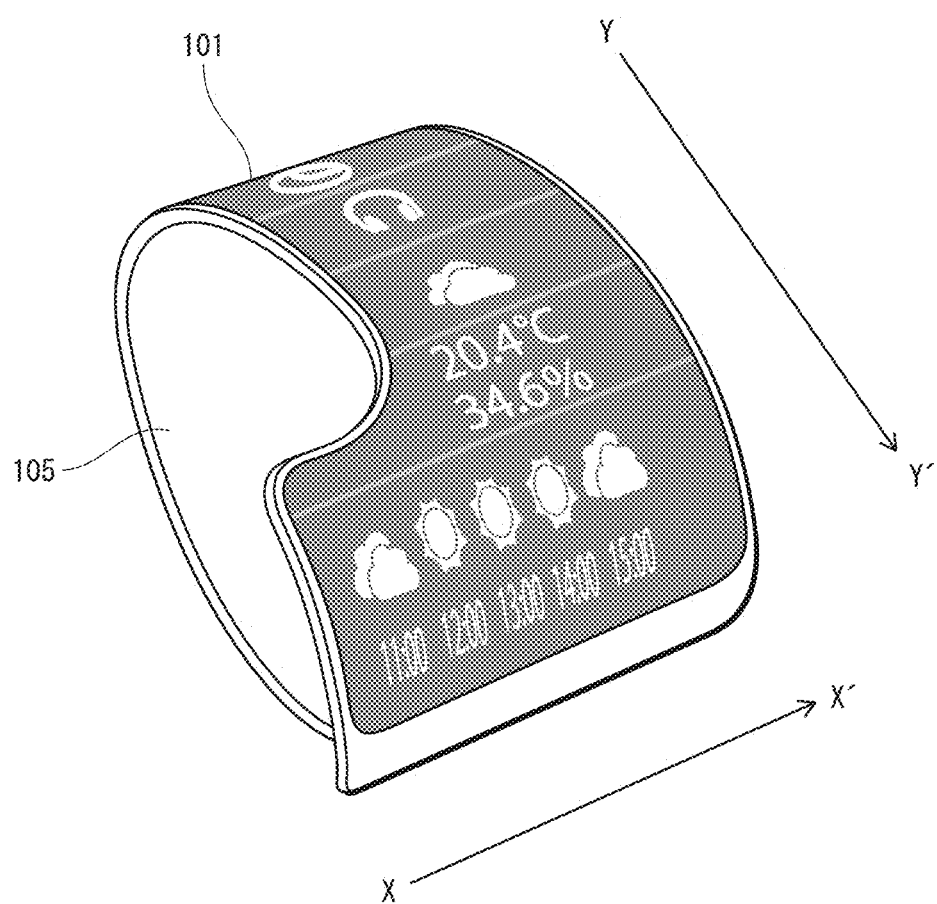
FIG. 21 is a diagram illustrating an external view of an electronic device pertaining to embodiment 5.
Figure 22B:
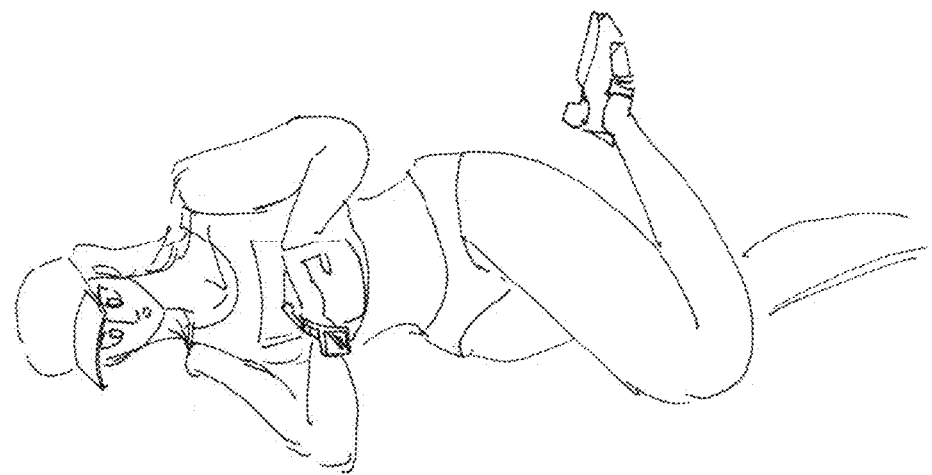
FIGS. 22A and 22B are diagrams illustrating types of use of the electronic device pertaining to embodiment 5.
Figure 22A:
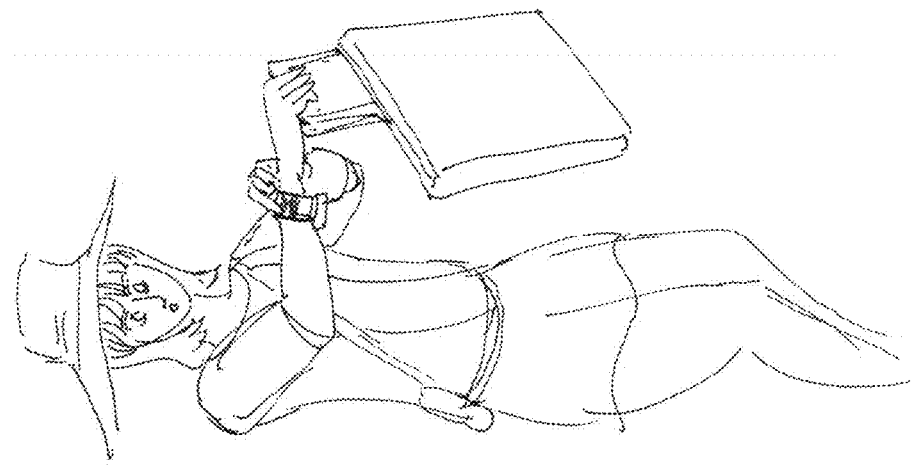

The following is a description, using FIGS. 21, 22A, and 22B, of an electronic device pertaining to embodiment 5.

In the electronic device pertaining to embodiment 5, the casing 105 is formed from elastic material. The casing 105 further has an engaging member at both ends in the longitudinal direction. By bending the casing 105 and engaging the engaging members at both ends of the casing 105, the mounting surface of the display 101 of the electronic device can be deformed into an outer peripheral surface having a cylindrical shape.

The display 101 is an organic EL display. When the casing 105 is deformed into the cylindrical shape, the display 101 is deformed into a shape along the outer peripheral surface of the cylindrical shape.

FIG. 21 is a diagram illustrating a view of an electronic device pertaining to embodiment 5, in a state of being deformed into a cylindrical shape. By deforming the electronic device into the state illustrated in FIG. 21, and wrapping around a user's wrist, the electronic device may be attached to part of the body as a wristwatch.

FIGS. 22A and 22B are diagrams illustrating types of use of the electronic device pertaining to embodiment 5. When used as a wristwatch wrapped around a user's wrist, the first region of the display 101 is positioned at a back of the wrist, and the second region is positioned so as to surround a side of the wrist.

As illustrated in FIG. 22A, when the electronic device pertaining to embodiment 5 is attached to a wrist of a user when training such as jogging is being performed, the user can turn the wrist and simply by touching a portion of the electronic device showing an image of a desired program, an instruction can be given to a sub-program corresponding to the second region. When three programs activated by the electronic device are weather forecast, health management, and music playback programs, the user can turn the wrist and instruct the electronic device to switch between the three programs simply by touching the screen, without disturbing the pace of training. In this way, training efficiency is increased.

Further, as illustrated in FIG. 22B, when a user goes out wearing the electronic device on a left hand holding a bag, a fingertip of a right hand holding something else can be used operate the electronic device by touching the display of the electronic device. Even in a state in which both hands are occupied, as long as one fingertip is free, operation with respect to the main program and sub-programs is possible, and therefore the electronic device is utilizable in a variety of outdoor situations.

Note that the electronic device may be configured such that luminance in each region in the display is changeable in order to control display of images. Specifically, when a user attaches the electronic device to a wrist, assuming a usage state in which the first region 201 is positioned at the back of the hand, the execution image of the main program displayed in the first region 201 that is most visible to the user is brightest, and icon images of sub-programs displayed in the second region 202 are displayed darker than the execution image of the main program displayed in the first region 201. Due to such display control, visibility of the execution image of the main program is not harmed, and power consumption of the electronic device is reduced. Further, display in the second region 202 may be controlled such that the farther a position is from the first region 201, the darker an image is displayed, such that luminance of the second region 202 has a gradation.

(Supplement)

Description has been provided based on the above embodiments 1-5, but the present disclosure is of course not limited to the above embodiments. The present disclosure also includes the following:

(a) The electronic device pertaining to the embodiments 1-5 may further include an orientation measurement unit that measures orientation. In this way, when a user carries the electronic device pertaining to the present disclosure, the user may install a program that informs the user of their orientation.

(b) The electronic device pertaining to embodiments 1-5 may further include a measurement unit that measures a heart rate of a person wearing the electronic device. In this way, when a user wears the electronic device pertaining to the present disclosure, the user may install a program that informs the user of their heart rate.

The shape and display state of the display 101 is not limited to that described in embodiments 1-5. For example, the shape of the display 101 may be as illustrated in FIG. 23A, FIG. 25A, FIG. 27A, or FIG. 29A.

Figure 23B:
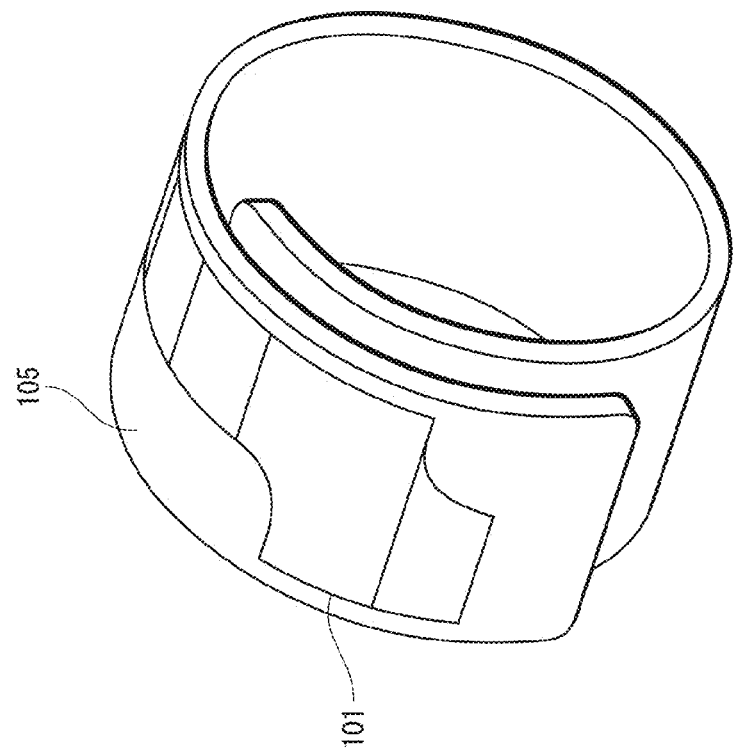
FIG. 23B is an external view of the electronic device illustrated in FIG. 23A, in a state of deformation into a cylindrical shape.
Figure 23A:
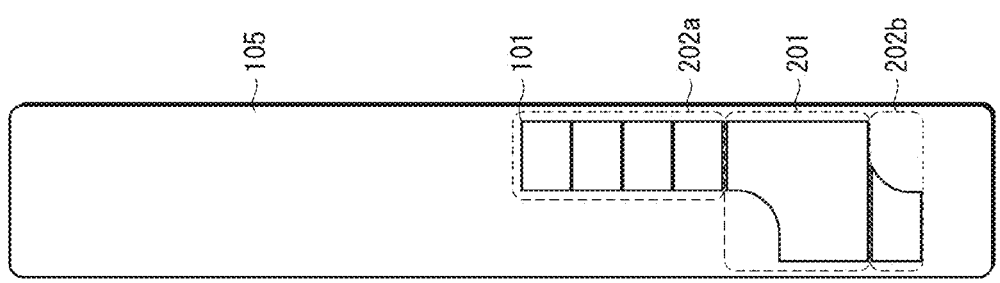
FIG. 23A is a plan view of the electronic device pertaining to modification 1 of a shape of a display.

In modification 1 of the shape of the display illustrated in FIG. 23A, the display surface of the display 101 is an elongated shape in which the second region 202a, the first region 201, and the second region 202b are lined up in the stated order in the longitudinal direction. The first region 201 and the second region 202a have sides that are aligned on the same line on the right side. The first region 201 and the second region 202b have sides that are aligned on the same line on the left side. Further, a width of the display surface in a direction perpendicular to the longitudinal direction is wider at the widest part of the first region 201 than at the widest part of either of the second region 202a and the second region 202b.

The electronic device illustrated in FIG. 23A has the casing 105 that is formed by elastic material and the display 101 that is a deformable organic EL display, as described in embodiment 5. A mounting surface of the display 101 illustrated in FIG. 23B is deformable such that a peripheral surface becomes a cylinder shape, allowing attachment of the electronic device to part of the body as a wristwatch.

Figure 24:
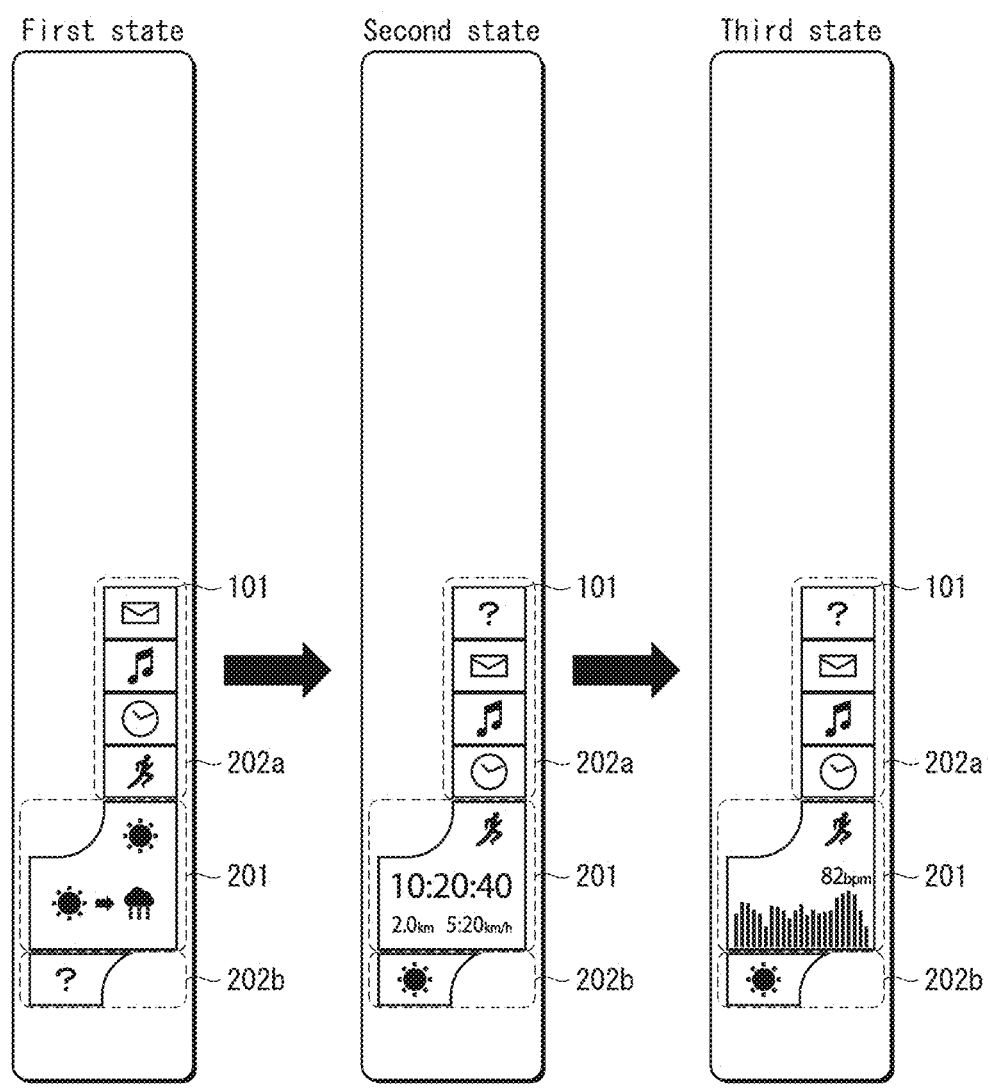
FIG. 24 is a diagram illustrating a change of display state of the display of the electronic device illustrated in FIG. 23A.

FIG. 24 is a diagram illustrating changes of display state of the display in modification 1 of the shape of the display. In a first state illustrated at the left end of FIG. 24, icon images corresponding to programs specified as sub-programs are displayed and divided between the second region 202a and the second region 202b, as in the display state of the display described using FIG. 3C. In the first region 201, an icon image and an execution image are displayed as images corresponding to a program specified as the main program. In the first state, when a flick operation in the longitudinal direction is detected on the screen surface of the display 101, the new main program is specified by a control that is the same as the processing order described with reference to FIG. 9 in embodiment 2, transitioning the display state to a second state illustrated in the center of FIG. 24. Further, in the second state, when a flick operation in a direction perpendicular to the longitudinal direction is detected in the first region on the screen surface of the display 101, execution images of the main program displayed in the first region are switched by a control that is the same as in the processing order described with reference to FIG. 18 in embodiment 3, transitioning the display state to a third state illustrated at the right end of FIG. 24.

Figure 25B:
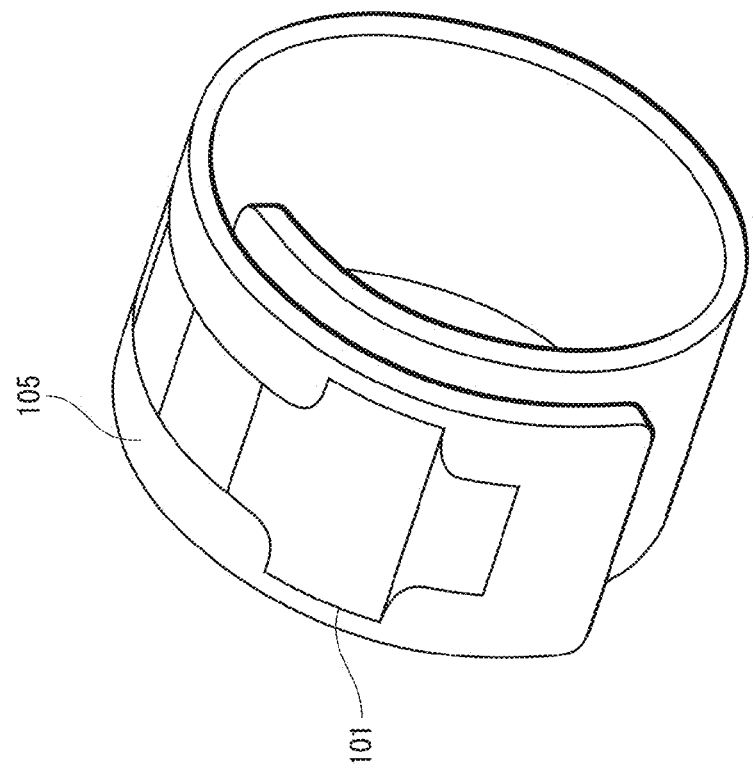
FIG. 25B is an external view of the electronic device illustrated in FIG. 25A, in a state of deformation into a cylindrical shape.
Figure 25A:
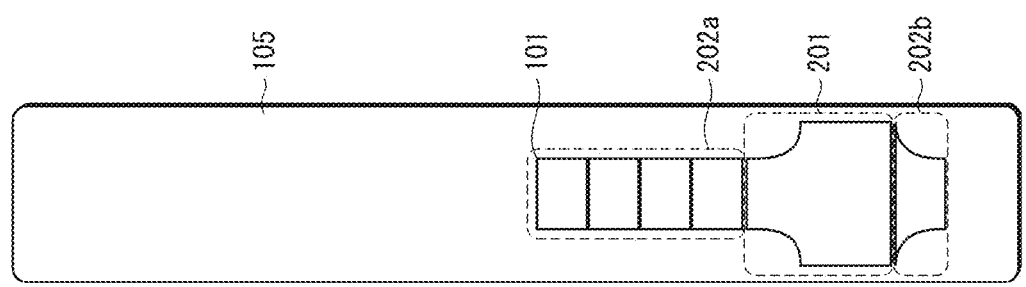
FIG. 25A is a plan view of the electronic device pertaining to modification 2 of a shape of a display.

Next is a description of modification 2 of a shape of the display. FIG. 25A is a plan view of an electronic device pertaining to modification 2 of a shape of the display. Modification 2 of the shape of the display, compared to the example illustrated in FIG. 23A, is different in that a center in the width direction of the first region 201, the second region 202a, and the second region 202a are all aligned along the same straight line, and that left and right sides of the first region 201 protrude outwards farther than extensions of the left and right sides of the second region 202a and the second region 202b. The example illustrated in FIG. 25A, as illustrated in FIG. 25B, is also possible to attach to part of the body as a wristwatch by deforming the mounting surface of the display 101 into a peripheral surface of a cylindrical shape.

Figure 26:
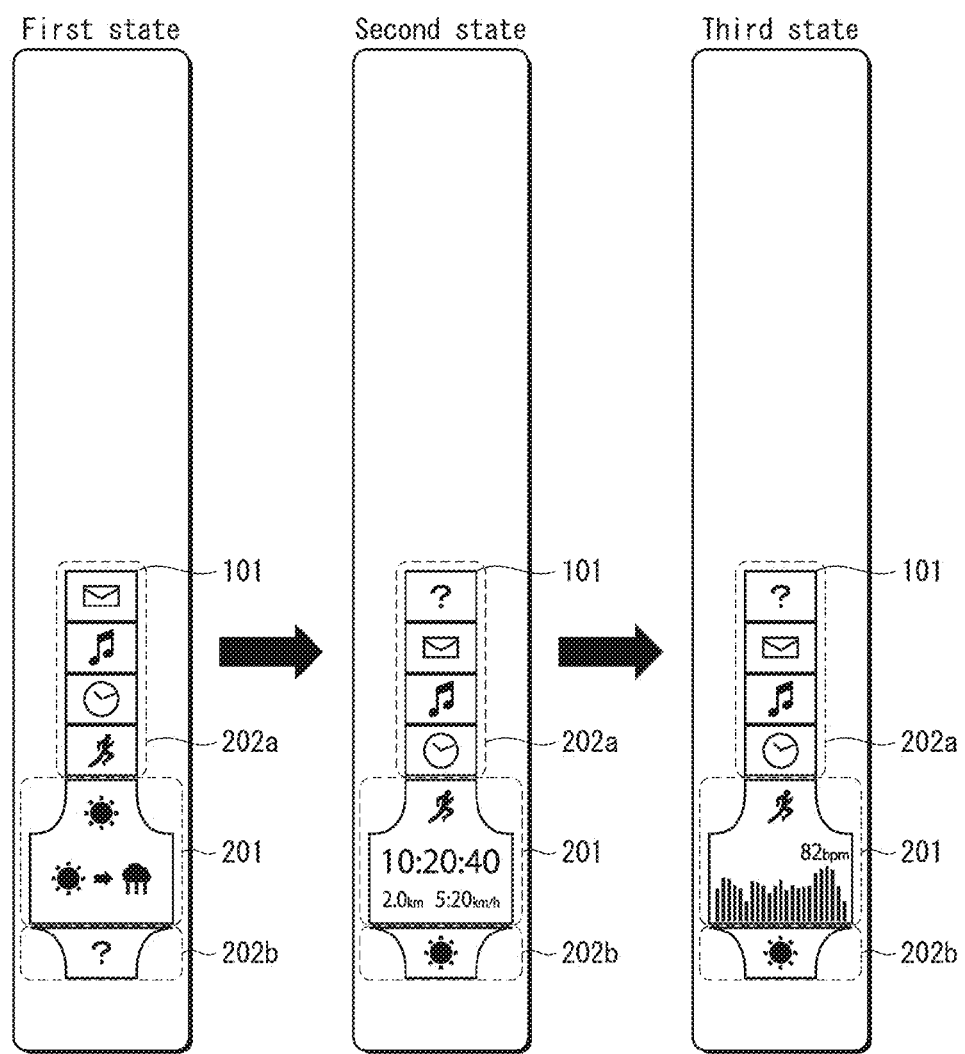
FIG. 26 is a diagram illustrating a change of display state of the display of the electronic device illustrated in FIG. 25A.

FIG. 26 is a diagram illustrating changes of display state of the display in modification 2 of the shape of the display. Changes of display state in modification 2 of the shape of the display are the same as the changes of display state in modification 1 of the shape of the display described with reference to FIG. 24.

Figure 27B:
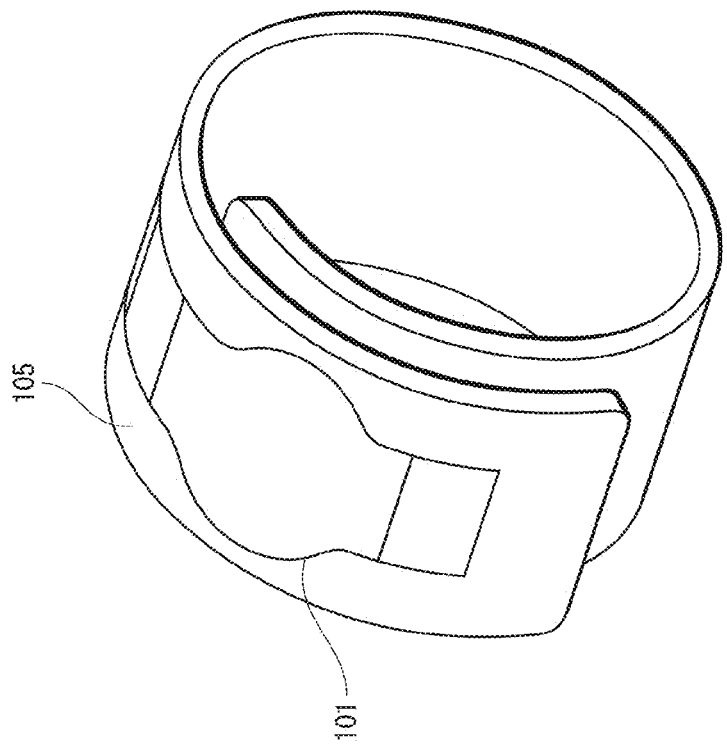
FIG. 27B is an external view of the electronic device illustrated in FIG. 27A, in a state of deformation into a cylindrical shape.
Figure 27A:
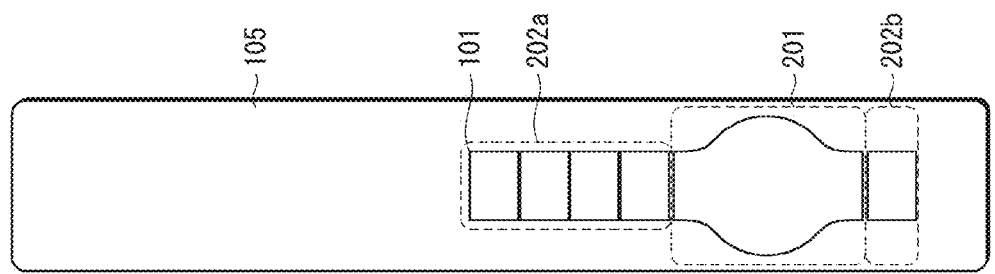
FIG. 27A is a plan view of the electronic device pertaining to modification 3 of a shape of a display.

Next is a description of modification 3 of a shape of the display. FIG. 27A is a plan view of an electronic device pertaining to modification 3 of a shape of the display. Modification 3 of the shape of the display is different from the example illustrated in FIG. 25A, in that both the left and right sides of the first region 201 are curved. The example illustrated in FIG. 27A, as illustrated in FIG. 27B, is also possible to attach to part of the body as a wristwatch by deforming the mounting surface of the display 101 into a peripheral surface of a cylindrical shape.

Figure 28:
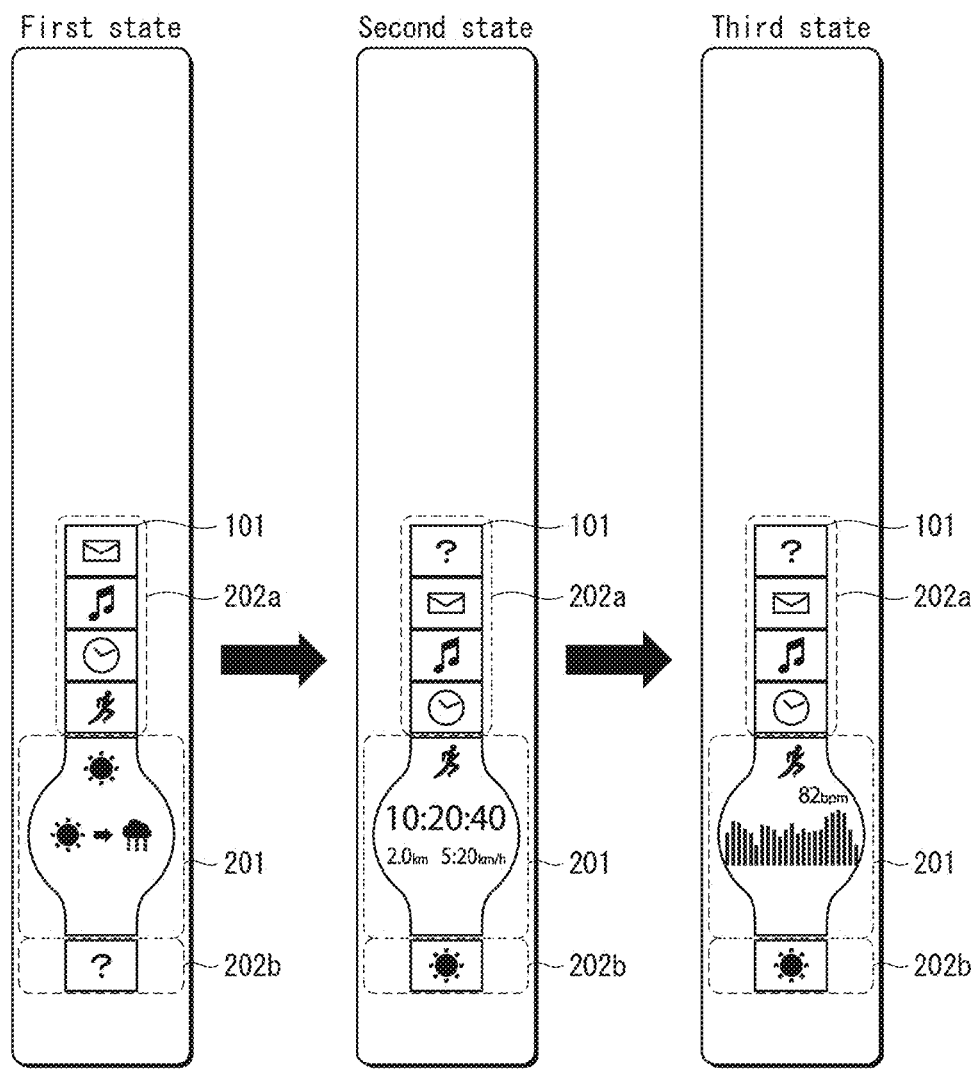
FIG. 28 is a diagram illustrating a change of display state of the display of the electronic device illustrated in FIG. 27A.

FIG. 28 is a diagram illustrating changes of display state of the display in modification 3 of the shape of the display. Changes of display state in modification 3 of the shape of the display are the same as the changes of display state in modification 1 of the shape of the display described with reference to FIG. 24.

Next is a description of modification 4 of a shape of the display. FIG. 29A is a plan view of an electronic device pertaining to modification 4 of a shape of the display. Modification 4 of the shape of the display, compared to the shape of the display illustrated in FIG. 3B, has the second region 202 further elongated in the longitudinal direction. The example illustrated in FIG. 29A, as illustrated in FIG. 29B, is also possible to attach to part of the body as a wristwatch by deforming the mounting surface of the display 101 into a peripheral surface of a cylindrical shape.

Figure 30:
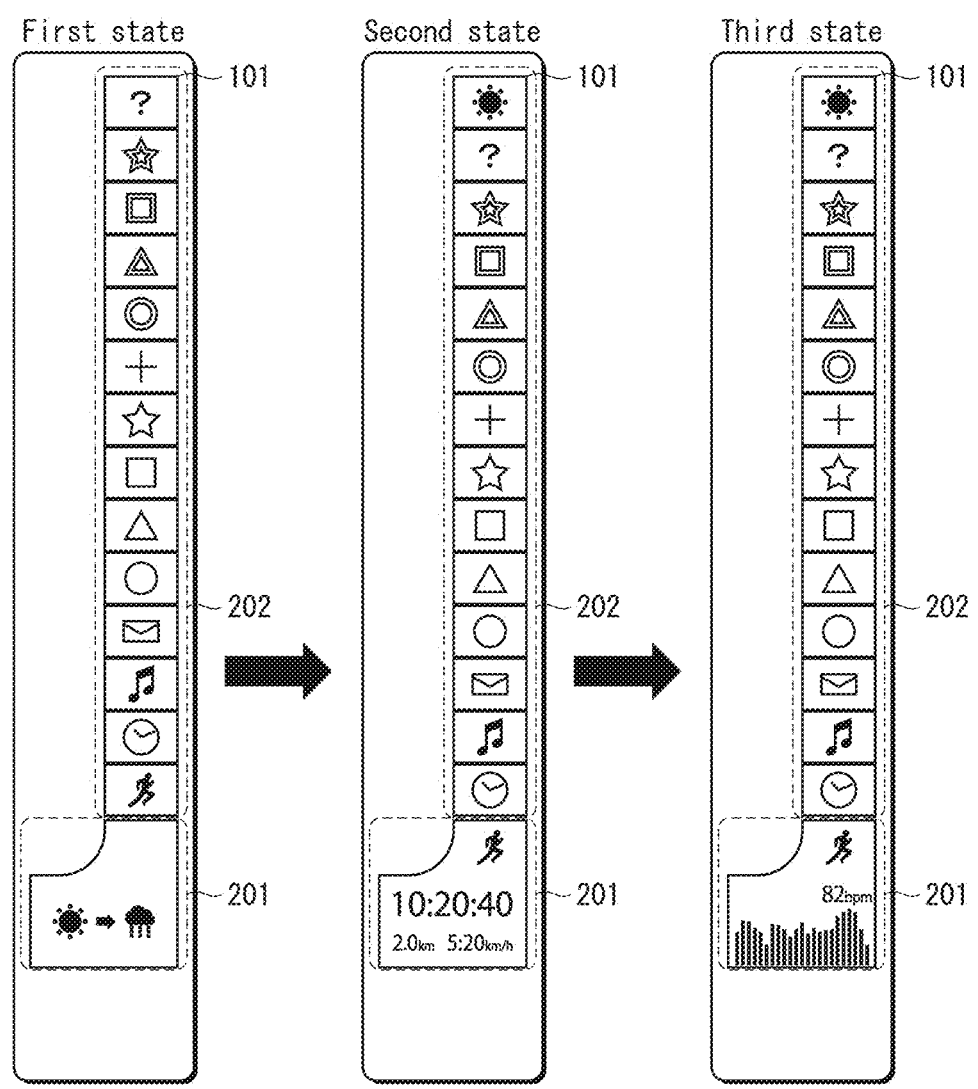
FIG. 30 is a diagram illustrating a change of display state of the display of the electronic device illustrated in FIG. 29A.

FIG. 30 is a diagram illustrating changes of display state of the display in modification 4 of the shape of the display. In the first state illustrated on the left end of FIG. 30, icon images corresponding to programs specified as sub-programs are displayed in the second region 202 the same as in the display state in the display described using FIG. 3B. In the first region 201, an icon image and an execution image are displayed as images corresponding to a program specified as the main program. The display state of the display in modification 4 is different from the example illustrated in FIG. 3B in that more icon images corresponding to programs can be displayed in the second region 202. In the first state, when a flick operation in the longitudinal direction is detected on the screen surface of the display 101, the new main program is specified by a control that is the same as the processing order described with reference to FIG. 9 in embodiment 2, transitioning the display state to a second state illustrated in the center of FIG. 30. Further, in the second state, when a flick operation in a direction perpendicular to the longitudinal direction is detected in the first region on the screen surface of the display 101, execution images of the main program displayed in the first region are switched by a control that is the same as in the processing order described with reference to FIG. 18 in embodiment 3, transitioning the display state to a third state illustrated at the right end of FIG. 30.

Figure 29B:
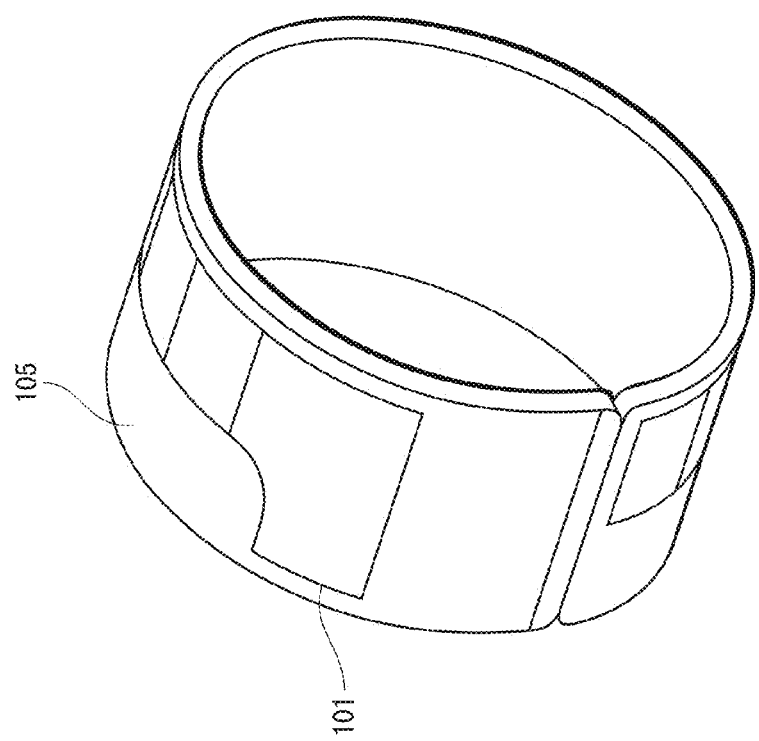
FIG. 29B is an external view of the electronic device illustrated in FIG. 29A, in a state of deformation into a cylindrical shape.
Figure 29A:
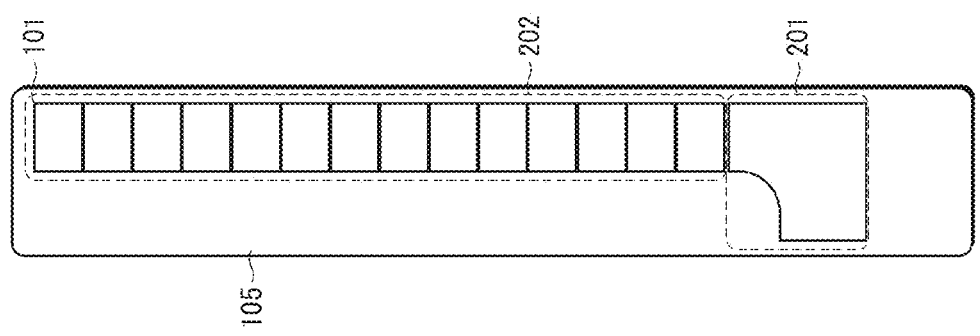
FIG. 29A is a plan view of the electronic device pertaining to modification 4 of a shape of a display.

In the electronic device pertaining to modification 4 of the shape of the display, because the display 101 covers substantially the entire outer peripheral surface illustrated in FIG. 29B achieved by deformation into a cylindrical shape, when a user uses the electronic device wrapped around a wrist, it is possible to obtain the feeling as if images are surrounding the wrist by scrolling images displayed on the display surface in the longitudinal direction.

(d) In the electronic device pertaining to embodiments 1-5, the number of images corresponding to programs that can be displayed on the display 101 may be set as a specific number of the electronic device, or may be changed as appropriate.

In the electronic device pertaining to embodiments 1-5, the number of programs stored in the memory 12 and the number of images corresponding to programs displayed on the display 101 do not necessarily have to match.

For example, when the number of programs stored in the memory 12 is greater than the sum of the number of images corresponding to sub-programs displayed in the second region and the number of images corresponding to the main program displayed in the first region, from the programs stored in the memory 12, a number of random programs may be selected equal to the number of images displayed in the first region and the second region, and displayed on the display 101. Further, the user may select programs to display on the display 101. Further, based on information of use history and use frequency of each program by a user, the processor 103 may select programs to be displayed as images on the display 101.

Further, when the number of programs stored in the memory 12 is greater than the number of corresponding images that can be displayed on the display 101, the following two methods are possible display controls when scrolling images displayed on the display 101 in the longitudinal direction (Y-Y' direction).

As a first method, from programs stored in the memory 12, only images corresponding to programs already displayed are repeatedly scrolled and displayed in succession on the display 101. This method, as described in embodiments 1 and 2, may be implemented by matching the number of storage regions of the VRAM 14 to which images corresponding to programs are written and the number of IDs of programs managed in the arrangement table.

As a second method, in accordance with scrolling, programs are sequentially replaced and corresponding images displayed. This method may be implemented by making the number of IDs of programs managed in the arrangement table greater than the number of storage regions of the VRAM 14 to which images corresponding to programs are written. For example, five storage regions 0-4 are provided to the VRAM 14 to which images corresponding to programs are written, as in embodiment 1, and ten items P0-P9 are provided to the arrangement table that manage the IDs of programs. Updating such an arrangement table as described in embodiment 2, by shifting the IDs registered thereto to the left in correspondence with movement of images due to scrolling from the second region towards the first region, starting from a state displaying images corresponding to programs having IDs registered at P0-P4, images corresponding to programs having IDs registered at P5-P9 can be displayed in sequential order from the top of the second region of the display 101 due to scrolling.

Figure 31:
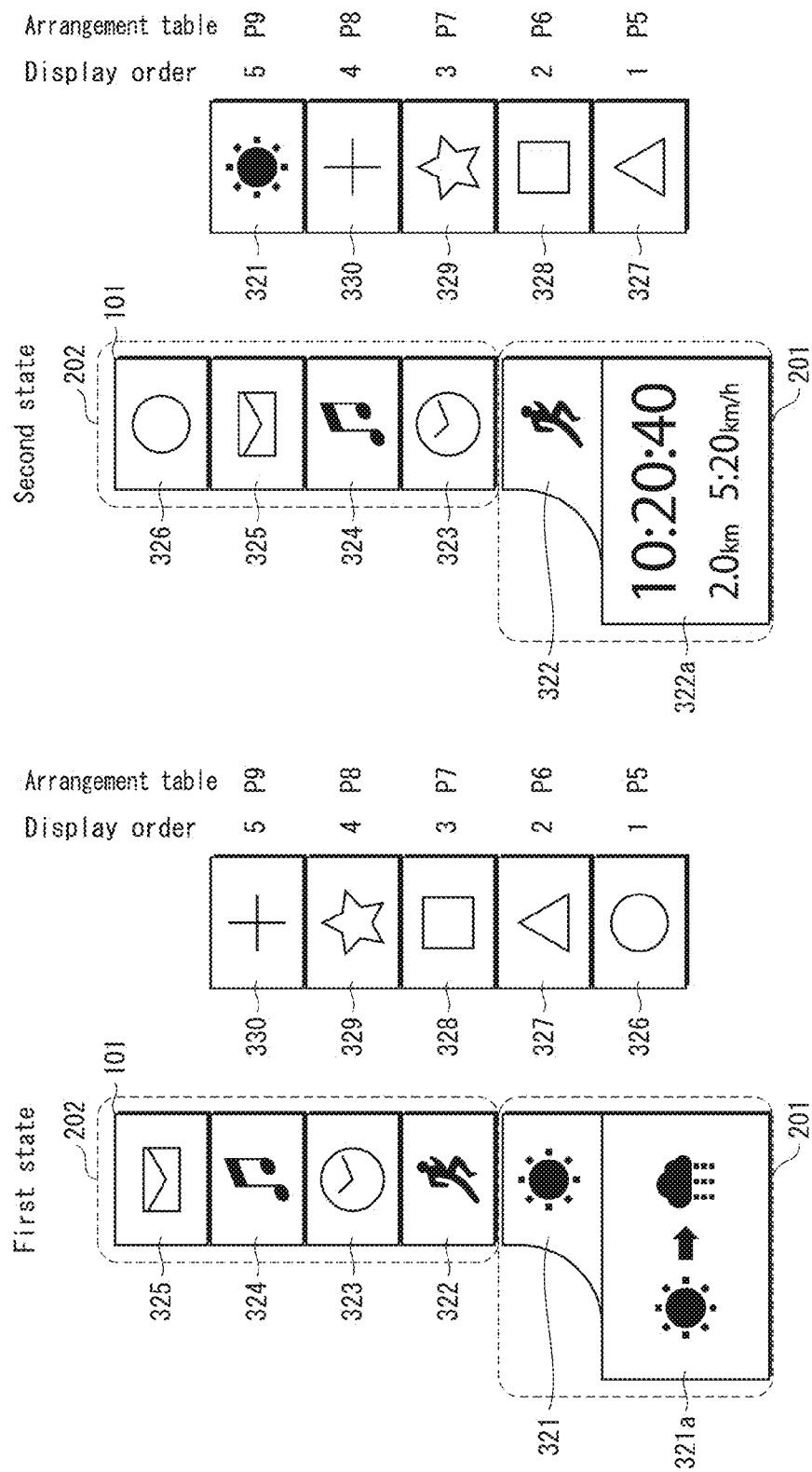
FIG. 31 illustrates a modification that manages a display order of programs that are not displayed on screen when the number of programs are greater than the number that may be displayed.

A display state in which scrolling of images is controlled according to the above-described second method in which the number of programs is greater than the number of programs that can be displayed is described below using FIG. 31. In the first state illustrated on the left side of FIG. 31, four icon images 322-325 corresponding to four programs specified as sub-programs are displayed in the second region 202. In the first region 201, an icon image 321 and an execution image 321*a* are displayed as images corresponding to a program specified as the main program. The icon images 326-330 illustrated to the side of the display 101 indicated programs having IDs registered to P5-P9 of the arrangement table. The programs corresponding to the icon images 326-330 are not displayed on the display in the first state and starting from the bottom of the drawing and moving upwards are associated with a display order 1-5 in the order P5-P9 of the arrangement table.

In the first state, when a flick operation is detected on the screen surface of the display 101 in the longitudinal direction from the second region towards the first region, scrolling of the display is caused equivalent to one icon image in the direction of the flick operation. Due to such scrolling the display transitions to the second state illustrated by the right side of FIG. 31.

In the second state, a program corresponding to the icon image 322 that in the first state was displayed in the second region 202 closest to the first region 201 is specified as the main program, and the icon image 322 and an execution image 322*a* are displayed in the first region 201 as an image corresponding to the main program.

In the second state, among the icon images displayed in the second region 202, three icon images 323-325 are icon images that were displayed in the second region 202 in the first state, that have moved one icon image length towards the first region 201 from their positions in the first state.

In the second state, the icon image 326 is displayed at a display position at the top end of the second region 202 that is opened up by the movement of the icon images 323-325. The icon image 326 corresponds to the program having a display order of 1 from among the programs not displayed on the display 101 in the first state.

The programs corresponding to the icon images 327-330 that had a display order of 2-5 in the first state move up the display order one-by-one, having a display order of 1-4 in the second state. Further, the program corresponding to the icon image 321 that was the main program in the first state disappears from the lower end side of the first region 201 due to the scrolling, is registered with an ID at P9 of the arrangement table associated with the last position, 5, in the display order, and is not displayed on the display in the second state.

By managing the display order as described above, and causing the display state to transition, programs may be sequentially replaced and corresponding images displayed on the display 101 in a state in which the number of programs is greater than the number which can be displayed on the display.

(f) In embodiments 2-4, execution of programs is controlled such that only the main program for which an image is displayed in the first region 201 is executed, and sub-programs for which icon images are displayed in the second region 202 are stopped. However, controls method of execution of programs is not limited to control methods described in the embodiments 1-5.

For example, in FIG. 16A, when a tap operation is detected in a region displaying the characters "Start" in the image 301a, the program corresponding to the image 301a in the first region 201 executes time measurement as a stopwatch function. While time is being measured, when the main program is switched in response to a flick operation, stopping the time measurement is not what a user would expect.

Thus, even when the main program is switched in response to a flick operation, a function being executed prior to the switching need not be stopped, and execution of the program may be controlled to continue execution as a sub-program. Specifically, in the flowchart of flick operation processing illustrated in FIG. 9, when a flick operation is detected in the determination of step S201 ("Yes" at step S201), the processing of step S202 that stops execution of the main program is omitted. By omitting the processing of step S202, a program that was the main program prior to switching due to a flick operation may continue to be executed after being switched to being a sub-program.

In the same way, by omitting the processing at each of step S302 in the flick operation 2 processing in FIG. 10, step S402 in the drag operation processing in FIG. 12, step S503 in the tap operation processing in FIG. 15, and step S702 in the acceleration detection processing in FIG. 20, a program that was the main program prior to detection of each operation may continue being executed after becoming a sub-program.

By such a method of controlling program execution, the main program is displayed as an execution image of the program in the first region 201, allowing a user to confirm an execution status thereof. However, a sub-program is only displayed as an icon image in the second region 202, and therefore a user cannot identify an execution status of such a program. Thus a user of the electronic device may forget that a sub-program is being executed. In such a case, for example, a battery of the electronic device may be wastefully depleted. Thus, it is preferable that a sub-program that is being executed display an icon image in the second region 202 that is in a different display format than a sub-program that is stopped.

As a display format of an icon image of a sub-program that is being executed, for example, a display format may be used in which an icon image is made to move within the display region of the icon image indicating a program that is being executed. Specifically, the icon image may be displayed scrolling repeatedly across the lateral direction of the display.

As a display format of an icon image of a sub-program that is being executed, a display format may be used in which the icon blinks on an off due to periodic changes in luminance of the display in a region displaying an icon image indicating a sub-program that is being executed.

Alternatively, as a display format of an icon image of a sub-program that is being executed, a display format may be used in which a size of the icon image is periodically increased and decreased.

Alternatively, as a display format of an icon image of a sub-program that is being executed, a display format may be used in which the icon image is replaced by an animated image. For example, the icon image 301b that is a stylized person displayed in the second region 202 in FIG. 16C, when being executed as a sub-program, may be replaced by an animated image showing the stylized person running.

Figure 32:
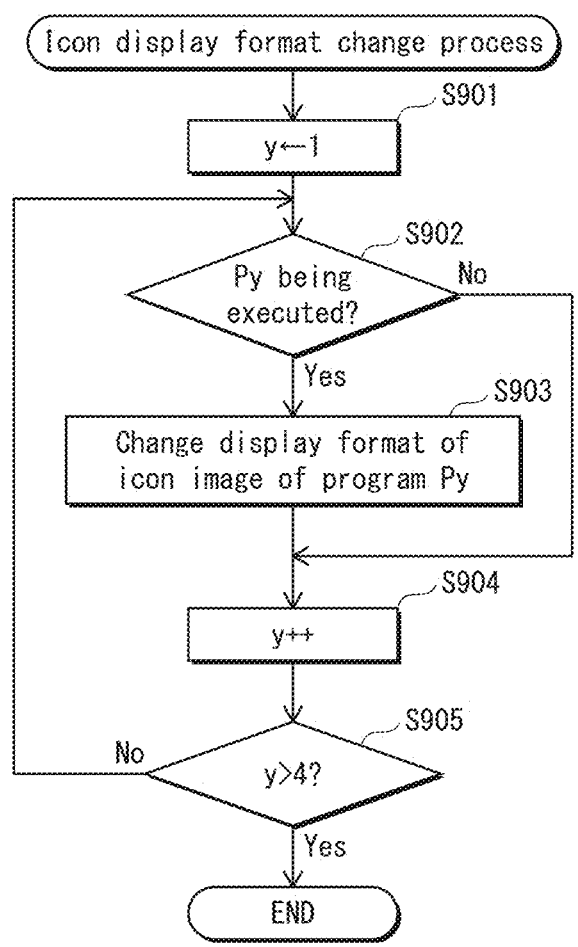
FIG. 32 is a flowchart illustrating icon display format change processing.
Figure 33A:
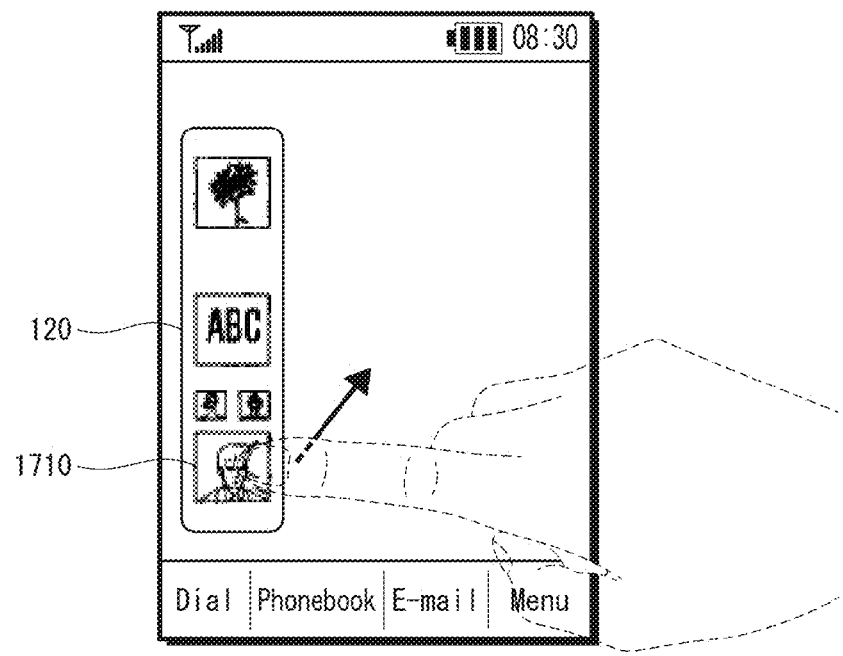
FIGS. 33A and 33B illustrate a display operation of a conventional electronic device.
Figure 33B:
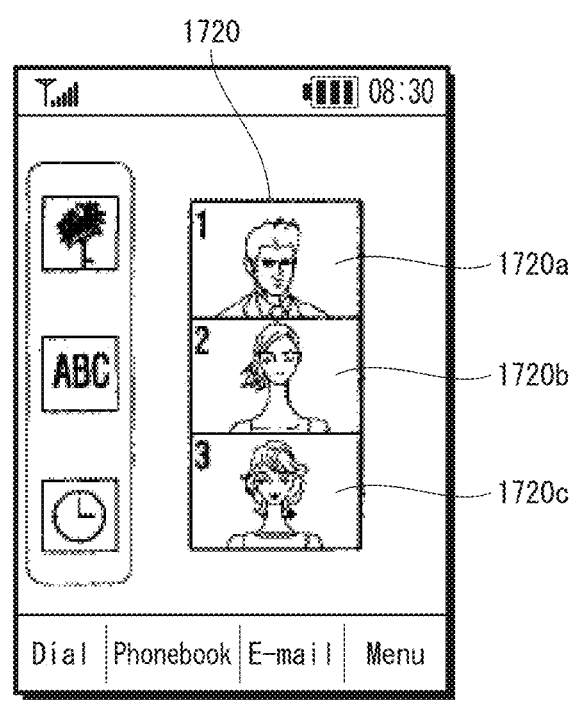

FIG. 32 is a flowchart illustrating icon display format change processing. The processor 104 that controls display of the display can change the display format of an icon image in the second region 202 in response to an execution state of a sub-program, by executing the processing order in FIG. 32. In the icon display format change processing, first, a variable y that indicates a storage region number of the VRAM 14 is initialized as 1 (step S901), and subsequently steps S902-S905 are executed as loop processing.

In the loop processing, whether or not a sub-program having an ID registered at Py in the arrangement table is currently being executed or not is determined (step S902). Only when the sub-program is being executed ("Yes" at step S902), the display format of the icon image at the storage region y of the VRAM 14 is changed to one of the above-mentioned display formats (step S903). Subsequently, the variable y is incremented, and the loop processing repeats until the variable y becomes 5. The above loop processing, when y is 1-4, changes only display formats of icon images of programs being executed from among sub-programs having IDs registered at P1-P4 of the arrangement table.

(g) "Program" in the present description is synonymous with "computer program", "application", "software", and similar.

(h) The processors 103, 104, and 107 in the present description each perform program execution controls, display controls, and touch position detection, but the processors 103, 104, and 107 are not limited to performing individual processing. One processor may be provided, on which all the processing may be performed, or two or more processors may be provided, on which the processing is appropriately allocated and performed.

(i) The memory 12 may use volatile memory or non-volatile memory, and may include two or more memories.

(j) In the display 101, an organic EL display, a liquid crystal display, or other known display may be used. A screen size of the display 101 may be any of a variety of sizes dependant on the use of the display 101.

(k) In embodiment 5, a wristwatch form of the electronic device is described, but the electronic device pertaining to the present disclosure may also be implemented in a microwave, refrigerator, etc., that has a display. In such a case, the casing 105 has a variety of sizes and forms according to usage.

(l) In the electronic device pertaining to embodiments 1-5, as images corresponding to programs specified as sub-programs icon images displayed in the second region 202 are described, but images displayed in the second region 202 are not limited to being the icon images. For example, as the images corresponding to programs specified as sub-programs, IDs of programs may be displayed in the second region 202.

INDUSTRIAL APPLICABILITY

The electronic device pertaining to the present disclosure has excellent user interface functionality in displays, and is applicable to mobile terminals, wearable terminals, digital signage, etc.

REFERENCE SIGNS LIST

11 controller
12 memory
13 graphics controller
14 VRAM
15 sensor unit
16 GPS unit
17 Input device
18 communication unit
101 display
103, 104, 107 processor
105 casing
106 touch panel
108 acceleration sensor
201 first region
202 second region
203 image corresponding to program A
204 image corresponding to program B
205 image corresponding to program C
206 image corresponding to program D
207 image corresponding to program E

The invention claimed is:

1. An electronic device comprising:
a display having an elongated shape and configured to display images;
a memory configured to store a plurality of programs and for each of the programs, an icon image indicative of a corresponding program; and
a processor configured to perform execution control and display control, the execution control being related to execution of the programs, the display control being related to displaying by the display, wherein
the display has a display surface including a first region and a second region, the first region and the second region aligned in a longitudinal direction of the elongated display,
the execution control includes a process of specifying one of the programs as a first program and specifying another of the rest of the programs as a second program,
the display control includes a control of, when the first program and the second program are specified, causing the display to display a display image corresponding to the first program when the first program is set to be displayed in the first region, and to display an icon image corresponding to the second program when the second program is set to be displayed in the second region,
a width of the second region in a direction perpendicular to the longitudinal direction is equal to or less than a width of a narrowest portion of the first region,
a width of a body of the first region being larger than the width of the second region,
a transition portion of the first region that connects to the second region has a shape such that a width of the transition portion of the first region gradually increases as distance from the second region increases along the longitudinal direction, the transition portion being the narrowest portion of the first region,
the second region is configured to display, for any of the programs, an icon image corresponding to a program set to be displayed in the second region, the icon image having a width in the direction perpendicular to the longitudinal direction corresponding to the width of the second region, and
the first region is configured to display, for any of the programs, a display image corresponding to a program set to be displayed in the first region, the display image visualizing information generated by execution of the program set to be displayed in the first region with a shape and size corresponding to a shape and size of the first region.

2. The electronic device of claim 1, wherein
an image corresponding to the first program set to be displayed in the first region includes both an icon image and the display image corresponding to the first program.

3. The electronic device of claim 1 further comprising
a touch panel configured to detect a touch operation on the display surface, wherein
the display control further includes an image movement control of, when the touch panel detects the touch operation, moving the icon image corresponding to the second program, which is displayed in the second region, to the first region, and
the execution control includes a program switching process of, when the icon image corresponding to the second program is moved to the first region, displaying a display image corresponding to the second program in the first region, and adjusting the display image corresponding to the second program to have a shape and size corresponding to a shape and size of the first region.

4. The electronic device of claim 3, wherein
the touch operation detected by the touch panel is a flick operation along the longitudinal direction, and
the processor, in the image movement control, scrolls each of the display image displayed in the first region and the icon image displayed in the second region in the longitudinal direction when the touch panel detects the flick operation.

5. The electronic device of claim 4, wherein
the execution control includes a control of displaying, in the second region, the icon image corresponding to the second program and an icon image corresponding to a third program among the programs to be aligned in the longitudinal direction, the icon image corresponding to the second program is positioned closest to the first region among the icon images displayed in the second region, and when the flick operation is directed from the second region to the first region, the moving of the icon image corresponding to the second program in the image movement control is performed by scrolling, to the first region, the icon image corresponding to the second program.

6. The electronic device of claim 4, wherein
the processor, in the image movement control, determines a scrolling amount in the longitudinal direction in accordance with a speed of the flick operation detected by the touch panel, and
the program switching process is performed by displaying, at a timing when the scrolling ends, the display image corresponding to the second program in the first region.

7. The electronic device of claim 3, wherein
the touch operation detected by the touch panel is a drag operation along the longitudinal direction,
the processor, in the image movement control, scrolls each of a display image displayed in the first region and an icon image displayed in the second region in the longitudinal direction when the touch panel detects the drag operation, and
the program switching process is performed by displaying, at a timing when the scrolling ends, the display image corresponding to the second program in the first region.

8. The electronic device of claim 3, wherein
the execution control includes a control of displaying, in the second region, the icon image corresponding to the second program and an icon image corresponding to a third program among the programs to be aligned in the longitudinal direction,
the touch operation detected by the touch panel is a selection operation for selecting the icon image corresponding to the second program, among the icon images displayed in the second region, and the touch operation is at least one of a tap operation, a long tap operation, and a double-tap operation,
the processor further specifies, as a selected icon image, one icon image among the icon images displayed in the second region when the touch panel detects the selection operation, and
the selected icon image is moved to the first region in the image movement control.

9. The electronic device of claim 3, wherein
the touch operation detected by the touch panel is at least one of a flick operation and a drag operation, performed with respect to the first region along the direction perpendicular to the longitudinal direction, and
the display control further includes a control of changing the display image displayed in the first region by replacing the display image corresponding to the first program with the display image corresponding to the second program, in accordance with the at least one of the flick operation and the drag operation along the direction perpendicular to the longitudinal direction detected by the touch panel.

10. The electronic device of claim 1 further comprising
an acceleration sensor configured to detect acceleration in the longitudinal direction, wherein
the display control further includes an image movement control of, when the acceleration sensor detects the acceleration, moving the icon image corresponding to the second program, which is displayed in the second region, to the first region by scrolling each of the display image displayed in the first region corresponding to the first program and the icon image displayed in the second region corresponding to the second program in the longitudinal direction, and
the execution control includes a program switching process of, when the icon image corresponding to the second program is moved to the first region, displaying a display image corresponding to the second program in the first region, and adjusting the display image corresponding to the second program to have a shape and size corresponding to the shape and size of the first region.

11. The electronic device of claim 10, wherein
the execution control includes a control of displaying, in the second region, the icon image corresponding to the second program and an icon image corresponding to a third program among the programs to be aligned in the longitudinal direction,
the icon image corresponding to the second program is positioned closest to the first region among the icon images displayed in the second region, and
when the flick operation is directed from the second region to the first region, the moving of the icon image corresponding to the second program in the image movement control is performed by scrolling, to the first region, the icon image corresponding to the second program.

12. The electronic device of claim 10, wherein
the processor, in the image movement control, determines a scrolling amount in the longitudinal direction in accordance with a degree of acceleration detected by the acceleration sensor, and
the program switching process is performed by displaying, at a timing when the scrolling ends, the display image corresponding to the second program in the first region.

13. The electronic device of claim 1 further comprising
an acceleration sensor configured to detect acceleration, wherein
the display has two operation states, one being a sleep state in which images are not displayed and the other being an active state in which images are displayed, and
the processor, when the acceleration detected by the acceleration sensor is equal to or greater than a predefined value, performs a control of switching the display from the sleep state to the active state.

14. The electronic device of claim 1, wherein
at least one side of the display surface is curved at the transition portion of the first region that connects to the second region.

15. The electronic device of claim 1, wherein
the second region is composed of two portions, and
the first region is positioned between the two portions of the second region.

16. The electronic device of claim 3, wherein
the programs include, in addition to the first program and the second program, a third program, and the icon image corresponding to the second program and an icon image corresponding to the third program are displayed in the second region, and
when one icon image among the icon images displayed in the second region, each of which corresponding to one of the programs, is touched, the processor moves the touched icon image to the first region in the image movement control by performing (i), (ii), and (iii) in the stated order:

(i) displaying an icon image corresponding to a target program corresponding to the touched icon image in the transition portion of the first region and displaying the display image corresponding to the first program in a remaining portion of the first region;

(ii) displaying the icon image corresponding to the target program in the transition portion of the first region and displaying a display image corresponding to the target program in the remaining portion of the first region; and (iii) displaying the icon image corresponding to the target program in the transition portion of the first region and adjusting the display image corresponding to the target program to cover an entirety of the remaining portion of the first region.

17. The electronic device of claim 1 further comprising a casing that holds the display, the memory, and the processor, wherein
the display and the casing are deformable such that the longitudinal direction extends along a circumferential direction of a cylindrical shape.

18. The electronic device of claim 17, wherein
the casing, when deformed, has a cylindrical shape.

19. The electronic device of claim 17, wherein
the casing, when deformed, is attachable to a part of a human body.

* * * * *